(12) United States Patent
Yamauchi et al.

(10) Patent No.: US 9,505,266 B2
(45) Date of Patent: Nov. 29, 2016

(54) WHEEL BEARING APPARATUS AND AXLE MODULE

(71) Applicants: Kiyoshige Yamauchi, Shizuoka (JP);
Masahiro Ozawa, Shizuoka (JP);
Mitsuru Umekida, Shizuoka (JP)

(72) Inventors: Kiyoshige Yamauchi, Shizuoka (JP);
Masahiro Ozawa, Shizuoka (JP);
Mitsuru Umekida, Shizuoka (JP)

(73) Assignee: NTN CORPORATION, Osaka (JP)

( * ) Notice: Subject to any disclaimer, the term of this patent is extended or adjusted under 35 U.S.C. 154(b) by 342 days.

(21) Appl. No.: 14/014,753

(22) Filed: Aug. 30, 2013

(65) Prior Publication Data

US 2013/0342004 A1    Dec. 26, 2013

Related U.S. Application Data

(62) Division of application No. 12/922,746, filed as application No. PCT/JP2009/056789 on Apr. 1, 2009, now Pat. No. 8,556,737.

(30) Foreign Application Priority Data

Apr. 4, 2008    (JP) ................................. 2008-098375
Apr. 22, 2008   (JP) ................................. 2008-111447
May 7, 2008     (JP) ................................. 2008-121331

(51) Int. Cl.
    *B60B 27/00*      (2006.01)
    *F16C 35/063*     (2006.01)
    (Continued)

(52) U.S. Cl.
    CPC ....... *B60B 27/0042* (2013.01); *B60B 27/0005* (2013.01); *B60B 27/0026* (2013.01);
    (Continued)

(58) Field of Classification Search
    CPC .......... B60B 27/0005; B60B 27/0021; B60B 27/0026; B60B 27/0042; F16C 35/0635
    See application file for complete search history.

(56) References Cited

U.S. PATENT DOCUMENTS 3,336,062 A    8/1967    Mekkes
4,225,112 A    9/1980    Libke
(Continued)

FOREIGN PATENT DOCUMENTS

CN    1177706       12/2004
JP    55-057765     4/1980
(Continued)

OTHER PUBLICATIONS

Japanese Office Action dated Nov. 21, 2013 in corresponding Japanese Application No. 2013-049727, with partial English translation.

(Continued)

*Primary Examiner* — Kip T Kotter
(74) *Attorney, Agent, or Firm* — Wenderoth, Lind & Ponack, L.L.P.

(57) ABSTRACT

A recess-projection fitting structure includes projections extending in an axial direction on an outer diameter surface of a shaft section of an outer joint member or an inner diameter surface of a hole of a hub wheel, press-fitting the projections in another of the outer diameter surface and the inner diameter surface along the axial direction, and forming recesses brought into contact and fitted with the projections by press fitting in the other of the outer diameter surface and the inner diameter surface, the projections and the recesses being held in contact with each other through intermediation. An outer member is fitted in a hole of a knuckle of a vehicle. Annular grooves are formed respectively in an outer peripheral surface of the outer member and an inner peripheral surface of the hole of the knuckle, and a snap ring is engaged with both the annular grooves.

16 Claims, 42 Drawing Sheets

(51) Int. Cl.
   *B60B 35/14* (2006.01)
   *B60B 35/18* (2006.01)
   *F16C 19/18* (2006.01)
   *F16D 1/072* (2006.01)
   *F16D 1/10* (2006.01)
   *F16C 35/067* (2006.01)

(52) U.S. Cl.
   CPC ....... *B60B27/0084* (2013.01); *B60B 27/0094* (2013.01); *F16C 35/0635* (2013.01); *B60B 27/00* (2013.01); *B60B 35/14* (2013.01); *B60B 35/18* (2013.01); *F16C 19/186* (2013.01); *F16C 35/067* (2013.01); *F16C 2226/74* (2013.01); *F16C 2326/02* (2013.01); *F16D 1/072* (2013.01); *F16D 2001/103* (2013.01)

(56) References Cited

U.S. PATENT DOCUMENTS

| | | | | |
|---|---|---|---|---|
| 6,135,571 | A * | 10/2000 | Mizukoshi | B60B 27/00 180/252 |
| 6,739,977 | B2 * | 5/2004 | Tajima | B60B 27/00 464/178 |
| 7,090,061 | B2 | 8/2006 | Bove et al. | |
| 8,261,447 | B2 * | 9/2012 | Tajima | B60B 27/00 29/509 |
| 8,382,378 | B2 * | 2/2013 | Fukumura | B60B 27/0005 384/544 |
| 2002/0025093 | A1 * | 2/2002 | Sahashi | B60B 27/00 384/544 |
| 2002/0072421 | A1 | 6/2002 | Ouchi | |
| 2002/0195291 | A1 | 12/2002 | Nonogaki | |
| 2003/0060294 | A1 | 3/2003 | Ouchi | |
| 2004/0120622 | A1 * | 6/2004 | Tajima | B60B 27/00 384/544 |
| 2009/0129715 | A1 | 5/2009 | Fukumura et al. | |

FOREIGN PATENT DOCUMENTS

| | | |
|---|---|---|
| JP | 59-140911 | 8/1984 |
| JP | 62-251522 | 11/1987 |
| JP | 07-167116 | 7/1995 |
| JP | 07-259392 | 10/1995 |
| JP | 2001-113412 | 4/2001 |
| JP | 2002-370506 | 12/2002 |
| JP | 2003-004060 | 1/2003 |
| JP | 2004-052787 | 2/2004 |
| JP | 2004-340311 | 12/2004 |
| JP | 2005-239100 | 9/2005 |
| JP | 2006-342945 | 12/2006 |
| JP | 2007-55322 | 3/2007 |
| JP | 2007-186149 | 7/2007 |
| JP | 2007-191036 | 8/2007 |
| JP | 2007-276780 | 10/2007 |
| JP | 2007-331457 | 12/2007 |
| JP | 2008-2578 | 1/2008 |
| JP | 2008-2582 | 1/2008 |
| JP | 2008-18821 | 1/2008 |
| WO | 2007/145005 | 12/2007 |

OTHER PUBLICATIONS

International Preliminary Report on Patentability and Written Opinion of the International Searching Authority mailed Dec. 9, 2010 in International (PCT) Application No. PCT/JP2009/056789.
International Search Report issued Jul. 7, 2009 in International (PCT) Application No. PCT/JP2009/056789.
Japanese Office Action mailed Jun. 6, 2013 in corresponding Japanese Application No. 2008-111447 (partial translation).
Office Action issued Jul. 27, 2016 in corresponding Chinese Application No. 201510111658.4, with partial English translation.

* cited by examiner

WHEEL BEARING APPARATUS AND AXLE MODULE

BACKGROUND OF THE INVENTION

I. Technical Field

The present invention relates to a wheel bearing device and an axle module for supporting wheels to freely rotate the wheels relative to a vehicle body in a vehicle such as an automobile.

II. Description of the Related Art

Wheel bearing devices have evolved from a structure called first generation in which a double row roller bearing is independently used to second generation in which a vehicle body attachment flange is integrally provided in an outer member. Further, a third generation in which one inner raceway surface of the double row roller bearing is integrally formed with an outer periphery of a hub wheel integrally including a wheel attachment flange has been developed. Further, a fourth generation in which a constant-velocity universal joint is integrated with the hub wheel and the other inner raceway surface of the double row roller bearing is integrally formed with an outer periphery of an outer joint member constituting the constant-velocity universal joint has been developed.

For example, the wheel bearing device called third generation is described in JP 2004-340311 A. The wheel bearing device called third generation includes, as illustrated in FIG. 45, a hub wheel 152 including a flange 151 extending in an outer diameter direction, a constant-velocity universal joint 154 including an outer joint member 153 fixed to the hub wheel 152, and an outer member 155 disposed on an outer peripheral side of the hub wheel 152.

The constant-velocity universal joint 154 includes the outer joint member 153, an inner joint member 158 disposed in a cup-like section 157 of the outer joint member 153, balls 159 disposed between the inner joint member 158 and the outer joint member 153, and a cage 160 that retains the balls 159. Further, a spline section 161 is formed on an inner peripheral surface of a center hole of the inner joint member 158. An end spline section of a shaft (not shown) is inserted into the center hole, and thus the spline section 161 on the inner joint member 158 side and the spline section on the shaft side are engaged.

Further, the hub wheel 152 includes a cylindrical shaft section 163 and the flange 151. A short-cylindrical pilot section 165, on which a wheel and a brake rotor (not shown) are mounted, is protrudingly provided on an outer end surface 164 (end surface on an outboard side) of the flange 151. Note that, the pilot section 165 includes a large-diameter first section 165a and a small-diameter second section 165b. The brake rotor is externally fit in the first section 165a and the wheel is externally fit in the second section 165b.

A small-diameter step section 166 is provided in an outer peripheral surface at an end on the cup-like section 157 side of the shaft section 163. An inner race 167 is fit in the small-diameter step section 166. A first inner raceway surface 168 is provided in the vicinity of a flange on an outer peripheral surface of the shaft section 163 of the hub wheel 152. A second inner raceway surface 169 is provided on an outer peripheral surface of the inner race 167. Further, a bolt inserting hole 162 is provided in the flange 151 of the hub wheel 152. A hub bolt for fixing the wheel and the brake rotor to the flange 151 is inserted into the bolt inserting hole 162.

In the outer member 155, outer raceway surfaces 170 and 171 in two rows are provided on an inner periphery thereof and a flange (vehicle body attachment flange) 182 is provided on an outer periphery thereof. The first outer raceway surface 170 of the outer member 155 and the first inner raceway surface 168 of the hub wheel 152 are opposed to each other. The second outer raceway surface 171 of the outer member 155 and the raceway surface 169 of the inner race 167 are opposed to each other. Rolling elements 172 are interposed between the second outer raceway surface 171 and the raceway surface 169. Further, the vehicle body attachment flange 182 is provided on the outer peripheral surface (outer diameter surface) of the outer member 155, the flange 182 being attached to a knuckle (not shown).

A shaft section 173 of the outer joint member 153 is inserted into the shaft section 163 of the hub wheel 152. In the shaft section 173, a screw section 174 is formed at an end of a reverse cup-like section thereof. A spline section 175 is formed between the screw section 174 and the cup-like section 157. Further, a spline section 176 is formed on an inner peripheral surface (inner diameter surface) of the shaft section 163 of the hub wheel 152. When the shaft section 173 is inserted into the shaft section 163 of the hub wheel 152, the spline section 175 on the shaft section 173 side and the spline section 176 on the hub wheel 152 side are engaged.

A nut member 177 is screwed onto the screw section 174 of the shaft section 173 projecting from the shaft section 163. Then, the hub wheel 152 and the outer joint member 153 are connected. In this case, an inner end surface (rear surface) 178 of the nut member 177 and an outer end surface 179 of the shaft section 163 come into contact with each other and an end surface 180 on a shaft section side of the cup-like section 157 and an outer end surface 181 of the inner race 167 come into contact with each other. In other words, when the nut member 177 is tightened, the hub wheel 152 is nipped by the nut member 177 and the cup-like section 157 through intermediation of the inner race 167.

PRIOR ART DOCUMENTS

Citation List

Patent Literature 1: JP 2004-340311 A

SUMMARY OF THE INVENTION

Conventionally, as described above, the spline section 175 on the shaft section 173 side and the spline section 176 on the hub wheel 152 side are engaged. Therefore, because it is necessary to apply spline machining to both spline sections on the shaft section 173 side and on the hub wheel 152 side, cost increases. When the shaft section 173 is press-fitted into the hub wheel 152, recesses and projections of the spline section 175 on the shaft section 173 side and the spline section 176 on the hub wheel 152 side need to be aligned. In this case, if the shaft section 173 is press-fitted into the hub wheel 152 by aligning tooth surfaces thereof, recessed and projected teeth are likely to be damaged (torn). Further, if the shaft section 173 is press-fitted into the hub wheel 152 by aligning the spline sections to a large diameter of the recessed and projected teeth without aligning the tooth surfaces, a backlash in a circumferential direction tends to occur. If the backlash occurs in the circumferential direction in this way, transferability of rotation torque is low and abnormal noise tends to occur. Therefore, when the shaft section is press-fitted into the hub wheel by the spline fitting as in the prior art, it is difficult to remove damages to the recessed and projected teeth and the backlash in the circumferential direction at the same time.

Incidentally, even if adhesiveness of a male spline and a female spline is improved in the spline fitting to prevent the backlash in the circumferential direction from occurring, if driving torque acts, it is likely that relative displacement occurs in the male spline and the female spline. If such relative displacement occurs, fretting wear occurs. The splines are likely to cause abrasion because of dust of the wear. Consequently, it is likely that a backlash occurs in a spline fitting region or stable torque transmission cannot be performed.

Further, as described above, the outer member 155 is mounted to a knuckle on a vehicle body side in each wheel bearing device of this type. In recent years, a cylindrical surface formed of an outer diameter surface of the outer member 155 is provided as a press-fitting surface rather than providing the flange 182, and the press-fitting surface is press-fitted in the hole of the knuckle. However, reliability of a slip-off preventing effect is low only with such press fitting. Therefore, a snap ring is used as slip-off preventing means.

When the snap ring is used, at the time of maintenance, repairing, and the like, it is difficult to dismount the outer member from the knuckle and high drawing load is inevitably applied for disassembly. As a result, because a snap ring groove of the knuckle is broken, the knuckle also needs to be replaced, which involves higher cost of maintenance and repairing.

In view of the above-mentioned problem, a first object of the present invention is to provide a wheel bearing device in which a shaft section of an outer joint member of a constant-velocity universal joint is integrated with a hub wheel through intermediation of a recess-projection fitting structure over a long period of time. A second object of the present invention is to provide a low-cost driving wheel bearing device and an axle module which are manufactured by small work man-hours and assembly man-hours and at lower component replacement cost for maintenance and repairing.

A first wheel bearing device according to the present invention includes a wheel bearing including: an outer member having double-row outer raceway surfaces formed on an inner periphery of the outer member; an inner member having double-row inner raceway surfaces formed on an outer periphery of the inner member; and rolling elements arranged between the double-row outer raceway surfaces of the outer member and the double-row inner raceway surfaces of the inner member, the inner member including a hub wheel having a wheel attachment flange protrudingly provided on an outer diameter surface of the hub wheel, the hub wheel and a shaft section of an outer joint member of a constant-velocity universal joint being coupled to each other through intermediation of a recess-projection fitting structure, the shaft section being fitted and inserted in a hole of the hub wheel, in which: the recess-projection fitting structure is configured by providing projections extending in an axial direction on any one of an outer diameter surface of the shaft section of the outer joint member and an inner diameter surface of the hole of the hub wheel, press-fitting the projections in another of the outer diameter surface and the inner diameter surface along the axial direction, and forming recesses brought into close contact and fitted with respect to the projections by this press fitting in the another of the outer diameter surface and the inner diameter surface, the projections and the recesses being held in close contact with each other through intermediation of entire fitting contact regions; and the outer member is separable in the following configuration from a knuckle only by deformation or breakage of a snap ring caused by application of a drawing force larger than a drawing force acting in normal use, the configuration being obtained by fitting the outer member in a hole of the knuckle of a vehicle with a predetermined fit, forming annular grooves respectively in an outer peripheral surface of the outer member and an inner peripheral surface of the hole of the knuckle, and preventing the outer member from slipping off from the knuckle by the snap ring engaged with both the annular grooves.

According to the wheel bearing device of the present invention, the recess-projection fitting structure is configured by press-fitting the projections, which are provided on any one of the outer diameter surface of the stem shaft of the outer joint member and the inner diameter surface of the hole of the hub wheel and which extend in the axial direction, in the another of the outer diameter surface and the inner diameter surface along the axial direction, and by forming, with the projections, the recesses brought into close contact and fitted with respect to the projections in the another of the outer diameter surface and the inner diameter surface. That is, the shape of the projections is transferred to a recess formation surface on the opposite side. When the shape is transferred, because the projections bite into the recess formation surface on the opposite side, the hole is slightly expanded in diameter and allows movement in the axial direction of the projections. If the movement in the axial direction stops, the hole is reduced in diameter to return to the original diameter. Consequently, the entire recess fitting regions of the projections come into close contact with the recesses corresponding thereto. In this case, gaps may be inevitably formed only in small parts of the fitting regions in a recess formation process by the projections in some cases.

In this way, the entire recess fitting regions of the projections are held in close contact with the recesses corresponding thereto in the recess-projection fitting structure. Thus, in the fitting structure, gaps causing backlashes are not formed in the radial direction or the circumferential direction.

As an example of the bearing, in the case of adopting a double-row angular ball type, the bearing is constituted by an outer member having outer raceways in two rows, an inner member having inner raceways in two rows, and rolling elements (balls, in this case) interposed between the outer raceways and the inner raceways. The inner member corresponding to the bearing inner race includes a hub wheel and an inner race each having an inner raceway in one row, and can be fixed by fitting the inner race in the hub wheel and caulking the end portion of the hub wheel. There may be adopted orbital forming as an example of various known machining methods. By caulking the end portion of the hub wheel, an interval between the inner raceways in two rows is narrowed and bearing preload is applied. The outer member corresponding to the bearing outer race is in a fitting relation with the hole of the knuckle.

The outer joint member includes the shaft section and a mouth section for storing therein an inner joint member and torque transmission elements, and a boot is mounted to an opening end portion of the outer joint member. Generally, a maximum outer diameter of a boot band for tightening the boot from the outside is a maximum outer diameter of a drive shaft. Therefore, by setting an outer diameter of the outer member to be larger than the maximum outer diameter, the drive shaft can be taken out as a whole from the hole of the knuckle to an outboard side.

The drive shaft is constituted by an outboard-side constant-velocity universal joint, a shaft, and an inboard-side constant-velocity universal joint, and has a function of transmitting torque from an engine to wheels. The inboard-side constant-velocity universal joint is coupled to an output shaft of a transmission so as to allow torque transmission and to be movable in the axial direction by a slide spline. The outboards-side constant-velocity universal joint transmits torque through intermediation of the hub wheel.

By setting a fitting relation between the outer member and the hole of the knuckle as a tight-fitting relation, it is possible to prevent slip-off in the axial direction to some extent. However, excessive tightening margin cannot be set. Therefore, in order to realize, by performing reliable slip-off prevention, a fail-safe and a measure against the case of application of unexpected high load, the snap ring is used in combination in the present invention. In addition, because the outer member is separable from the knuckle only by deformation or breakage of the snap ring caused by application of the drawing force larger than the drawing force acting in normal use, the snap ring is not deformed or broken with the drawing force acting in normal use. Therefore, the separation of the outer member from the knuckle is regulated. Further, when the drawing force larger than the drawing force acting in normal use is applied, the snap ring is deformed or broken, and the outer member can be separated from the knuckle.

In this case, it is preferred to use a snap ring made of a material smaller in shearing stress than the knuckle and the outer member. Specifically, it is preferred that the shearing stress of the snap ring ranges from 5 to 150 MPa. Consequently, it is possible to effectively prevent the knuckle or the outer member from being deformed or broken earlier than the snap ring. There may be provided a thermoplastic synthetic resin as an example of materials of such a snap ring.

An outer-diameter side ridge line section of the snap ring may be chamfered. The chamfering may be performed in a case where the snap ring has a rectangular sectional shape. Alternatively, a snap ring having a circular sectional shape may be used. In other words, it is possible to adopt a snap ring made of a wire rod having a circular sectional shape. An outboard-side edge of the hole of the knuckle may be chamfered.

It is preferred that the outer member be fitted in the hole of the knuckle by pressfitting, and that at a time of this press fitting, after being reduced in diameter by being guided to the inner peripheral surface of the hole of the knuckle and then allowed to slide to the annular groove of the hole of the knuckle, the snap ring engaged with the annular groove in the outer peripheral surface of the outer member be engaged with the annular groove of the hole of the knuckle by being expanded in diameter in a state of corresponding to the annular groove of the hole of the knuckle. With this configuration, when the snap ring is inserted into the hole of the knuckle in a state of being mounted to the outer peripheral surface of the outer member and reduced in diameter by elastic deformation, and then moved in the axial direction, the snap ring is expanded in diameter by elasticity and expanded in the hole of the knuckle as soon as arriving at the position of the snap ring groove of the hole of the knuckle. In this way, the snap ring is engaged with both the snap ring grooves.

A second wheel bearing device according to the present invention includes a wheel bearing including: an outer member having double-row outer raceway surfaces formed on an inner periphery of the outer member; an inner member having double-row inner raceway surfaces formed on an outer periphery of the inner member; and rolling elements arranged between the double-row outer raceway surfaces of the outer member and the double-row inner raceway surfaces of the inner member, the inner member including a hub wheel having a wheel attachment flange protrudingly provided on an outer diameter surface of the hub wheel, the hub wheel and a shaft section of an outer joint member of a constant-velocity universal joint being separably coupled to each other through intermediation of a recess-projection fitting structure, the shaft section being fitted and inserted in a hole of the hub wheel, in which: the recess-projection fitting structure is configured by providing projections extending in an axial direction on any one of an outer diameter surface of the shaft section of the outer joint member and an inner diameter surface of the hole of the hub wheel, press-fitting the projections in another of the outer diameter surface and the inner diameter surface along the axial direction, and forming recesses brought into close contact and fitted with respect to the projections by this press fitting in the another of the outer diameter surface and the inner diameter surface, the projections and the recesses being held in close contact with each other through intermediation of entire fitting contact regions; and compressive residual stress is applied to the projections by compressive-residual-stress application means.

Because the compressive residual stress is applied to the projections, improvement of the wear resistance of the projections is realized. Specifically, by applying compressive residual stress, residual austenite can be transformed into martensite, and thus the wear resistance can be improved.

The compressive-residual-stress application means may include shot peening. The shot peening means a cold working method of accelerating and ejecting hard small balls called a shot material with a projecting device and the like and causing the small balls to collide against a working subject material at high speed. Although a surface of the working subject material is formed to be rough to some extent, a surface layer thereof is subjected to work hardening, and high compressive residual stress is applied thereto. Further, when a carburized material is used as the working subject material, residual austenite is transformed into deformation induced martensite.

The projections of the recess-projection fitting structure are provided on the stem shaft of the outer joint member of the constant-velocity universal joint, at least hardness of axial end portions of the projections is set to be higher than hardness of an inner diameter section of the hole of the hub wheel, and the stem shaft is press-fitted into the hole of the hub wheel from an axial end portion side of the projections. Thus, the recesses brought into close contact and fitted with respect to the projections are formed in the inner diameter surface of the hole of the hub wheel by the projections, and the recess-projection fitting structure may be configured. Further, the projections of the recess-projection fitting structure are provided on the inner diameter surface of the hole of the hub wheel, at least the hardness of the axial end portions of the projections is set to be higher than hardness of an outer diameter section of the stem shaft of the outer joint member of the constant-velocity universal joint, and the projections on a hub wheel side are press-fitted into the stem shaft of the outer joint member from the axial end portion side of the projections. Thus, the recesses brought into close contact and fitted with respect to the projections are formed in an outer diameter surface of the stem shaft of the outer joint member by the projections, and the recess-projection fitting structure may be configured.

It is preferred that hardness (Rockwell Hardness) of the projections be of from 50 HRC to 65 HRC, and hardness (Rockwell Hardness) of the opposite side on which the projections are press-fitted be of from 10 HRC to 30 HRC. When the hardness of the projections ranges from 50 HRC to 65 HRC, hardness sufficient for being press-fitted in the opposite side can be provided. Further, when the hardness on the opposite side ranges from 10 HRC to 30 HRC, the projections can be press-fitted.

It is preferred that the projections be hardened by heat hardening treatment, that is, by high-frequency heat treatment. The induction hardening is a hardening method employing the principle of inserting a section necessary for hardening into a coil through which a high-frequency current flows, generating Joule heat with an electromagnetic induction action, and heating a conductive substance.

It is preferred that a circumferential thickness of a projecting direction intermediate region of each of the projections be set to be smaller than a circumferential dimension at a position corresponding to the projecting direction intermediate region between the projections adjacent to each other in a circumferential direction. By setting the circumferential thickness in this way, it is possible to set a sum of circumferential thicknesses of projecting direction intermediate regions of the projections to be smaller than a sum of circumferential thicknesses at positions corresponding to the projecting direction intermediate regions in projections on an opposite side that fit in among the projections adjacent to one another in the circumferential direction.

It is preferred that the recess-projection fitting structure allow separation by application of the drawing force in the axial direction. In this case, if the drawing force in the axial direction is applied to the shaft section of the outer joint member, it is possible to remove the outer joint member from the hole of the hub wheel. After the shaft section of the outer joint member is drawn out from the hole of the hub wheel, if the shaft section of the outer joint member is press-fitted into the hole of the hub wheel again, it is possible to configure the recess-projection fitting structure in which the entire fitting contact regions of the projections and the recesses are held in close contact with each other.

It is preferred that the inner diameter surface of the hub wheel be provided with a wall section with which a distal end portion of the shaft section of the outer joint member of the constant-velocity universal joint comes into contact so that positioning of the shaft section in the axial direction is performed. By providing the wall section, bolt fixation is stabilized and a stable length can be secured as an axial length of the recess-projection fitting structure disposed along the axial direction.

By providing the wall section, a stable length can be secured as the axial length of the recess-projection fitting structure disposed along the axial direction.

A shaft section slip-off preventing structure may be provided between the shaft section of the outer joint member and the inner diameter surface of the hub wheel. It is possible to prevent the outer joint member of the constant-velocity universal joint from slipping off from the hub wheel in the axial direction by providing the shaft section slip-off preventing structure. At this time, it is preferred that the shaft section slip-off preventing structure be constituted by an end expanded-diameter caulking section of the shaft section of the outer joint member, the end expanded-diameter caulking section being engaged with the inner diameter surface of the hub wheel and being unsubjected to hardening treatment.

An axle module according to the present invention includes: an outboard-side constant-velocity universal joint; an inboard-side constant-velocity universal joint; and a shaft connected to the outboard-side constant-velocity universal joint on one end side of the shaft and connected to the inboard-side constant-velocity universal joint on another end side of the shaft, in which the constant-velocity universal joint of the wheel bearing device is used as the outboard-side constant-velocity universal joint. In this case, it is preferred that a maximum outer diameter of each of the outboard-side constant-velocity universal joint and the inboard-side constant-velocity universal joint be set to be smaller than an outer diameter of the outer member of the wheel bearing of the wheel bearing device.

According to the present invention, the gaps causing backlashes are not formed in the radial direction or the circumferential direction in the recess-projection fitting structure. Therefore, the entire fitting regions contribute to rotation torque transmission, stable torque transmission is possible, and abnormal noise is not generated. In addition, the recesses and the projections are held in close contact with each other without gaps, and hence strength of the torque transmitting regions is improved. Thus, weight reduction and compactification of the wheel bearing device can be realized. Further, because the snap ring is not deformed or broken with the drawing force acting in normal use, the separation of the outer member from the knuckle is regulated. Thus, this wheel bearing device is connected to the knuckle in a stable state.

Under the state in which the wheel bearing device is mounted to the knuckle, the snap ring is deformed or broken by application of the drawing force larger than the drawing force acting in normal use. Consequently, without damaging the annular groove of the knuckle, the annular groove of the outer member, and the like, the outer member, and by extension, the wheel bearing device can be separated as a whole from the knuckle.

By press-fitting the projections, which are provided on any one of the outer diameter surface of the stem shaft of the outer joint member and the inner diameter surface of the hole of the hub wheel and which extend in the axial direction, in the another of the outer diameter surface and the inner diameter surface along the axial direction, it is possible to form the recesses brought into close contact and fitted with respect to the projections. Thus, the recess-projection fitting structure can be surely formed. In addition, it is unnecessary to form in advance a spline section and the like in the member in which the recesses are formed, and thus work man-hours can be reduced. As a result, the following advantages can be obtained: excellent productivity; unnecessity of phasing of splines; realization of improvement of assemblability as a result of reduction of assembly man-hours; prevention of damage to the tooth surfaces during press fitting; and maintenance of a stable fitting state.

Further, by making the shearing stress of the snap ring smaller than those of the knuckle and outer member, a risk of damaging the knuckle and the outer member is eliminated at the time of dismounting the outer member from the knuckle for maintenance, repairing, and the like. Therefore, it is possible to minimize component replacement at the time of maintenance, repairing, and the like, and hence possible to provide a low-cost wheel bearing device as a whole.

When the snap ring having a chamfered outer-diameter side ridge line section or the snap ring having a circular sectional shape is used, it is possible to easily perform work of press-fitting the outer member in the hole of the knuckle. In other words, by adopting a snap ring made of a wire rod having a circular sectional shape, press-fitting work with respect to the hole of the knuckle is easily performed.

The outboard side of the hole of the knuckle is a side constituting an outer side of a vehicle in a state in which the knuckle is attached to the vehicle, and constitutes an inlet section at the time of press-fitting the outer member. Thus, when the outboard-side edge of the hole of the knuckle is chamfered, this chamfered section plays a role of gradually reducing the snap ring in diameter so as to allow the snap ring to be easily set into the snap ring groove of the outer member when the outer member is press-fitted in the knuckle. Therefore, the outer member can be smoothly inserted into the hole of the knuckle.

Further, when the snap ring is reduced in diameter by elastic deformation, the snap ring is expanded in diameter by elasticity as soon as arriving at the position of the snap ring groove of the hole of the knuckle, and is engaged with both the snap ring grooves. In this way, mounting work of the snap ring can be more easily performed.

According to the second wheel bearing device of the present invention, because compressive residual stress is applied to the projections, improvement of the wear resistance of the projections is realized. Therefore, even when driving torque acts and relative displacement supposedly occurs in the recess-projection fitting structure, it is possible to suppress occurrence of fretting wear, to thereby prevent abrasive wear in the recess-projection fitting structure. Consequently, a torque transmitting function can be stably exerted without backlash over a long period of time.

The compressive-residual-stress application means may include shot peening, and compressive residual stress can be stably increased by the peening. In addition, general-purpose shot peening can be used, and thus cost reduction can be realized.

Further, the projections of the recess-projection fitting structure are provided on the stem shaft of the outer joint member of the constant-velocity universal joint, the hardness of the axial end portions of the projections is set to be higher than the hardness of the inner diameter section of the hole of the hub wheel, and the stem shaft is press-fitted into the hole of the hub wheel from the axial end portion side of the projections. As a result, it is possible to increase the hardness on the stem shaft side and improve the rigidity of the stem shaft. Further, the projections of the recess-projection fitting structure are provided on the inner diameter surface of the hole of the hub wheel, the hardness of the axial end portions of the projections is set to be higher than the hardness of the outer diameter section of the stem shaft of the outer joint member of the constant-velocity universal joint, and the projections on the hub wheel side are press-fitted into the stem shaft of the outer joint member from the axial end portion side thereof. As a result, it is unnecessary to perform hardness treatment (heat treatment) on the stem shaft side. Therefore, the outer joint member of the constant-velocity joint member is excellent in productivity.

When the hardness of the projections ranges from 50 HRC to 65 HRC, hardness sufficient for being press-fitted in the opposite side can be provided, and thus press-fitting properties can be improved. When the hardness on the opposite side ranges from 10 HRC to 30 HRC, it is unnecessary to perform hardening treatment on the opposite side, and possible to realize improvement of productivity.

The projections can be hardened by heat hardening treatment, that is, by high-frequency heat treatment. Thus, the following advantages of the high-frequency heat treatment can be realized (local heating can be performed and hardening condition can be easily adjusted; oxidation is reduced because heating can be performed in a short period of time; hardening distortion is reduced in comparison with other methods; surface hardness is high and excellent wear resistance can be obtained; selection of the depth of the hardened layer is relatively easy; and automation is easily realized and assembly into a machine process line can be realized). In particular, high compressive residual stress can be applied by combining the shot peening with the high-frequency heat treatment, and thus improvement of fatigue strength can be expected.

By setting the circumferential thickness of the projecting direction intermediate region of each of the projections to be smaller than a dimension at the position corresponding to the intermediate region between the projections adjacent to each other in the circumferential direction, it is possible to increase the circumferential thickness of the projecting direction intermediate region of each of the projections on the side in which the recesses are formed (projections among the formed recesses). Therefore, it is possible to increase a shearing area of each of the projections on the opposite side (projections having low hardness among the recesses because the recesses are formed) and secure torsion strength. Moreover, because a tooth thickness of the projections on the high hardness side is small, it is possible to reduce press-fitting load and realize improvement of press-fitting properties.

Further, when the recess-projection fitting structure allows separation by application of the drawing force in the axial direction with respect to the shaft section of the outer joint member, the outer joint member can be removed from the hole of the hub wheel, and after being removed, can be press-fitted therein again. Therefore, it is possible to more easily perform maintenance, repairing, inspection, replacement work of the components of the wheel bearing device. In addition, it is possible to replace only the components necessary to be replaced, and to save component replacement cost for maintenance and repairing. Therefore, a low-cost wheel bearing device can be provided.

When the positioning inner wall is provided and positioning is performed thereby, dimension accuracy of this wheel bearing device is stabilized, and it is possible to secure a stable length as an axial length of the recess-projection fitting structure disposed along the axial direction and realize improvement of torque transmission performance.

With the shaft section slip-off preventing structure, it is possible to effectively prevent the shaft section of the outer joint member from slipping off in the axial direction from the hole of the hub wheel. Consequently, it is possible to maintain a stable connected state and realize improvement of a quality of the wheel bearing device. Further, a diameter expansion work can be more easily performed when the end expanded-diameter caulking section is unsubjected to hardening treatment.

The axle module in which the wheel bearing device as described above is used can be manufactured by small work man-hours and assembly man-hours. When deficiencies leading to replacement of the wheel bearing device occur, it is possible to separate this wheel bearing device from the knuckle, separate the wheel bearing and the constant-velocity universal joints from each other, replace only the components necessary to be replaced, and save component replacement cost for maintenance and repairing. In particular, by setting the maximum outer diameters of the outboard-side constant-velocity universal joint and the inboard-side constant-velocity universal joint to be smaller than the outer diameter of the outer member of the wheel bearing of the wheel bearing device, those constant-velocity universal joints can be easily caused to pass with respect to the knuckle. Therefore, assemblability of the axle module can be improved.

DETAILED DESCRIPTION OF THE INVENTION

Figure 1:
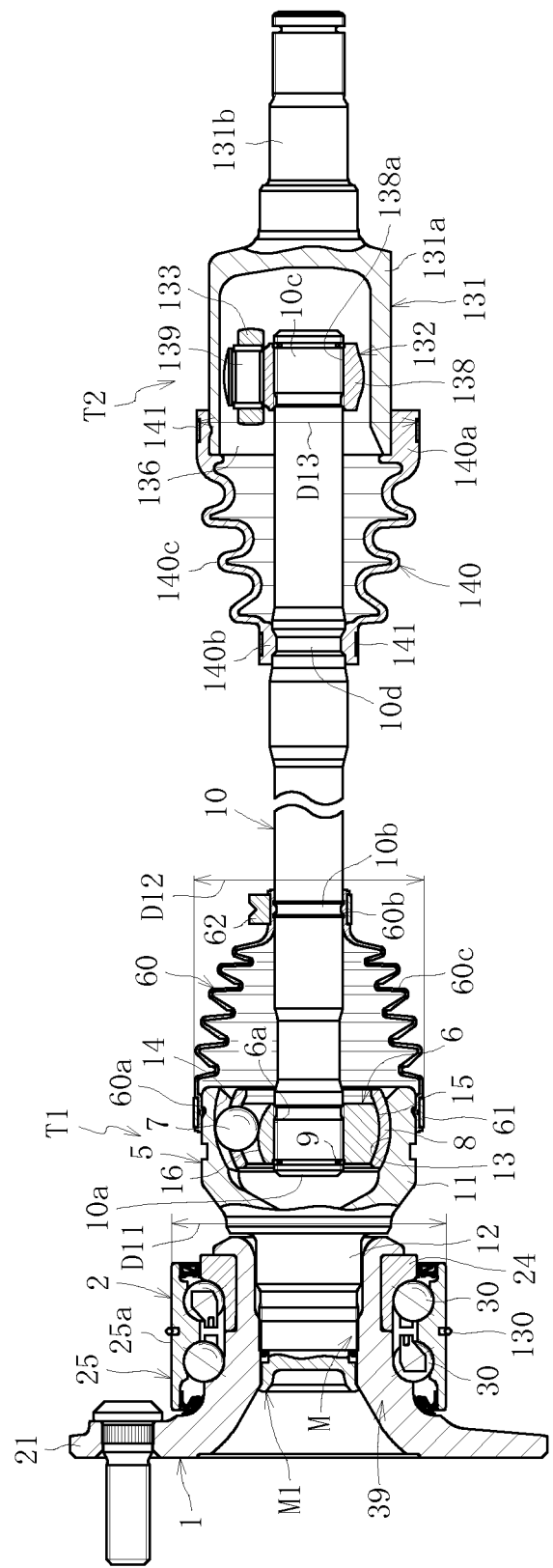
FIG. 1 is a vertical sectional view of an axle module according to a first embodiment of the present invention.

FIG. 1 illustrates an example of an axle module. The axle module can be roughly classified as a wheel-bearing-device part and a drive-shaft part. The wheel bearing device is obtained by unifying an outer joint member of an outboard-side constant-velocity universal joint T1, a hub wheel 1, and a roller bearing 2. The drive shaft includes a shaft 10, and the outboard-side constant-velocity universal joint T1 and an inboard-side constant-velocity universal joint T2 mounted to respective both ends thereof. As just described above, the wheel bearing device and the drive shaft include (the outer joint member of) the outboard-side constant-velocity universal joint T1 as a common component.

Although a Rzeppa type constant-velocity universal joint is exemplified as the outboard-side constant-velocity universal joint T1, there may be adopted other fixed type constant-velocity universal joints such as an undercut free type one including linear sections formed in groove bottoms of ball grooves. The constant-velocity universal joint T1 includes, as main members, a joint outer race 5 as the outer joint member, an joint inner race 6 as an inner joint member, a plurality of balls 7 as torque transmission elements, and a cage 8 for retaining the balls 7.

Figure 5:
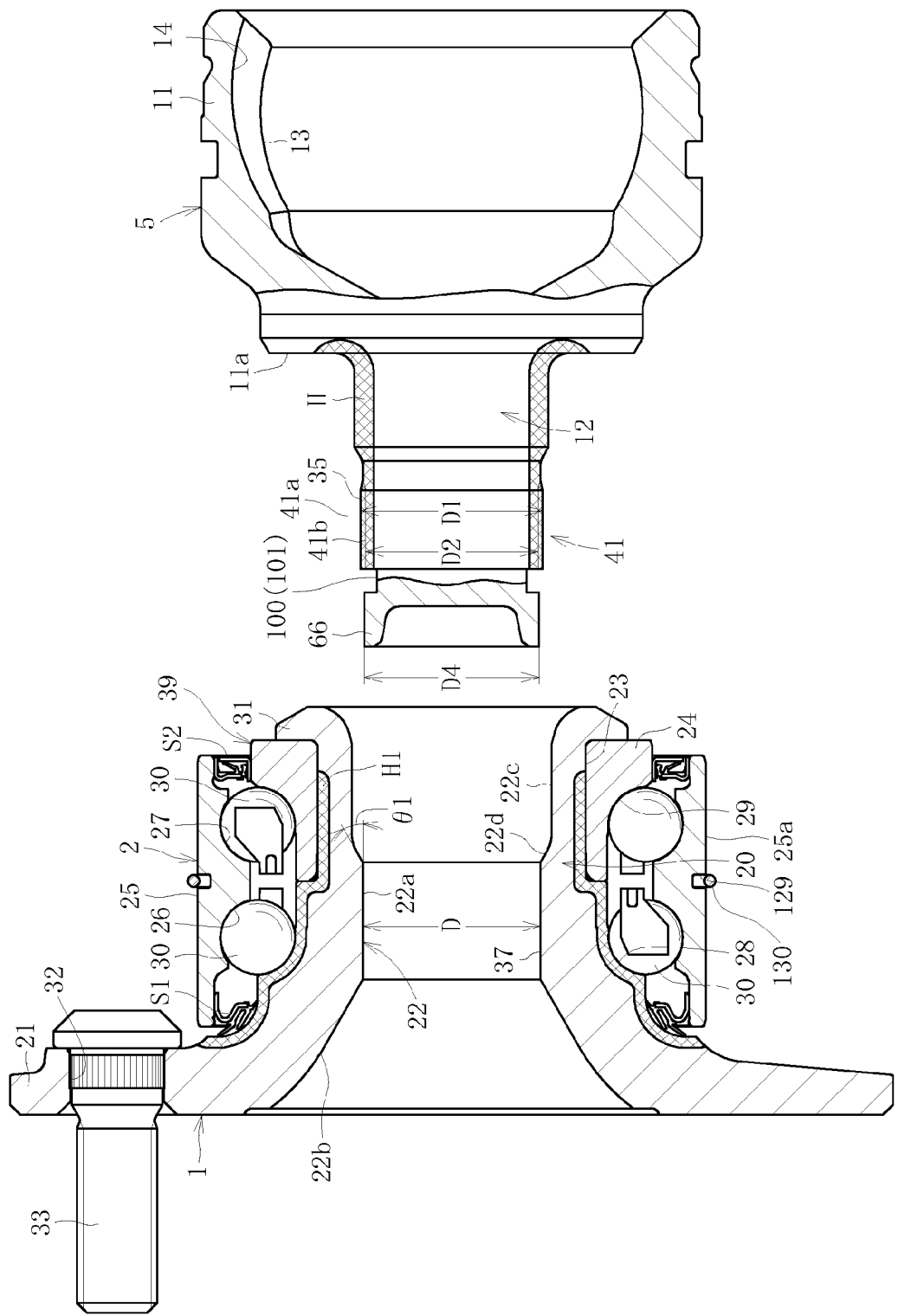
FIG. 5 is a vertical sectional view illustrating a state of the wheel bearing device of FIG. 2 prior to press fitting.

The joint outer race 5 is made of medium carbon steel such as S53C which contains 0.40 to 0.80 weight % of carbon, formed of a mouth section 11 and a shaft section (stem section) 12, as illustrated in FIG. 5, a back surface 11a is formed in a boundary section therebetween. The mouth section 11 is formed in a cup-like shape and therefore opens at its one end, and provided with a plurality of axially extending ball grooves 14 formed in its spherical inner surface (inner spherical surface) 13 at equal circumferential intervals. As indicated by cross hatching, on the shaft section 12 of the joint outer race 5, a predetermined hardened layer H in which surface hardness is set in a range of from 58 to 64 HRC (Rockwell Hardness C-Scale) is formed from the back surface 11a to the shaft section. Note that, a distal end of the shaft section 12 is not subjected to surface hardening treatment, and thus is in a raw state.

The joint inner race 6 is made of medium carbon steel such as S53C which contains 0.40 to 0.80 weight % of carbon, and includes a spline hole 6a at its axis section in which spline fitting is effected with respect to a spline shaft 10a at an end of the shaft 10, to thereby be coupled to the shaft 10 so that torque can be transmitted. The shaft 10 is prevented from being slipped off from the joint inner race 6 by a snap ring 9 attached to the end portion of the shaft 10. The joint inner race 6 has a spherical outer surface (outer spherical surface) 15, and has a plurality of axially extending ball grooves 16 formed at equal circumferential intervals.

The ball grooves 14 of the outer race 5 and the ball grooves 16 of the joint inner race 6 are paired with each other, and one ball 7 is incorporated into a ball track formed by each pair of ball grooves 14, 16 so as to be capable of rolling. The balls 7 are interposed between the ball grooves 14 of the joint outer race 5 and the ball grooves 16 of the joint inner race 6 to transmit torque. All the balls 7 are retained in the same plane by the cage 8. The cage 8 is interposed between the joint outer race 5 and the joint inner race 6 in a spherical-surface contact state. Specifically, the cage 8 comes into contact with the inner spherical surface 13 of the joint outer race 5 through intermediation of the spherical outer surface thereof and comes into contact with the outer spherical surface 15 of the joint inner race 6 through intermediation of the spherical inner surface thereof.

In order to prevent leakage of lubricant filling the inside and to prevent intrusion of foreign matters from the outside, the opening portion of the mouth section 11 is covered with a boot 60. The boot 60 is formed of a large diameter section 60a, a small diameter section 60b, and a bellows section 60c for connecting the large diameter section 60a and the small diameter section 60b to each other. The large diameter section 60a is mounted to the opening portion of the mouth section 11 and fastened by a boot band 61. The small diameter section 60b is mounted to a boot mounting section 10b and fastened by a boot band 62.

Although a tripod type constant-velocity universal joint is exemplified as the inboard-side constant-velocity universal joint T2, there may be adopted other plunging type constant-velocity universal joints such as a double-offset type one. The constant-velocity universal joint T2 includes, as main components, a joint outer race 131 as an outer joint member, a tripod 132 as an inner joint member, and rollers 133 as torque transmission elements.

The joint outer race 131 is made of medium carbon steel such as S53C which contains 0.40 to 0.80 weight % of carbon, formed of the mouth section 131a and a stem section 131b, and allowed to be connected to an output shaft of a differential through intermediation of the stem section 131b so that torque can be transmitted. The mouth section 131a is formed in a cup-like shape and therefore opens at its one end, and provided with axially extending track grooves 136 formed at circumferentially trisected positions on an inner periphery thereof. Thus, the mouth section 131a exhibits a bell-like shape in horizontal cross-section. On outer peripheries of the track grooves 136 and stem section 131b, a predetermined hardened layer in which surface hardness is set in a range of from 58 to 64 HRC is formed by induction hardening.

The tripod 132 is formed of bosses 138 and leg shafts 139, and coupled to an end spline 10c of the shaft 10 through intermediation of a spline hole 138a of each of the bosses 138 so that torque can be transmitted. The leg shafts 139 radially project from circumferentially trisected positions of the bosses 138. The rollers 133 are rotatably supported by the leg shafts 139, respectively.

Also in this section, the opening portion of the joint outer race 131 is covered with a boot 140 mounted thereto. With this configuration, it is possible to prevent leakage of lubricant filling the inside and to prevent intrusion of foreign matters from the outside. The boot 140 is formed of a large diameter section 140a, a small diameter section 140b, and a bellows section 140c between the large diameter section 140a and the diameter section 140b. The large diameter section 140a is mounted to an opening end portion of the mouth section 131a and fastened by a boot band 141, and the small diameter section 140b is mounted to a boot mounting section 10d of the shaft 10 and fastened by the boot band 141.

Figure 2:
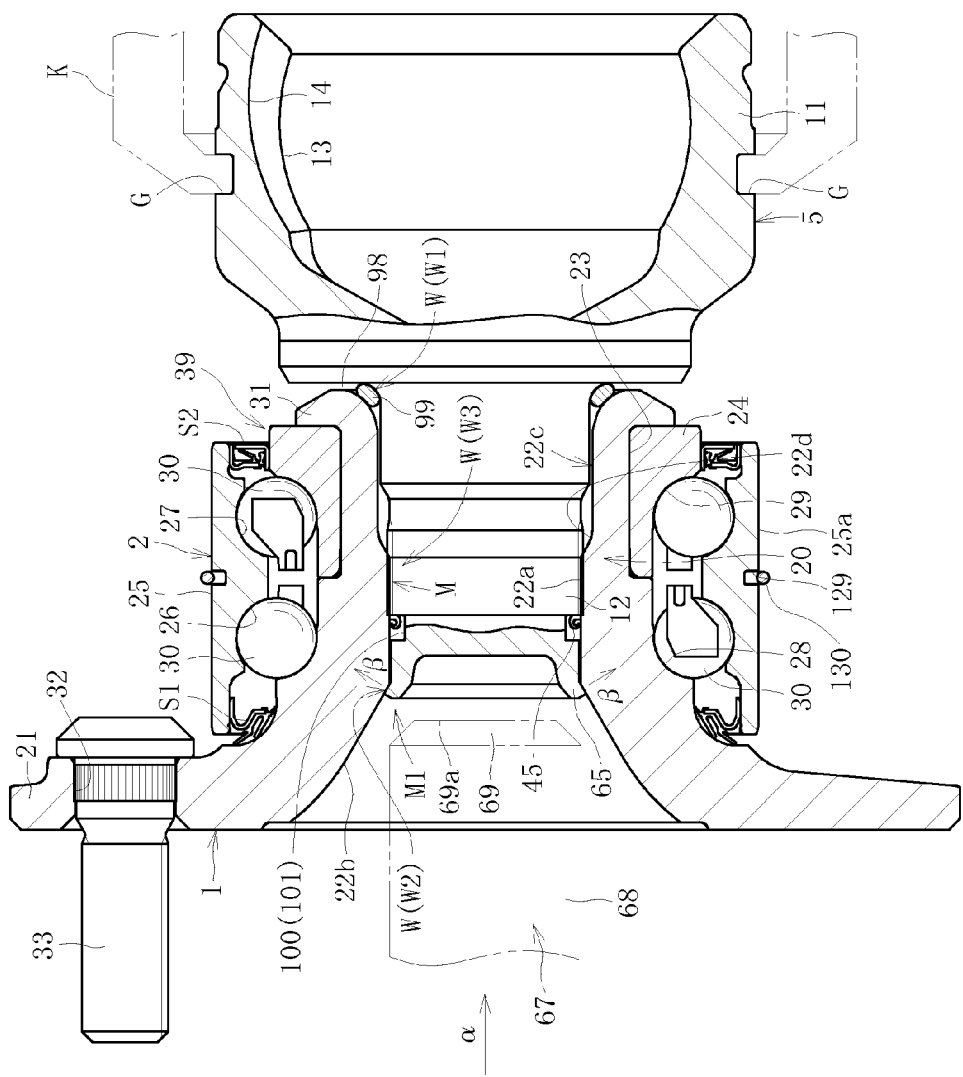
FIG. 2 is an enlarged sectional view of a wheel bearing device in the axle module of FIG. 1.

Next, the hub wheel 1 is made of medium carbon steel such as S53C which contains 0.40 to 0.80 weight % of carbon, and has, as is apparent from FIGS. 2 and 5, a cylindrical section 20 and a flange 21 provided at an outboard-side end portion of the cylindrical section 20. The flange 21 of the hub wheel 1 is provided with a bolt inserting hole 32, and a wheel and a brake rotor are fixed to the flange 21 by a hub bolt 33 embedded in the bolt inserting hole 32. A small diameter section 23 is formed at an inboard-side end portion of the cylindrical section 20, and an inner race 24 is fitted thereto. Then, an end portion of the small diameter section 23 is caulked to an outer diameter side, and a caulking section 31 thus formed is abutted to an end surface of the inner race 24. In this way, the inner race 24 is fixed to the hub wheel 1, and simultaneously, preload is applied to the bearing 2.

The cylindrical section 20 has a hole 22 (FIG. 5) passing through its axis section. The hole 22 includes, around a fitting hole 22a at an axial intermediate section as a center, a tapered hole 22b positioned on an outboard side and a large diameter section 22c on an inboard-side. In the fitting hole 22a, the shaft section 12 of the joint outer race 5 of the constant-velocity universal joint T1 and the hub wheel 1 are coupled to each other through intermediation of a recess-projection fitting structure M described later. Further, the fitting hole 22a and the large diameter section 22c are connected to each other through intermediation of a tapered section 22d. The tapered section 22d is reduced in diameter in a press-fitting direction at the time of coupling the hub wheel 1 and the shaft section 12 of the joint outer race 5 to each other. An angle θ1 (FIG. 5) of the tapered section 22d is set to 15° to 75°, for example.

As indicated by cross hatching of FIG. 5, on the hub wheel 1, a predetermined hardened layer H1 in which surface hardness is set in a range of from 58 to 64 HRC is formed by induction hardening over a range from a seal land section with which a seal lip of an outboard-side seal member S1 comes into sliding-contact to a part of the small diameter section 23, the range including an inner raceway surface 28. With this configuration, wear resistance of the seal land section is improved, and in addition, the strength of the hub wheel 1 itself with respect to moment load and the like is increased, and thus durability thereof is improved. Further, it is preferred that a section subjected to plastic deformation so as to be formed as a caulking section 31 remain an unhardened section having hardness the same as that of a surface of a raw material after forging.

The roller bearing 2 includes, as main components, an outer member 25 corresponding to a bearing outer race, an inner member 39 corresponding to a bearing inner race, and rolling elements 30. The outer member 25 is made of high-carbon chrome bearing steel such as SUJ2, and has an outer peripheral surface formed in a cylindrical shape and double-row outer raceway surfaces (outer raceway) 26 and 27 formed on an inner periphery thereof. The inner member 39 in this case is formed of the hub wheel 1 and the inner race 24. Specifically, the first inner raceway surface (inner raceway) 28 is formed on a flange 21 side of the cylindrical section 20 of the hub wheel 1, and a second inner raceway surface (inner raceway) 29 is formed on an outer periphery of the inner race 24 fitted to the small diameter section 23 of the hub wheel 1. A hardened layer in which surface hardness is set in a range of from 58 to 64 HRC is formed on the raceway surface 28 by induction hardening. The inner race 24 is made of high-carbon chrome bearing steel such as SUJ2, and a hardened layer in which surface hardness is set in a range of from 58 to 64 HRC is formed on the raceway surface 29 by immersion quenching. In this context, the first outer raceway surface 26 and the first inner raceway surface 28 are opposed to each other, the second outer raceway surface 27 and the second inner raceway surface 29 are opposed to each other, and the rolling elements 30 are interposed therebetween. The rolling elements 30 in each of the rows are retained by a cage at predetermined intervals.

In order to prevent leakage of lubricant filling the inside and to prevent intrusion of foreign matters from the outside, the seal member S1 and a seal member S2 are mounted around both-end opening portions of the outer member 25. Note that, as described later, the outer member 25 is allowed to be fitted to an inner peripheral surface 34a of a hole of a knuckle 34 (refer to FIG. 9) extending from a vehicle suspension system.

Figure 3A:
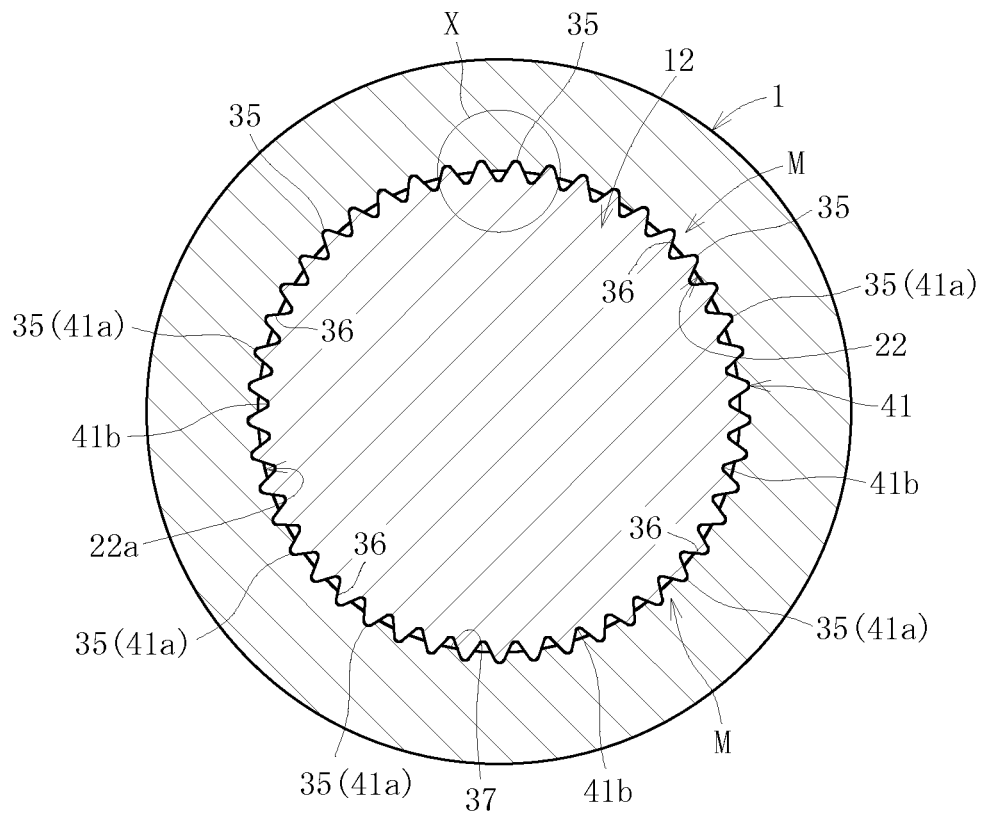
FIG. 3A is an enlarged sectional view of a recess-projection fitting structure of the wheel bearing device of FIG. 2.

The hub wheel 1 and the shaft section 12 of the joint outer race 5 of the constant-velocity universal joint T1 are coupled to each other through intermediation of the recess-projection fitting structure M. As illustrated in FIG. 3A, the recess-projection fitting structure M is formed, for example, of axially extending projections 35 provided to an end portion of the shaft section 12, and recesses 36 formed in the inner diameter surface of the hole 22 of the hub wheel 1 (inner diameter surface 37 of shaft section fitting hole 22a in this case). The entire regions of the fitting contact regions 38 of the projections 35 and the recesses 36 fit in the projections 35 are held in close contact. Specifically, a plurality of the projections 35 are arranged at a predetermined circumferential pitch on the outer peripheral surface of the opposite mouth section side of the shaft section 12, and a plurality of the recesses 36 fitting in the projections 35 are formed circumferentially in the inner diameter surface 37 of the fitting hole 22a of the hole 22 of the hub wheel 1. That is, over the entire circumference, the projections 35 and the recesses 36 fitting thereto are tightly fitted in each other.

In this case, each of the projections 35 is formed in a triangular shape (ridge shape) having a vertex of a projected circular shape in cross-section. Recess fitting regions of the projections 35 are ranges A illustrated in FIG. 3B, specifically, ranges from halfway sections of the ridges in cross-section to the tops of the ridges. Further, a gap 40 is each formed further on an inner diameter side than the inner diameter surface 37 of the hub wheel 1 between the projections 35 adjacent to each other in the circumferential direction.

As described above, bearing preload is applied by caulking the end portion on the inboard side of the hub wheel 1 and abutting the caulking section 31 to the end surface of the inner race 24. Thus, it is unnecessary to abut the back surface 11a of the mouth section 11 of the joint outer race 5 to the inner race 24, and possible to configure a non-contact structure in which the mouth section 11 is not brought into contact with an end portion (caulking section 31 in this case) of the hub wheel 1. Thus, as illustrated in FIG. 2, a gap 98 exists between the caulking section 31 of the hub wheel 1 and the back surface 11a of the mouth section 11. Note that, without problems of abnormal noise, it is possible to configure a structure in which the mouth section 11 and the caulking section 31 are held in contact with each other.

Figure 7A:
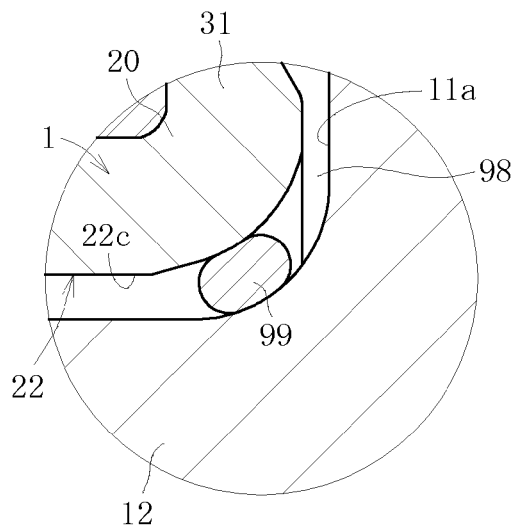
FIG. 7A is a sectional view of a seal member part of the wheel bearing device of FIG. 2, illustrating a case where an O-ring is used.
Figure 7B:
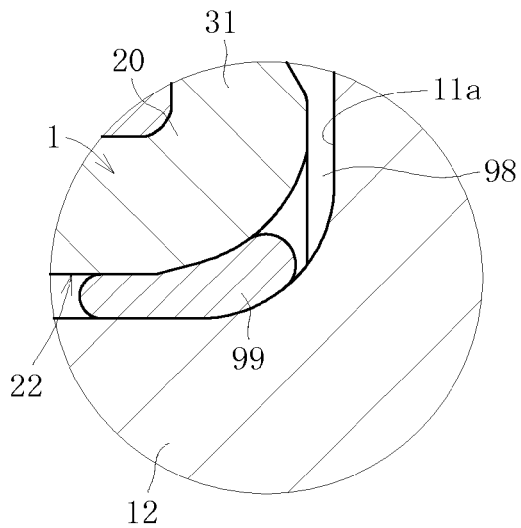
FIG. 7B is a sectional view of the seal member part of the wheel bearing device of FIG. 2, illustrating a case where a gasket is used.

Foreign-matter intrusion preventing means W for the recess-projection fitting structure M are respectively provided further on the inboard side (corresponding to an inner side of the vehicle in a state in which the recess-projection fitting structure M is mounted to the vehicle) than the recess-projection fitting structure M and further on the outboard side (corresponding to an outer side of the vehicle in a state in which the recess-projection fitting structure M is mounted to the vehicle) than the recess-projection fitting structure M. Specifically, as enlargedly illustrated in FIGS. 7A and 7B, foreign-matter intrusion preventing means W1 on the inboard side (FIG. 2) is formed of a seal member 99 arranged in the gap 98 between the caulking section 31 of the hub wheel 1 and the back surface 11a of the mouth section 11. In this case, the gap 98 includes a radial section between the caulking section 31 of the hub wheel 1 and the back surface 11a of the mouth section 11, and an axial section between the large diameter section 22c of and the shaft section 12. The seal member 99 is arranged near a corner at which the radial section and the axial section of the gap 98 border each other. Note that, the seal member 99 may be something like an O-ring illustrated in FIG. 7A, or may be something like a gasket illustrated in FIG. 7B.

Figure 4:
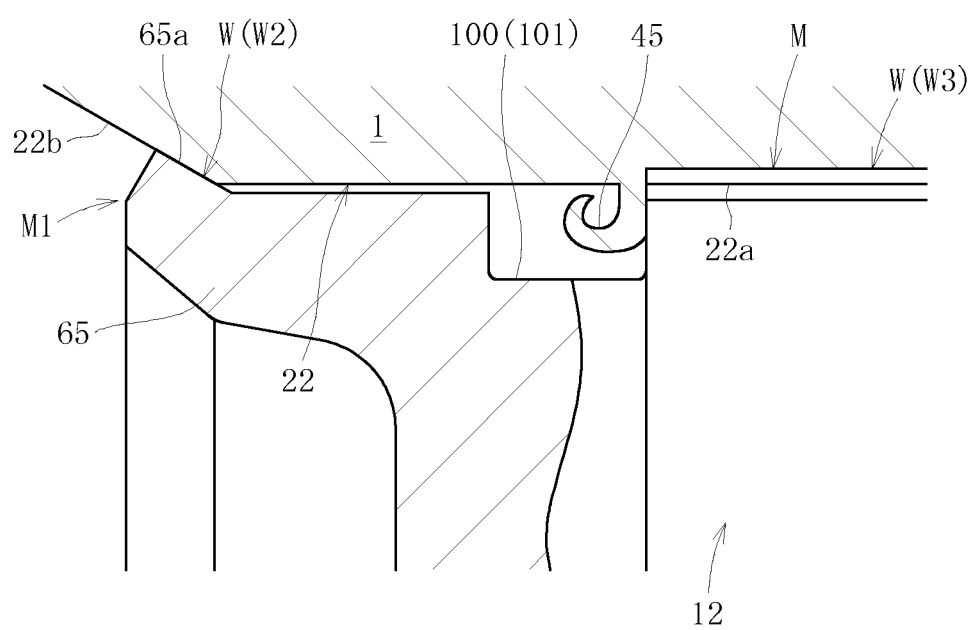
FIG. 4 is a partially enlarged view of the wheel bearing device of FIG. 2.

As illustrated in FIG. 2 and FIG. 4, the outboard side foreign-matter intrusion preventing means W2 can be formed of a seal material (not shown) interposed between an end expanded-diameter caulking section 65 serving as an engagement section and the inner diameter surface of the tapered hole 22b. In this case, a seal material is applied to the end expanded-diameter caulking section 65. That is, there is applied a seal material (seal agent) selected from among various resins curable after the application and capable of exerting sealing property between the end expanded-diameter caulking section 65 and the inner diameter surface of the tapered hole 22b. Note that, as the seal material, there is selected one that does not deteriorate in the atmosphere in which the wheel bearing device is used.

It is also possible to interpose a seal material in the fitting contact regions 38 between the projections 35 and the recesses 36, and between gaps 40, to thereby form a foreign-matter intrusion preventing means W (W3). In this case, there is applied to the surfaces of the projections 35 a seal material (seal agent) selected from among various resins curable after the application and capable of exerting sealing property in the fitting contact regions 38 and between the gaps 40.

A shaft section slip-off preventing structure M1 is provided between the end of the shaft section 12 of the joint outer race 5 and the inner diameter surface 37 of the hub wheel 1. This shaft section slip-off preventing structure M1 includes the end expanded-diameter caulking section (tapered locking piece) 65 that extends from the end of the shaft section 12 of the joint outer race 5 to the outboard side and locks to a tapered hole 22b. In other words, the tapered locking piece 65 includes a ring-like member that is expanded in diameter from the inboard side to the outboard side. At least a part of an outer peripheral surface 65a thereof comes into press-contact or contact with the tapered hole 22b.

When the wheel bearing device is assembled, as described later, the recesses 36 are formed by the projections 35 by press-fitting the shaft section 12 of the joint outer race 5 into the hub wheel 1. At this time, when the shaft section 12 is press-fitted into the hub wheel 1, a material is extruded from the recesses 36 formed by the projections 35 and an extruded portion 45 (refer to FIG. 4) is formed. The extruded portion 45 is equivalent to a volume of the material of the recesses 36 in which recess fitting regions of the projections 35 are fitted in. The extruded portion 45 includes the material extruded from the recesses 36 to be formed, the material cut for forming the recesses 36, or the material extruded and cut.

Therefore, a pocket section (storage section) 100 for storing the extruded portion 45 is provided to the shaft section 12.

Here, the pocket section (storage section) 100 is formed by providing a circumferential groove 101 at a shaft edge of a spline 41 of the shaft section 12. The tapered locking piece (end expanded-diameter caulking section) 65 configuring the above-mentioned shaft section slip-off preventing structure M1 is positioned further on an opposite spline side than the circumferential groove 101.

Next, a manufacturing method of fitting the recess-projection fitting structure M is described. In this case, as illustrated in FIG. 5, surface hardening treatment is applied to an outer diameter section of the shaft section 12. The spline 41 including projections 41a and recesses 41b extending along the axial direction is formed in the hardened layer H. Therefore, the projections 41a of the spline 41 are hardened and change to the projections 35 of the recess-projection fitting structure M. Note that, a range of the hardened layer H here is, as indicated by a cross hatching, from an outer edge of the spline 41 to a part of the back surface 11a of the joint outer race 5. Here, as the surface hardening treatment, various kinds of heat treatments such as induction hardening, and carburizing and quenching can be adopted. The induction hardening is a hardening method applying the principle of inserting a section necessary for hardening into a coil through which a high-frequency current flows, generating Joule heat with an electromagnetic induction action, and heating a conductive substance. The carburizing and quenching is a method of causing carbon to intrude/spread from the surface of a low carbon material and performing hardening after that. A module of teeth of the spline 41 of the shaft section 12 is set to be equal to or smaller than 0.5. The module is a value obtained by dividing a pitch circle diameter with the number of teeth.

Further, a hardened layer H1 by the induction hardening is formed on the outer diameter side of the hub wheel 1, and the inner diameter side of the hub wheel is left in an unhardened state. A range of the hardened layer H1 in this case is, as indicated by cross hatching, from a base section of the flange 21 to the vicinity of the caulking section of the small diameter section 23 in which the inner race 24 fits. If the induction hardening is performed, the surface can be hard and hardness of a material in the inside can be kept as it is. Therefore, the inner diameter side of the hub wheel 1 can be maintained in the unhardened state. A hardness difference between the hardened layer H of the shaft section 12 of the joint outer race 5 and the unhardened section of the hub wheel 1 is set to be equal to or larger than 20 points in HRC. As specific examples, the hardness of the hardened layer H is set to about 50 HRC to 65 HRC and the hardness of the unhardened section is set to about 10 HRC to 30 HRC.

Compressive residual stress is applied to the projections 35 subjected to heat hardening treatment in this way by compressive-residual-stress application means. The compressive-residual-stress application means may include shot peening. The shot peening means a cold working method of accelerating and ejecting hard small balls called a shot material with a projecting device and the like and causing the small balls to collide against a working subject material at high speed. Although a surface of the working subject material, which is subjected to shot peening, is formed to be rough to some extent, a surface layer thereof is subjected to work hardening, and high compressive residual stress is applied thereto. Further, residual austenite of the working subject material is transformed into deformation induced martensite.

In this case, a projecting direction intermediate region of each of the projections 35 corresponds to a position of a recess forming surface before recess formation (in this case, inner diameter surface 37 of hole 22 of hub wheel 1). That is, as illustrated in FIG. 5, an inner diameter dimension D of the inner diameter surface 37 of the hole 22 is set to be smaller than a maximum outer diameter of the projections 35, i.e., a maximum outer diameter dimension (diameter of circumscribed circle) D1 of a circle connecting vertexes of the projections 35 as the projections 41a of the spline 41, and is set to be larger than an outer diameter dimension of a shaft section outer diameter surface among the projections, i.e., a diameter dimension D2 of a circle connecting bottoms of the recesses 41b of the spline 41. In other words, the dimensions are set in a relation of D2<D<D1.

The structure of the spline and the processing method therefor are well-known. In other words, the spline can be formed by various machining methods such as rolling, cutting, pressing, and drawing. Further, as the surface hardening treatment, various kinds of heat treatments such as induction hardening, and carburizing and quenching can be adopted.

A short cylindrical section 66 for forming the tapered locking piece 65 (FIGS. 2 and 4) is projected from an outer circumferential edge of an end surface of the shaft section 12 in the axial direction. An outer diameter D4 of the short cylindrical section 66 is set to be smaller than an inner diameter dimension D of a fitting hole 22a of the hole 22. Consequently, this short cylindrical section 66 performs aligning work when the shaft section 12 is press-fitted into the hole 22 of the hub wheel 1 as described later.

As illustrated in FIG. 5, the shaft section 12 of the joint outer race 5 is inserted (press-fitted) into the hub wheel 1 under a state in which the axis of the hub wheel 1 and the axis of the joint outer race 5 are aligned. Note that, the seal member 99 (refer to FIG. 2) is fitted in the base section of the shaft section 12 of the joint outer race 5 (mouth section side) in advance. In this case, because the tapered section 22d that is reduced in diameter in a press-fitting direction is formed in the hole 22 of the hub wheel 1, this tapered section 22d exerts a guiding effect at the start of press fitting. Further, the inner diameter dimension D of the inner diameter surface 37 of the hole 22, the outer diameter dimension D1 of the projections 35, and the inner diameter dimension D2 of the recesses of the spline 41 are in the relation described above. Moreover, the hardness of the projections 35 is larger than the hardness of the inner diameter surface 37 of the hole 22 by 20 points or more. Therefore, if the shaft section 12 is press-fitted into the hole 22 of the hub wheel 1, the projections 35 bite in the inner diameter surface 37 of the fitting hole 22a. The projections 35 form the recesses 36, in which the projections 35 fit, along the axial direction.

By the press fitting, as illustrated in FIG. 3A, the entire fitting contact regions 38 of the projections 35 at the end of the shaft section 12 and the recesses 36 fitting therein are held in close contact with each other. In other words, a shape of the projections 35 is transferred onto a recess formation surface on the opposite side (in this case, inner diameter surface 37 of fitting hole 22a). Because the projections 35 bite in the inner diameter surface 37 of the fitting hole 22a, the fitting hole 22a is slightly expanded in diameter and allows movement in the axial direction of the projections 35. If the movement in the axial direction stops, the fitting hole 22a is reduced in diameter to return to the original diameter. In other words, the hub wheel 1 is elastically deformed in the radial direction when the projections are press-fitted, and preload equivalent to the elastic deformation is applied to a tooth surface of the projections 35 (surface of the recess fitting region). Therefore, it is possible to surely form the recess-projection fitting structure M in which the entire recess fitting regions of the projections 35 are held in close contact with the recesses 36 corresponding thereto. In this way, the entire regions of the recess fitting region of the projections 35 are held in close contact with the recesses 36 corresponding thereto. However, gaps may be inevitably formed only in a small part of the fitting region in a recess formation process by the projections in some cases.

Further, the seal member 99 is mounted to the base section of the shaft section 12 of the joint outer race 5 (mouth section side). Therefore, the gap 98 between the caulking section 31 of the hub wheel 1 and the back surface 11a of the mouth section 11 is closed by the seal member 99 and therefore is hermetically-sealed in a press fitting completion state.

When the shaft section 12 of the joint outer race 5 is press-fitted in the hole 22 of the hub wheel 1, a step surface G is provided on the outer diameter surface of the mouth section 11 of the joint outer race 5 as illustrated in FIG. 2 and the like. A press-fitting jig K only has to be engaged with this step surface G to apply press-fitting load (axial load) from this press-fitting jig K to the step surface G. Note that, the step surface G may be provided over the entire circumferential direction or at a predetermined pitch in a circumferential direction. Therefore, the press-fitting jig K to be used only has to be capable of bearing axial load corresponding to those step surfaces G.

Although the recess-projection fitting structure M is formed in this way, it is desired that the axial position of the recess-projection fitting structure M be positions avoiding the positions right below the raceway surfaces 26, 27, 28, and 29 of the roller bearing 2. The positions avoiding the positions right below the raceway surfaces 26, 27, 28, and 29 are positions not corresponding to ball contacting positions of the raceway surfaces 26, 27, 28, and 29 in the radial direction.

As is understood from FIG. 5, the short cylindrical section 66 projects from the fitting hole 22a to a tapered hole 22b side under a state in which the shaft section 12 of the joint outer race 5 and the hub wheel 1 are integrally formed through intermediation of the recess-projection fitting structure M. In this context, as illustrated by the imaginary lines of FIG. 2, this short cylindrical section 66 is expanded in diameter, that is, plastically deformed to the outer side in the radial direction by the jig 67. The jig 67 includes a columnar main body section 68 and a truncated cone section 69 continuously connected to a distal end of the main body section 68. In the truncated cone section 69, a tilt angle of a tilting surface 69a thereof is set to be substantially the same as a tilt angle of the tapered hole 22b, and an outer diameter of a distal end of the truncated cone section 69 is set to a dimension the same as or slightly smaller than the inner diameter of the short cylindrical section 66.

Then, load in the arrow α direction is applied to the jig 67 and the truncated cone section 69 of the jig 67 is fitted in the short cylindrical section 66, and thus a force in the arrow β direction for expanding a diameter of the short cylindrical section 66 is applied. As a result, by the truncated cone section 69 of the jig 67, at least a part of the short cylindrical section 66 is pressed to the inner diameter surface side of the tapered hole 22b and is held in press-contact or contact with the inner diameter surface of the tapered hole 22b through intermediation of the seal material constituting the foreign-matter intrusion preventing means W2. Therefore, the shaft section slip-off preventing structure M1 can be configured.

Note that, when the load in the arrow α direction is applied to the jig 67, it is necessary to fix this wheel bearing device so as not to move in the arrow α direction. However, a part of the hub wheel 1, the constant-velocity universal joint T1, and the like only has to be received by a fixed member. An inner diameter surface of the short cylindrical section 66 can be formed by forging when the inner diameter surface is expanded in diameter to an axial end side, that is, formed in a tapered shape, which leads to cost reduction.

A cutout may be formed in the short cylindrical section 66 in order to reduce the load in the arrow α direction of the jig 67. Further, a conical surface of the truncated cone section 69 of the jig 67 may be arranged in the entire circumferential direction or partially in the circumferential direction. The diameter of the short cylindrical section 66 is more easily expanded when the cutout is formed on the short cylindrical section 66. When the conical surface of the truncated cone section 69 of the jig 67 is partially arranged in the circumferential direction, a region where the short cylindrical section 66 is expanded in diameter is a part on the circumference. Therefore, it is possible to reduce push-in load of the jig 67.

Figure 6:
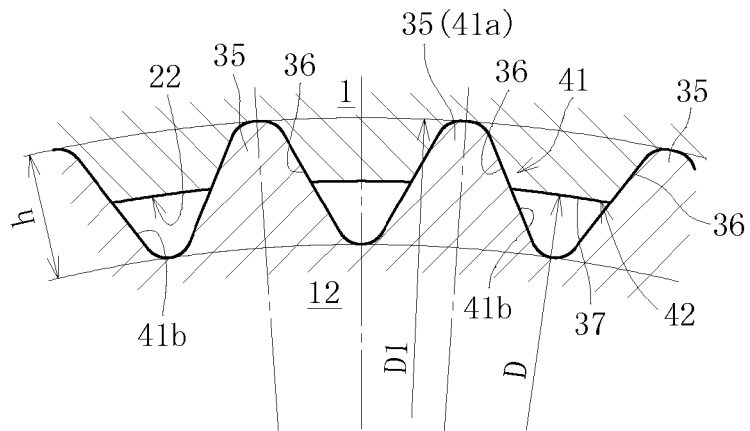
FIG. 6 is an enlarged sectional view of a main part of the recess-projection fitting structure of the wheel bearing device of FIG. 2.

In the recess-projection fitting structure M, as illustrated in FIG. 6, when a diameter difference (D1–D) between the outer diameter dimension D1 of the shaft section 12 and the inner diameter dimension D of the fitting hole 22a of the hole 22 of the hub wheel 1 is represented as Δd, the height of the projections 35 provided on the outer diameter surface of the shaft section 12 is represented as h, and a ratio of the diameter difference and the height is represented as Δd/2h, a relation among the diameter difference, the height, and the ratio is set to be 0.3<Δd/2h<0.86. Consequently, the projecting direction intermediate regions (height direction intermediate regions) of the projections 35 are surely arranged on the recess formation surface before recess formation. Therefore, the projections 35 bite in the recess formation surface during press fitting and the recesses 36 can be surely formed.

Figure 11:
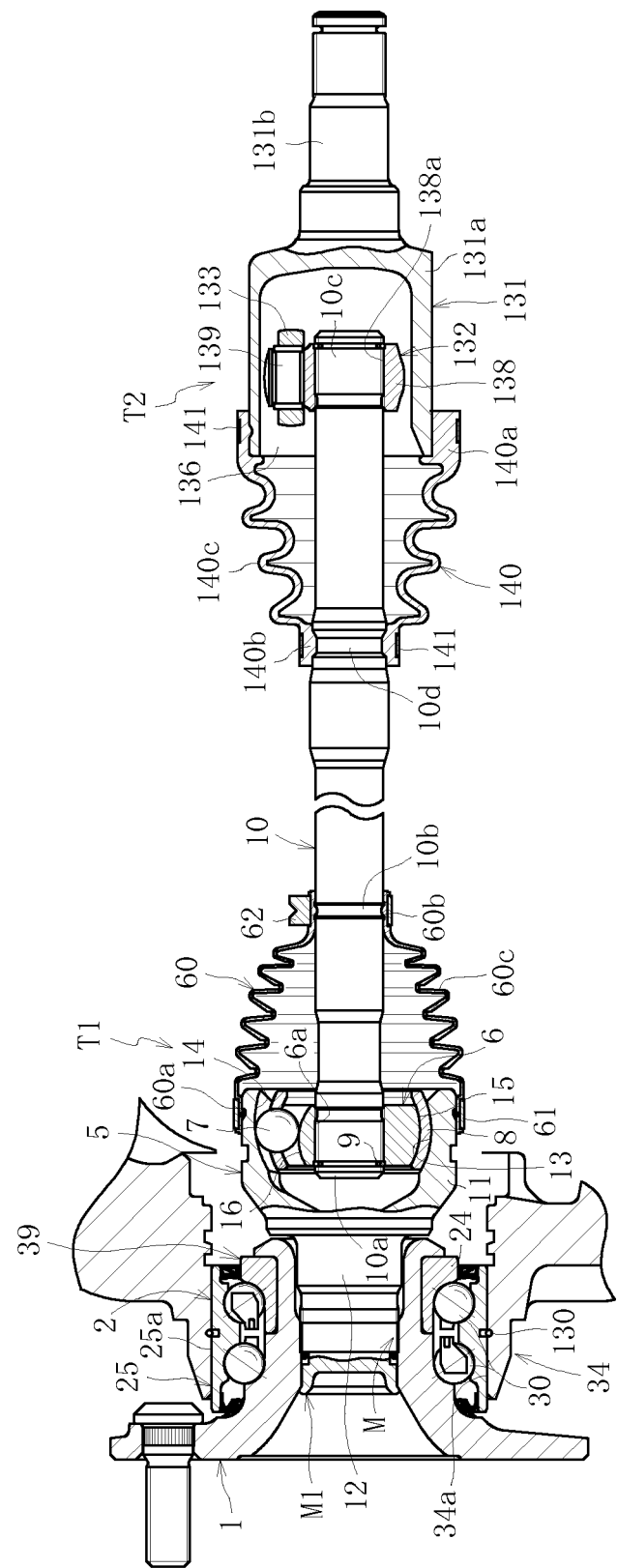
FIG. 11 is a vertical sectional view illustrating a state in which the axle module of FIG. 1 is assembled into a vehicle.

Assembly of the axle module assembled as illustrated in FIG. 1 with respect to a vehicle is completed by fitting, as illustrated in FIG. 11, the outer member 25 of the roller bearing 2 in the hole of the knuckle 34. Thus, a predetermined fit is set between a cylindrical outer peripheral surface 25a of the outer member 25 and the cylindrical inner peripheral surface 34a of the hole of the knuckle 34. Then, a snap ring 130 is interposed between the outer peripheral surface 25a of the outer member 25 and the inner peripheral surface 34a of the hole of the knuckle 34. By using the snap ring 130, a slip-off preventing effect of the outer member 25 with respect to the knuckle 34 is improved. That is, an annular groove 129 (FIG. 2) is formed in the outer peripheral surface 25a of the outer member 25, and an annular groove 128 (refer to FIG. 9) is formed similarly in the inner peripheral surface 34a of the hole of the knuckle 34. Then, the snap ring 130 is engaged with both the annular groove 129 of the outer member 25 and the annular groove of the knuckle 34. That is, an inner diameter side of the snap ring 130 is engaged with the annular groove 129 of the outer member 25, and an outer diameter side of the snap ring 130 is engaged with the annular groove 128 of the knuckle 34.

As illustrated in FIG. 1, an outer diameter D11 of the outer member 25 is set to be larger than a maximum outer diameter dimension D12 of the constant-velocity universal joint T1. The maximum outer diameter dimension D12 of the constant-velocity universal joint T1 means a maximum outer diameter dimension of this constant-velocity universal joint T1 in a state of including auxiliaries such as the boot 60 and the boot band 61. Further, a maximum outer diameter dimension D13 of the inboard-side constant-velocity universal joint T2 is set to be smaller than the outer diameter D11 of the outer member 25. Similarly to the case of the outboard-side constant-velocity universal joint T1, the maximum outer diameter dimension D13 of the inboard-side constant-velocity universal joint T2 means a maximum outer diameter dimension of the inboard-side constant-velocity universal joint T2 in a state of including auxiliaries such as the boot 140 and the boot band 141.

Figure 9:
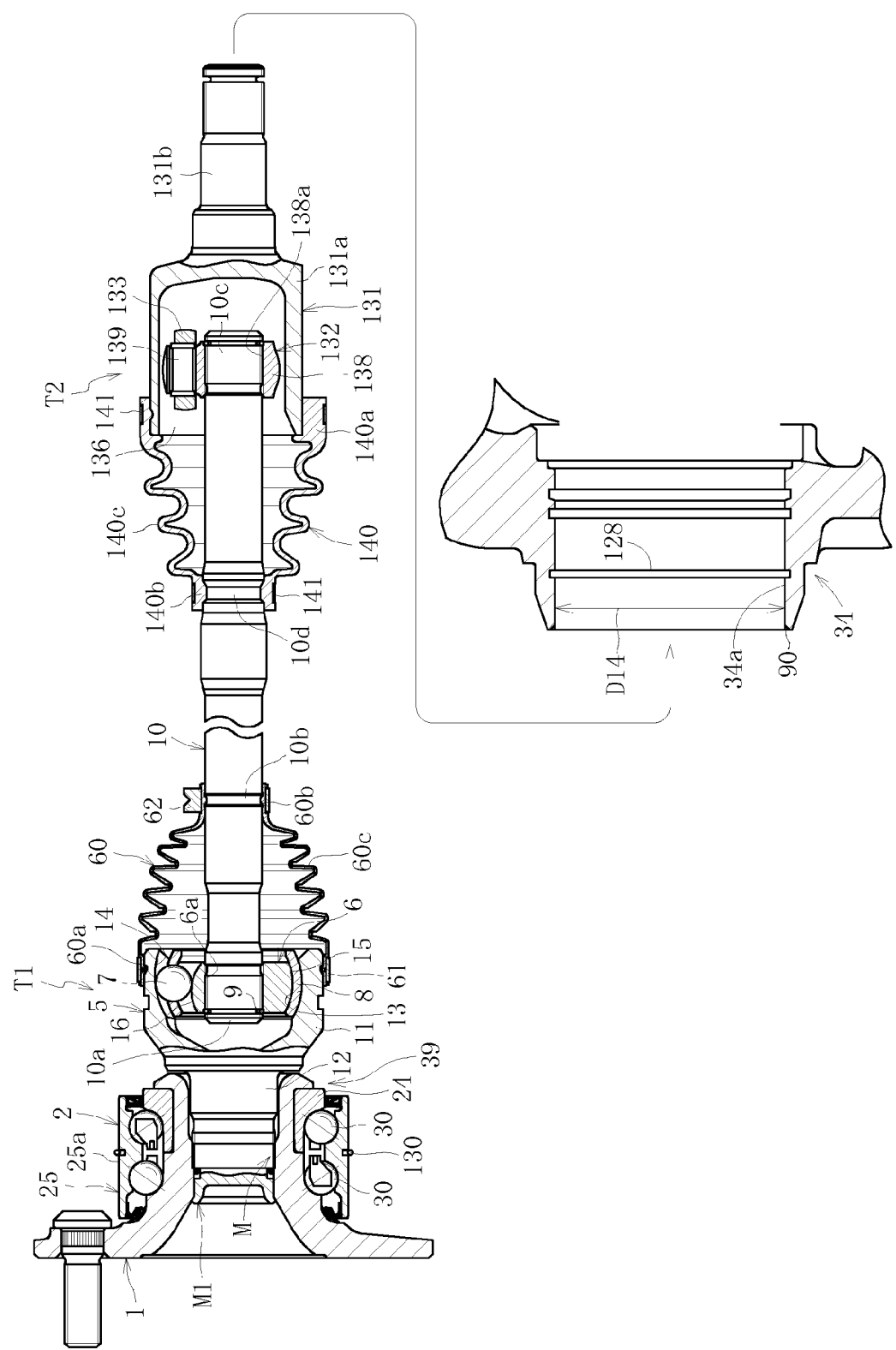
FIG. 9 is a vertical sectional view illustrating a process of assembling the axle module of FIG. 1 into a vehicle.
Figure 10:
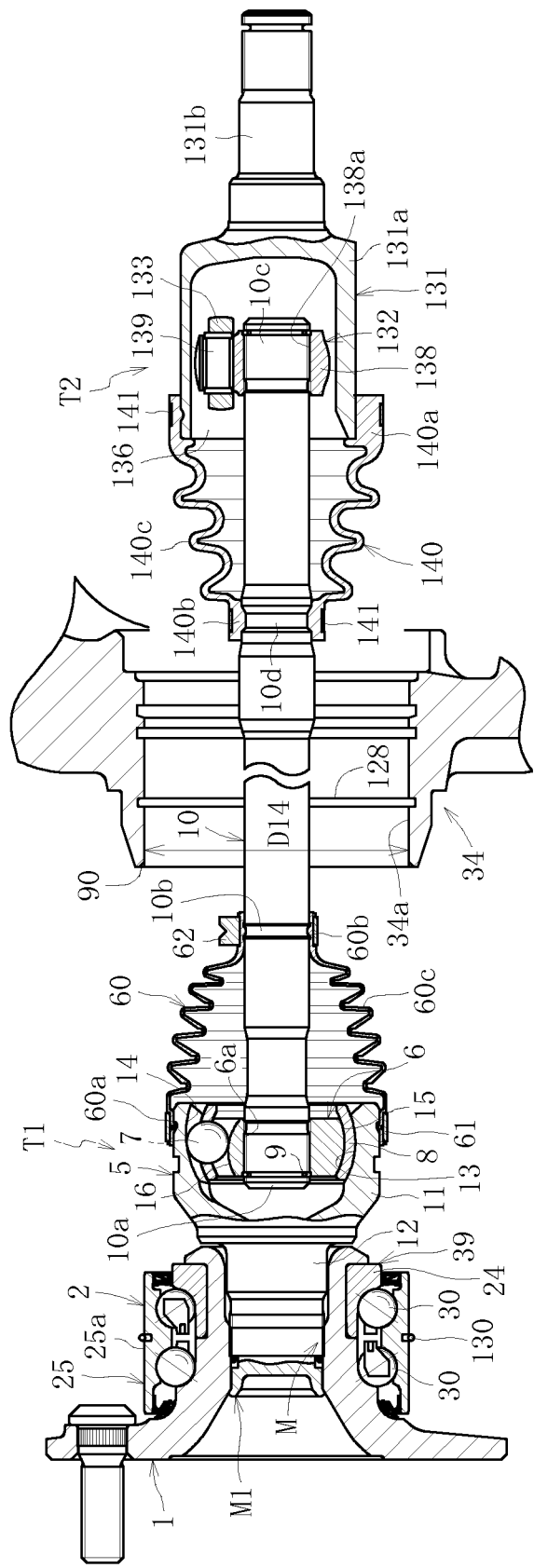
FIG. 10 is another vertical sectional view illustrating the process of assembling the axle module of FIG. 1 into a vehicle.

As illustrated in FIGS. 9 and 10, the assembly of the axle module with respect to a vehicle is performed as follows: this axle module is let into the knuckle 34 from an inboard-side constant-velocity universal joint T2 side; the axle module is then caused to pass the outboard-side constant-velocity universal joint T1; and lastly, the outer member 25 of the driving wheel bearing device is press-fitted into the inner peripheral surface 34a of the hole of the knuckle 34. In this case, the maximum outer diameter dimension D12 of each of the constant-velocity universal joints T1 and T2 is smaller than the outer diameter D11 of the outer member 25, and by extension, than an inner diameter D14 of the knuckle 34. Thus, the constant-velocity universal joints T1 and T2 are allowed to easily pass with respect to the knuckle 34, and thus assembly workability of the axle module can be improved. Note that, a chamfered section 90 is provided on an outboard-side edge of the inner diameter surface 34a of the knuckle 34.

In this case, it is preferred to set to regulate, with a tightening margin between the outer peripheral surface (knuckle press-fitting surface) 25a and the inner diameter surface 34a, relative shift in an axial direction and a circumferential direction of the knuckle 34 and the outer member 25. For example, when fitting surface pressure× fitting area between the outer member 25 and the knuckle 34 is fitting load, a value obtained by dividing this fitting load with equivalent radial load of this roller bearing is set as a creep occurrence limit coefficient. A design specification for the outer member 25, i.e., a fitting margin between the outer member 25 and the knuckle 34 is set by taking into account this creep occurrence limit coefficient in advance. In addition, the outer diameter D11 of the outer member 25 (refer to FIG. 11 and the like) and the inner diameter D14 of the knuckle 34 (refer to FIG. 9 and the like) are set.

Therefore, it is possible to prevent slip-off in the axial direction and creep in the circumferential direction of the outer member 25 with the tightening margin between the outer peripheral surface (knuckle press-fitting surface) 25a of the outer member 25 and the knuckle inner diameter surface 34a of the knuckle 34. The creep means that the bearing slightly moves in the circumferential direction because of insufficiency of the fitting margin, machining accuracy failure of the fitting surface, or the like and the fitting surface changes to a mirror surface and, in some case, the fitting surface involves score and seizure, or adhesion occurs. As illustrated in FIG. 11, under a state in which the outer member 25 is press-fitted in the knuckle 34, the snap ring 130 is engaged with the annular groove 129 of the outer peripheral surface 25a of the outer member 25 and the annular groove 128 of the inner peripheral surface 34a of the knuckle 34.

Figure 12A:
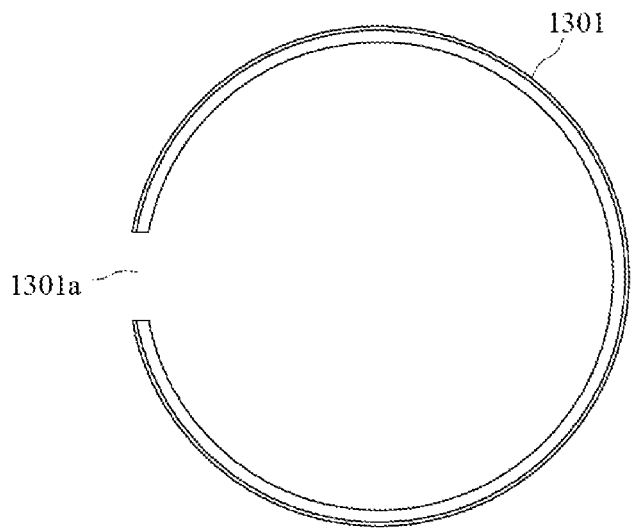
FIG. 12A is a front view of a snap ring having a rectangular sectional shape.
Figure 12B:
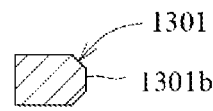
FIG. 12B is a sectional view of a snap ring having a rectangular sectional shape.
Figure 13A:
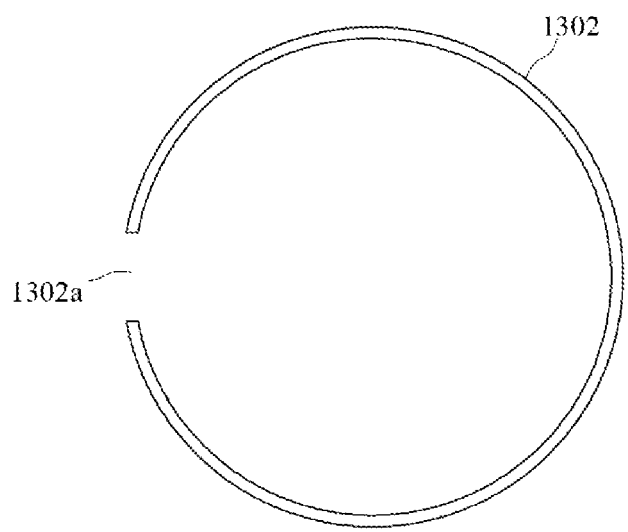
FIG. 13A is a front view of a snap ring having a circular sectional shape.
Figure 13B:
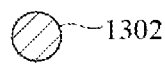
FIG. 13B is a sectional view of a snap ring having a circular sectional shape.

FIGS. 12 and 13 each illustrate the snap ring 1301 and 1302, respectively. The snap rings illustrated in FIGS. 12 and 13 are formed of a ring member having a deficient section 1301a and 1302a, respectively, in a part thereof. FIGS. 12A and 12B illustrate an example of a snap ring having a rectangular sectional shape, and FIGS. 13A and 13B illustrate an example of a snap ring having a circular sectional shape. Therefore, the snap ring is reduced in diameter from a free state each illustrated in FIGS. 12A and 13A by being applied with a diameter reducing force in an inner diameter direction, and returns to the free state each illustrated in FIGS. 12A and 13B by cancelling application of the diameter reducing force.

In the case of the snap ring 1301 having the rectangular sectional shape, as illustrated in FIG. 12B, an outer-diameter side ridge line section is chamfered. In this way, by adopting the snap ring having the rectangular sectional shape in which the outer-diameter side ridge line section is chamfered or the snap ring having a circular sectional shape, it is possible to smoothly reduce the diameter of the snap ring 1301 so that the snap ring 1301 is easily set into the annular groove 129 of the outer member 25 when the outer member 25 is press-fitted in the hole of the knuckle 34. Note that, although being formed as a flat surface, an outer diameter surface 1301b of the snap ring 1301 illustrated in FIG. 12 may be formed as a protruding curved surface.

At the time of this press fitting, the snap ring 130 engaged with the annular groove 129 of the outer peripheral surface of the outer member 25 is guided to the inner diameter surface 34a of the knuckle 34. Consequently, the snap ring 130 is reduced in diameter and is allowed to slide to the annular groove 128 of the inner diameter surface 34a of the knuckle 34. Then, the diameter reducing force is canceled in a state in which the snap ring 130 corresponds to the annular groove 128 of the inner diameter surface 34a of the knuckle 34, and the snap ring 130 is expanded in diameter (returns to the free state) and engaged with this annular groove 128. Specifically, when the snap ring 130 is inserted into the inner diameter surface 34a of the knuckle 34 in a state of being mounted to the outer peripheral surface of the outer member 25 and reduced in diameter by elastic deformation, and then moved in the axial direction, the snap ring 130 is expanded in diameter by elasticity and expanded in the inner diameter surface 34a of the knuckle 34 as soon as arriving at the position of the annular groove 128 of the inner diameter surface 34a of the knuckle 34. In this way, the snap ring 130 is engaged with both the snap ring grooves 128 and 129.

Further, the chamfered section 90 is provided on the outboard-side edge of the inner diameter surface 34a of the knuckle 34. Thus, insertion work of the axle module into the inner diameter surface 34a of the knuckle 34 can be more easily performed. In particular, the snap ring 130 mounted to the outer member 25 is smoothly and gradually reduced in diameter while being guided by the chamfered section 90, and thus smoothly slides on the inner diameter surface 34a of the knuckle 34.

It is preferred that, as a material of the snap ring 130, a material smaller in shearing stress than materials of the outer member 25 and the knuckle 34 be adopted. There are various materials of the knuckle 34, which generally include cast iron, an aluminum alloy die-casting, and an aluminum alloy mold. Further, although varying in accordance with materials, shapes, a thickness, and the like, allowed shearing stress in a case of an aluminum alloy die-casting is equal to or lower than 200 MPa as a rough indication.

Meanwhile, yield stress of about 5.7 kN (580 kgf) is required in a case of a vehicle of 1500 cc class. With the yield stress of 5.7 kN, the snap ring is not deformed or broken even when thrust load of 5.7 kN is applied to the snap ring. Although depending on a dimension of the snap ring 130, shearing stress in this case is about 10 MPa (5 to 15 MPa). Thus, it is preferred that the material of the snap ring 130 have shearing stress in a range of from 5 MPa to 150 MPa.

Examples of such a material include a thermoplastic synthetic resin. Specific examples thereof include polypropylene, an acrylic resin, and an acrylonitrile-butadiene-styrene resin (ABS resin). Snap rings made of a resin can be mass-produced by injection molding at relatively low cost. Therefore, at the time of disassembly, the outer member 25 can be drawn out by being applied with a drawing force exceeding shearing stress of the snap ring 130. At this time, the snap ring 130 is deformed or broken and allows disassembly, and thus breakage of the outer member 25 and the knuckle 34 is prevented. At the time of re-assembly, the snap ring deformed or broken is replaced with new one.

Figure 14:
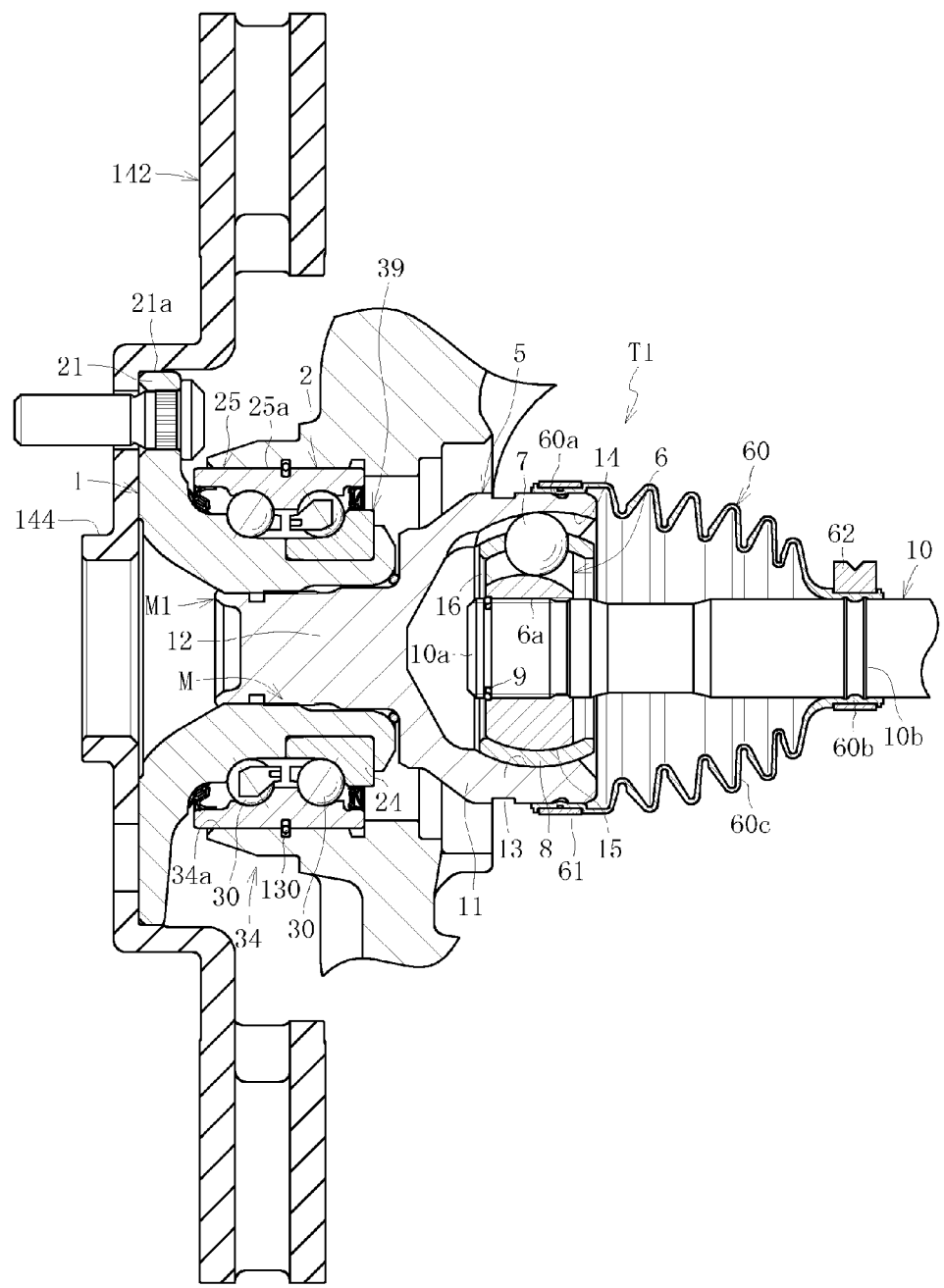
FIG. 14 is a vertical sectional view of a wheel bearing device, illustrating an example in which a brake rotor including a pilot section is mounted to a hub wheel.

In the embodiment, the hub wheel 1 is not provided with a pilot section, and thus exhibits a shape to which cold forging can be easily performed, which contributes to improvement of productivity. In this case, a member which is other than the hub wheel 1 and has a pilot section may be mounted to the hub wheel 1. FIG. 14 illustrates an example of the case where a brake rotor 142 is used as such a member. Specifically, a pilot section 144 is provided to the brake rotor 142, and an outer peripheral surface 21a of the flange 21 of the hub wheel 1 is used as a brake pilot. In this case, the shape of the hub wheel 1 is simplified because the wheel pilot section is not provided, and forging is easily performed. Thus, the hub wheel 1 can be manufactured by the cold forging at low cost.

Figure 15:
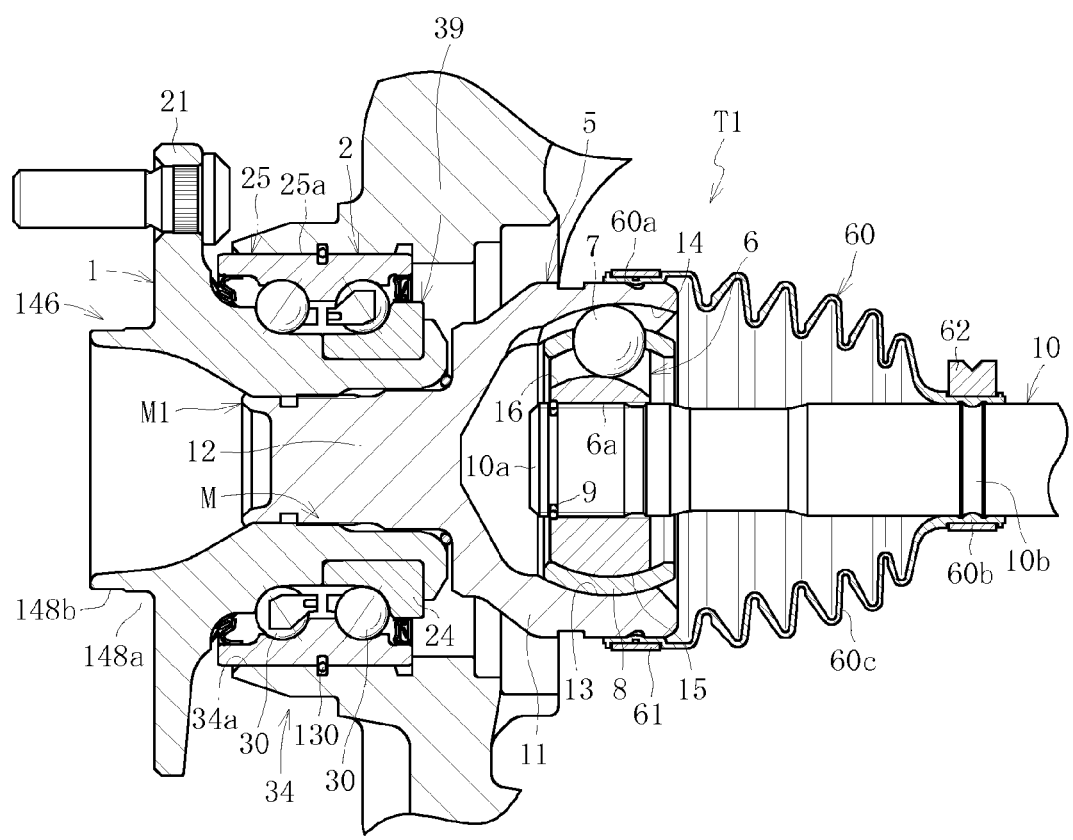
FIG. 15 is a vertical sectional view of a wheel bearing device, illustrating a case where a pilot section is provided to a hub wheel.
Figure 45:
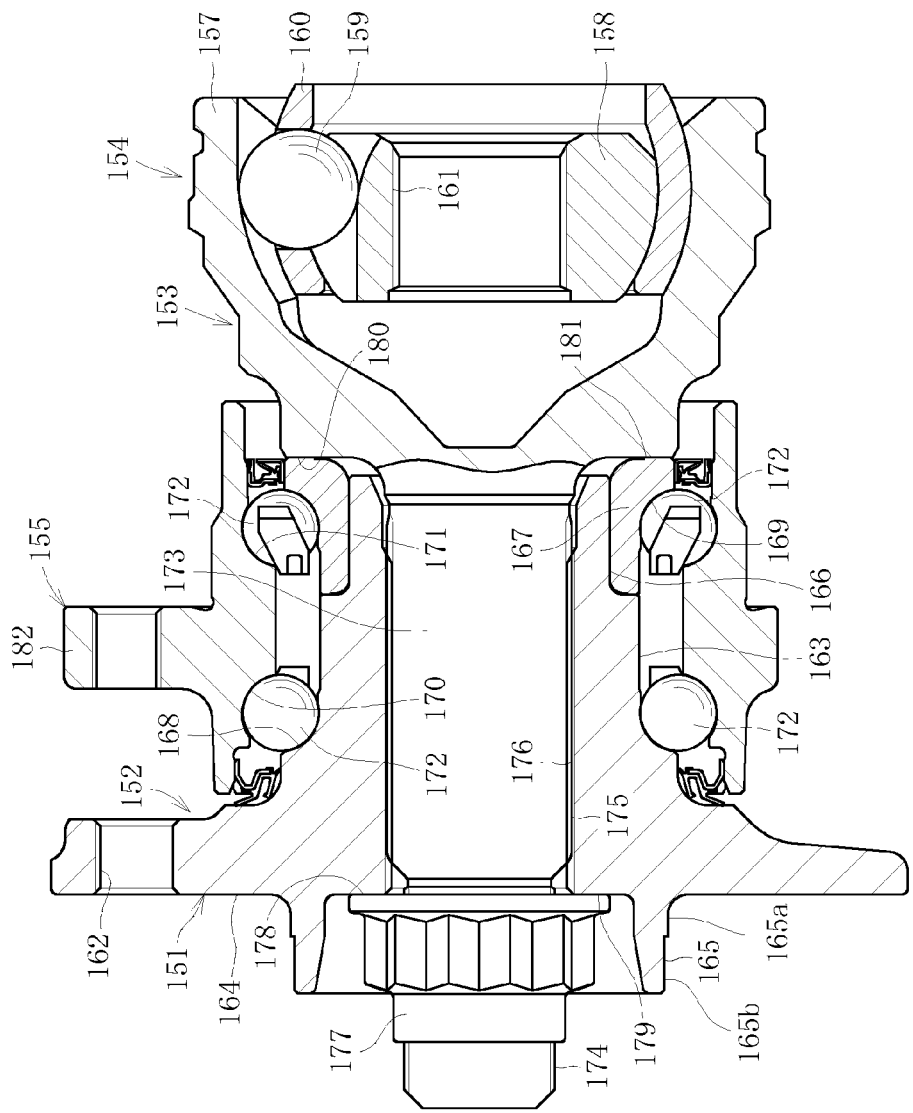
FIG. 45 is a vertical sectional view of a conventional wheel bearing device.

As a matter of course, the pilot section can be provided to the hub wheel as in the conventional example having been already described in relation to FIG. 45. For example, as illustrated in FIG. 15, a pilot section 146 formed of a brake pilot 148a and a wheel pilot 148b may be provided to an outboard-side end surface of the flange 21 of the hub wheel 1.

Next, description is made of the effects of the illustrated embodiment.

In the wheel bearing device, because the entire fitting contact regions 38 of the projections 35 and the recesses 36 in the recess-projection fitting structure M are held in close contact with each other, a gap in which a backlash occurs is not formed in the radial direction and the circumferential direction. Therefore, the entire fitting regions contribute to rotation torque transmission, stable torque transmission is possible, and abnormal noise is not caused.

The wheel bearing device is excellent in productivity because it is unnecessary to form spline sections and the like in a member (in this case, hub wheel 1) in which the recesses 36 are formed. Further, because phase alignment of the splines is unnecessary, it is possible to not only realize improvement of assemblability, prevent damage to the tooth surfaces during press fitting, but also maintain a stable fit state.

In addition, because compressive residual stress is applied to the projections 35, improvement of the wear resistance of the projections 35 is realized. Specifically, by applying compressive residual stress, residual austenite can be transformed into martensite, and thus the wear resistance can be improved. Therefore, even when driving torque acts and slightly relative displacement supposedly occurs in the recess-projection fitting structure M, it is possible to suppress occurrence of fretting wear, to thereby prevent abrasive wear in the recess-projection fitting structure. Consequently, a torque transmitting function can be stably exerted without backlash over a long period of time.

The compressive-residual-stress application means may include shot peening, and compressive residual stress can be stably increased by the peening. In addition, general-purpose shot peening can be used, and thus cost reduction can be realized.

When the hardness of the projections 35 ranges from 50 HRC to 65 HRC, hardness sufficient for being press-fitted in the opposite side can be provided, and thus press-fitting properties can be improved. When the hardness on the opposite side ranges from 10 HRC to 30 HRC, press-fitting can be performed.

The projections 35 can be hardened by heat hardening treatment, that is, by high-frequency heat treatment. Thus, the following advantages of the high-frequency heat treatment can be realized (local heating can be performed and hardening conditions can be easily adjusted; oxidation is reduced because heating can be performed in a short period of time; hardening distortion is reduced in comparison with other methods; surface hardness is high and excellent wear resistance can be obtained; selection of the depth of the hardened layer is relatively easy; and automation is easily realized and assembly into a machine process line can be realized). In particular, high compressive residual stress can be applied by combining the shot peening with the high-frequency heat treatment, and thus improvement of fatigue strength can be expected.

When a diameter difference between the outer diameter dimension of the shaft section 12 and the inner diameter dimension of the hole 22 of the hub wheel 1 is represented as $\Delta d$, the height of the projection is represented as h, and a ratio of the diameter difference and the height is represented as $\Delta d/2h$, a relation among the diameter difference, the height, and the ratio is set to be $0.3<\Delta d/2h<0.86$. Therefore, it is possible to sufficiently secure a press-fitting margin of the projections 35. In other words, when $\Delta d/2h$ is equal to or smaller than 0.3, torsion strength falls. Further, if $\Delta d/2h$ exceeds 0.86, the entire projections 35 bite in the opposite side because of very small decentering and press-fitting tilt during press fitting, moldability of the recess-projection fitting structure M is deteriorated, and press-fitting load suddenly increases. When moldability of the recess-projection fitting structure M is deteriorated, because not only torsion strength falls but also an expansion amount of the hub wheel outer diameter increases, there are problems in that, for example, the function of the bearing 2 inserted in the hub wheel 1 is affected and rotation life is reduced. In contrast, by setting $\Delta d/2h$ to 0.3 to 0.86, moldability of the recess-projection fitting structure M is stabilized, fluctuation in press-fitting load is eliminated, and stable torsion strength can be obtained.

Because the tapered section 22d can form a guide at the start of press fitting, it is possible to press-fit the shaft section 12 of the joint outer race 5 into the hole 22 of the hub wheel 1 without causing decentering and perform stable torque transmission. Further, because the outer diameter D4 of the short cylindrical section 66 is set to be smaller than the inner diameter dimension D of the fitting hole 22a of the hole 22, the short cylindrical section 66 exerts an aligning work. Therefore, it is possible to press-fit the shaft section into the hub wheel while preventing decentering and perform more stable press fitting.

Generation of hoop stress on the bearing raceway surface is suppressed by arranging the recess-projection fitting structure M while avoiding a position right below the raceway surface of the roller bearing 2. Consequently, it is possible to prevent occurrence of a deficiency of the bearing such as a reduction in rolling fatigue life, occurrence of a crack, and stress corrosion crack. Thus, high quality bearing can be provided.

The shaft section 12 of the joint outer race 5 can be effectively prevented from slipping off from the hole 22 of the hub wheel 1 (in particular, slipping off in the axial direction to the shaft side) by the shaft section slip-off preventing structure M1. Consequently, it is possible to maintain a stable connection state and realize improvement of a quality of the wheel bearing device. Further, because the shaft section slip-off preventing structure M1 is the end expanded-diameter caulking section 65, screw fastening in the past can be omitted. Therefore, it is unnecessary to form a screw section projecting to the shaft section 12 from the hole 22 of the hub wheel 1. Thus, it is possible to realize a reduction in weight, omit screw fastening work, and improve assembly workability. Moreover, in the end expanded-diameter caulking section 65, because a part of the shaft section 12 of the joint outer race 5 only has to be expanded, it is possible to easily perform formation of the shaft section slip-off preventing structure M1. Note that, in the movement of the shaft section 12 of the joint outer race 5 in the reverse joint direction, pressing force in a direction for further press-fitting the shaft section 12 is necessary. Therefore, positional shift in the reverse joint direction of the shaft section 12 of the outer race 5 extremely hardly occurs. Even if the shaft section 12 shifts in this direction, because the bottom of the mouth section 11 of the joint outer race 5 is abutted to the caulking section 31 of the hub wheel 1, the shaft section 12 of the outer race 5 does not slip off from the hub wheel 1.

The hardness of the axial end portions of the projections of the shaft section 12 of the joint outer race 5 of the constant-velocity universal joint T1 is set to be higher than that of the inner diameter surface of the hole of the hub wheel 1, and the shaft section 12 is press-fitted in the hole 22 of the hub wheel 1 from the axial end portion side of the projections 35. Thus, recess formation with respect to the hole of the inner diameter surface of the hub wheel 1 is easily performed. Further, it is possible to set the hardness on the shaft section side to be high, to thereby improve torsion strength of the shaft section 12. Note that, the projections 35 can be formed by a spline normally formed in the shaft of this kind. In this case, it is easy to form the projections 35 at low cost.

Further, because the end portion of the hub wheel 1 is caulked and abutted to the inner race 24 of the roller bearing 2, bearing preload is applied. Thus, it is unnecessary to abut the mouth section 11 of the joint outer race 5 to the inner race 24 for the purpose of applying bearing preload. Therefore, it is possible to press-fit the shaft section 12 of the joint outer race 5 without taking into account contact with the inner race 24 and realize improvement of connectability (assemblability) of the hub wheel 1 and the joint outer race 5. Because the mouth section 11 is in a non-contact state with respect to the hub wheel 1, it is possible to prevent occurrence of abnormal noise owing to contact between the mouth section 11 and the hub wheel 1.

Further, when the recesses 36 are formed by press-fitting the shaft section 12 into the hub wheel 1, work hardening occurs on the recesses 36 side. The work hardening means that, when plastic deformation (plastic working) is applied to an object, resistance against deformation increases as a degree of deformation increases and the object becomes harder than a material not subjected to deformation. Therefore, in accordance with plastic deformation during press fitting, the inner diameter surface 37 of the hub wheel 1 on the recesses 36 side hardens. It is possible to realize improvement of rotation torque transmission performance.

The inner diameter side of the hub wheel 1 is relatively soft. Therefore, it is possible to realize improvement of fittability (adhesiveness) in fitting the projections 35 of the outer diameter surface of the shaft section 12 of the joint outer race 5 in the recesses 36 of the hole inner diameter surface of the hub wheel 1. It is further possible to accurately suppress a backlash from occurring in the radial direction and the circumferential direction.

Because the foreign-matter intrusion preventing means W is provided, it is possible to prevent intrusion of foreign matters into the recess-projection fitting structure M. That is, intrusion of rainwater and foreign matters is prevented by the foreign-matter intrusion preventing means W, and it is possible to prevent deterioration in adhesiveness owing to intrusion of rainwater and foreign matters into the recess-projection fitting structure M.

When the seal member 99 is arranged between the end portion of the hub wheel 1 and the bottom of the mouth section 11, the gap 98 between the end portion of the hub wheel 1 and the bottom of the mouth section 11 is closed by the seal member 99. Thus, rainwater and foreign matters are prevented from intruding from the gap 98 into the recess-projection fitting structure M. The seal member 99 only has to be capable of being interposed between the end portion of the hub wheel 1 and the bottom of the mouth section 11. Thus, for example, an existing (commercially available) O-ring and the like can be used, and hence foreign-matter intrusion preventing means can be configured at low cost. In addition, the commercially available O-ring and the like vary in material and size, and thus it is possible to configure, without additionally producing a special components, foreign-matter intrusion preventing means which surely exerts a sealing function.

The end expanded-diameter caulking section (tapered locking piece 65) that engages with the inner diameter surface of the hub wheel 1 (in this case, the inner diameter surface of the tapered hole 22*b*) through intermediation of the seal material (seal member configuring the foreign-matter intrusion preventing means W2) is provided further on the outboard side than the recess-projection fitting structure M. Therefore, it is possible to prevent intrusion of foreign matters from a side further on the outboard side than the recess-projection fitting structure M. That is, it is possible to avoid intrusion of foreign matters from the outboard side.

In this way, when the foreign-matter intrusion preventing means W1 and W2 are provided further on the inboard side than the recess-projection fitting structure M and further on the outboard side than the recess-projection fitting structure M, intrusion of foreign matters from both end sides in the axial direction of the recess-projection fitting structure M is prevented. Therefore, it is possible to stably prevent deterioration in adhesiveness over a long period of time.

By providing a pocket section 100 for storing an extruded portion 45 caused by recess formation by the press fitting, it is possible to hold (maintain) the extruded portion 45 in this pocket section 100. The extruded portion 45 does not enter the inside of the vehicle and the like on the outside of the device. In other words, it is possible to keep the extruded portion 45 stored in the pocket section 100, it is unnecessary to perform removal processing for the extruded portion 45, and it is possible to realize a reduction in assembly work man-hour and realize improvement of assembly workability and cost reduction.

Figure 8:
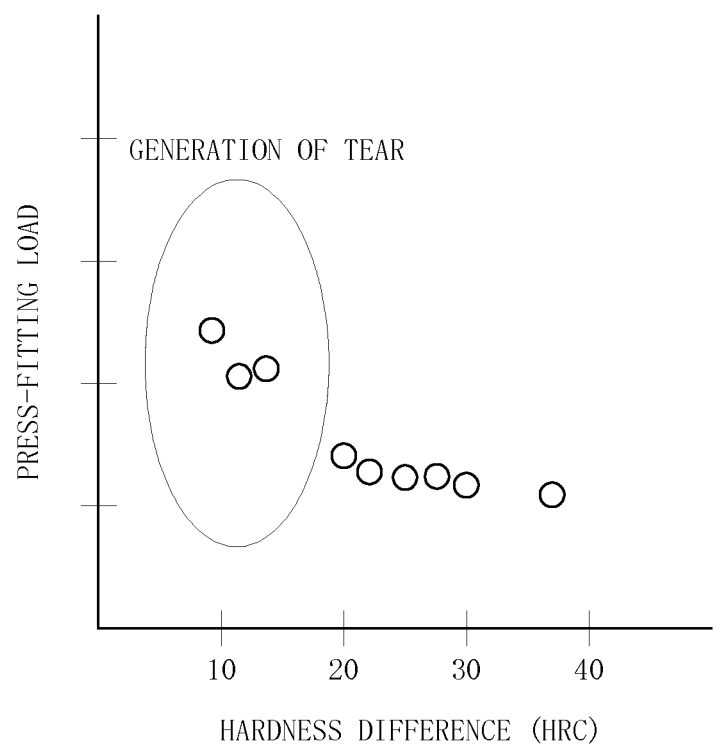
FIG. 8 is a graph showing a relationship between press-fitting load and a hardness difference.

When a hardness difference between the projections 35 (projections on the shaft section 12 side) and the opposite side (inner diameter surface of the hub wheel 1) is less than 20 HRC, as shown in the graph of FIG. 8, press-fitting load is increased and there is a risk of a damaged state in which so-called "tears" are generated during press fitting and the like. Thus, in this embodiment, specifically, the hardness of the hardened layer H is set to about 50 HRC to 65 HRC and the hardness of the unhardened section is set to about 10 HRC to 30 HRC, that is, the hardness difference therebetween is set to 20 points or more in HRC. With this setting, press fitting can be performed at relatively low load, and in addition, tears are not generated on the projections 35.

Figure 16:
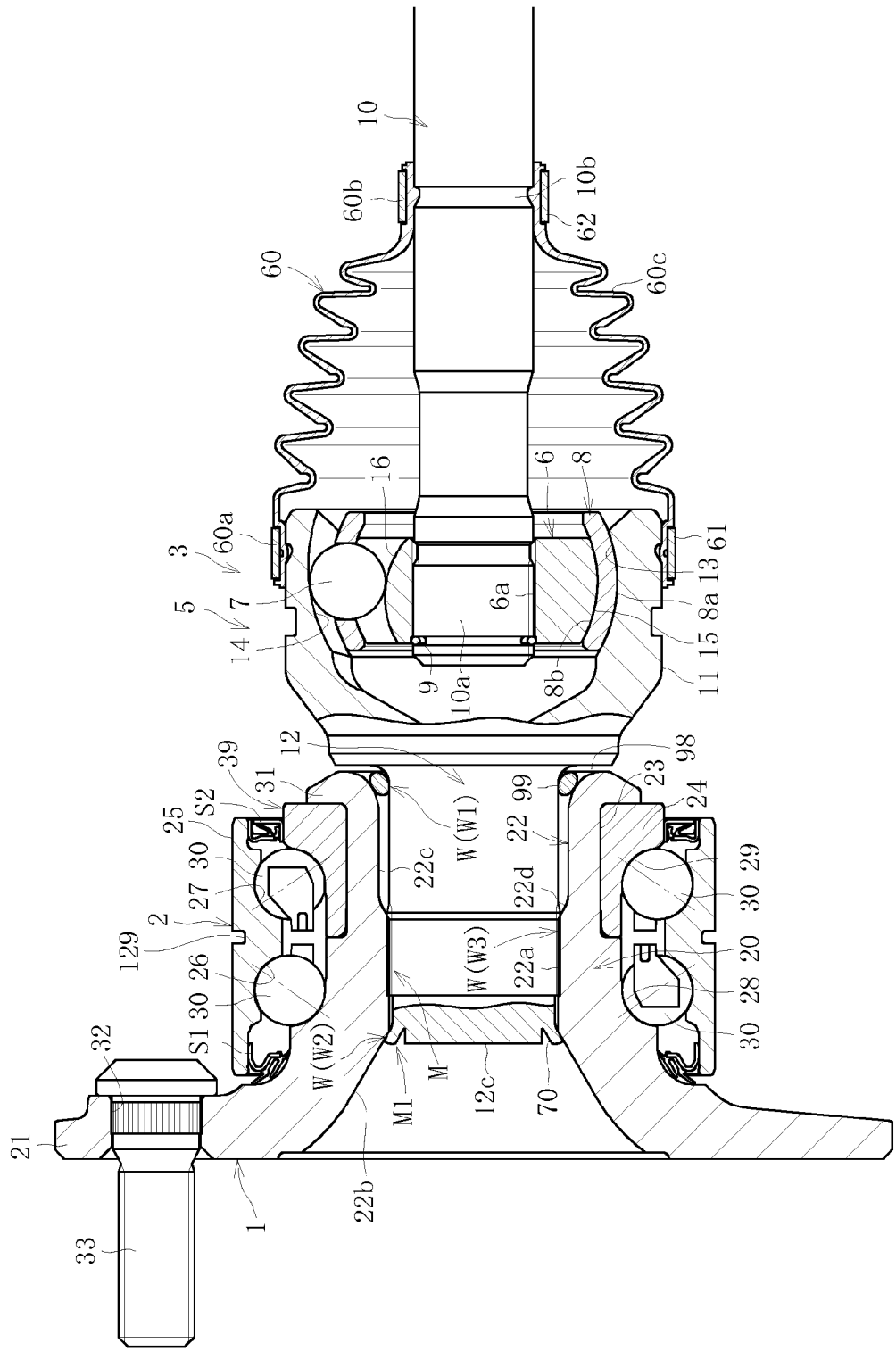
FIG. 16 is an enlarged sectional view of a wheel bearing device in an axle module according to a second embodiment of the present invention.

FIG. 16 illustrates a second embodiment. The shaft section slip-off preventing structure M1 of the wheel bearing device is configured by providing a tapered locking piece 70 that projects to the outer diameter direction in a part of the shaft section 12 rather than forming the short cylindrical section 66 illustrated in FIG. 5 in advance.

Figure 17:
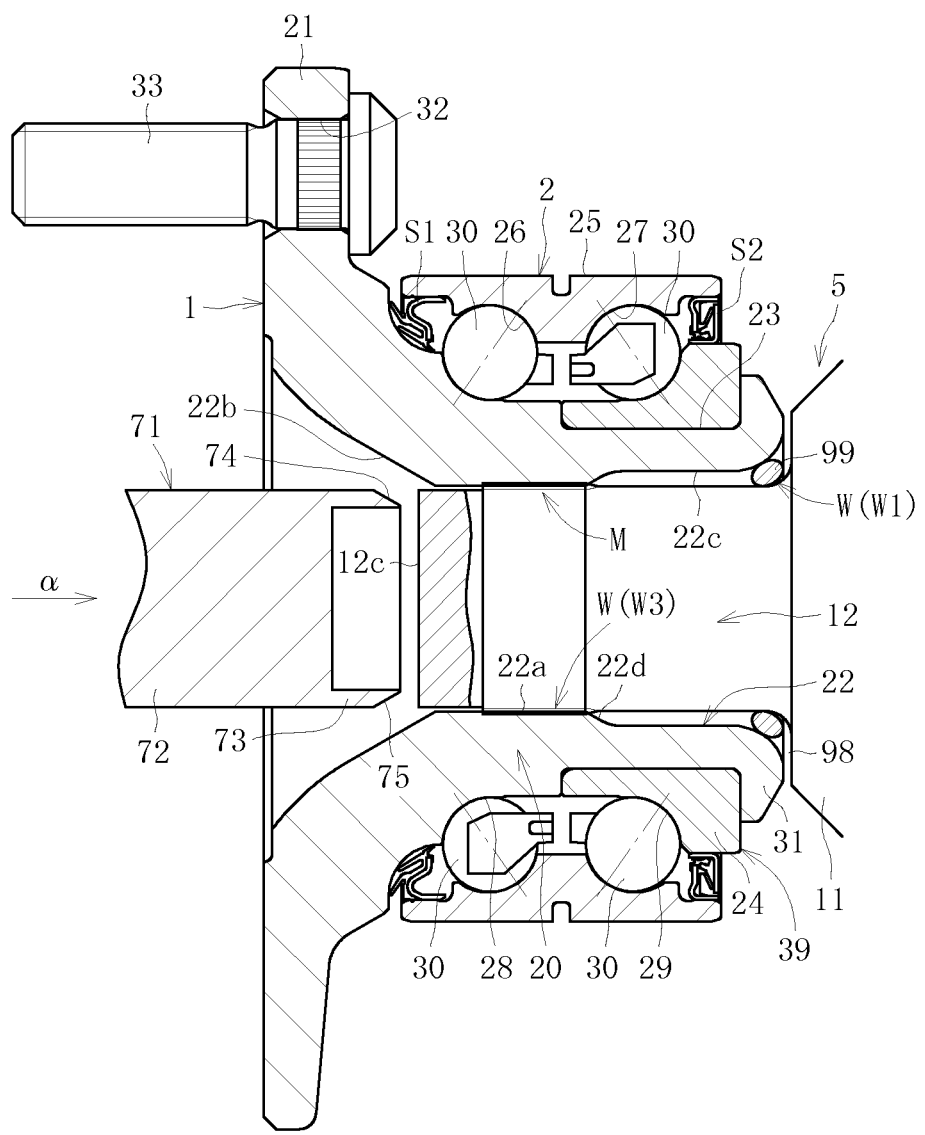
FIG. 17 is a sectional view illustrating a method of assembling the wheel bearing device illustrated in FIG. 16.
Figure 18:
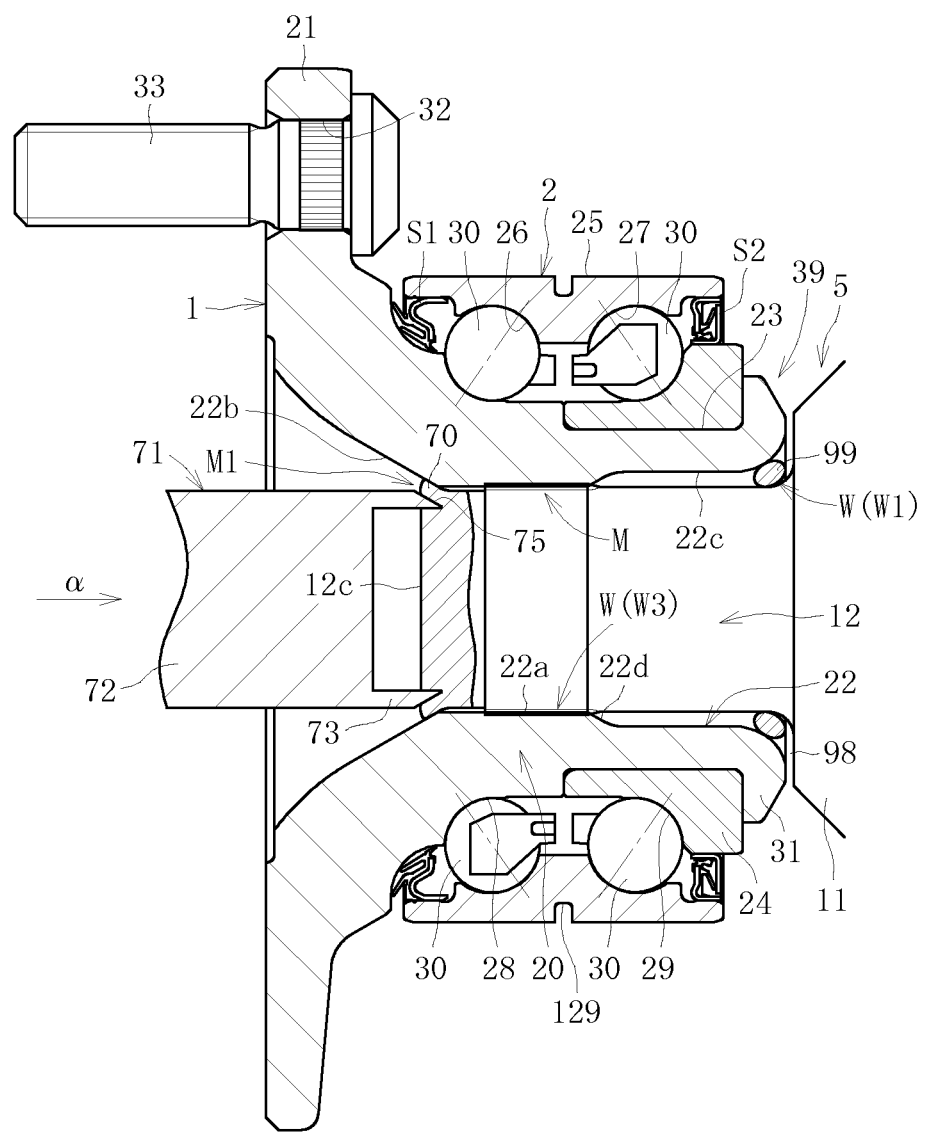
FIG. 18 is another sectional view illustrating the method of assembling the wheel bearing device illustrated in FIG. 16.

In this case, a jig 71 illustrated in FIG. 17 is used. The jig 71 includes a columnar main body section 72 and a short cylindrical section 73 connected to a distal end of the main body section 72. A small-diameter step section 74 is provided at a distal end of an outer peripheral surface of the short cylindrical section 73. Therefore, a distal end wedge section 75 is formed in the jig 71. As illustrated in FIG. 18, if the distal end wedge section 75 is driven (load in the arrow α direction is applied) to an end surface 12*c* of the shaft section 12, a sectional shape of the distal end wedge section 75 on the outer diameter side is a tilting surface, and the outer diameter side of the end of the shaft section 12 is expanded in diameter by the small-diameter step section 74 forming the tilting surface.

Consequently, at least a part of the tapered locking piece 70 comes into press-contact or contact with the inner diameter surface of the tapered hole 22*b*. Therefore, like the tapered locking piece 65 illustrated in FIG. 1 and the like, such a tapered locking piece 70 can effectively prevent the shaft section 12 of the outer race 5 from slipping off in the axial direction from the hole 22 of the hub wheel 1. Consequently, it is possible to maintain a stable connected state and realize improvement of a quality of the wheel bearing device. Note that, an inner diameter surface of the distal end wedge section 75 may be formed in a tapered shape.

Figure 19:
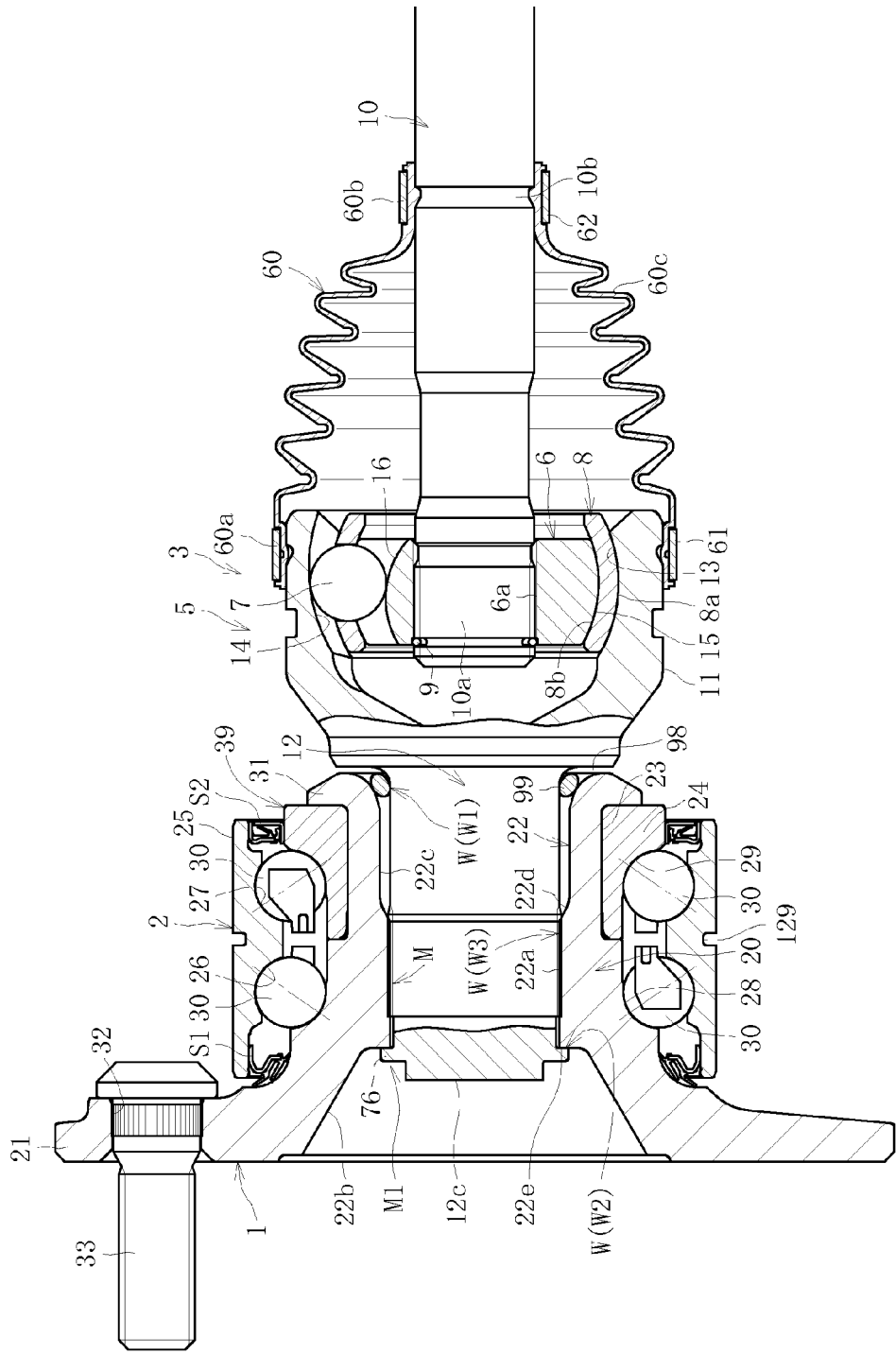
FIG. 19 is an enlarged sectional view of a wheel bearing device in an axle module according to a third embodiment of the present invention.

FIG. 19 illustrates a third embodiment. The shaft section slip-off preventing structure M1 of the wheel bearing device is configured by an outer collar-like locking piece 76 formed by caulking a part of the shaft section 12 to project in the outer diameter direction. In this case, in the hole 22 of the hub wheel 1, the stepped surface 22*e* is provided between the fitting hole 22*a* and the tapered hole 22*b*. The outer collar-like locking piece 76 locks to the stepped surface 22*e*.

Figure 20:
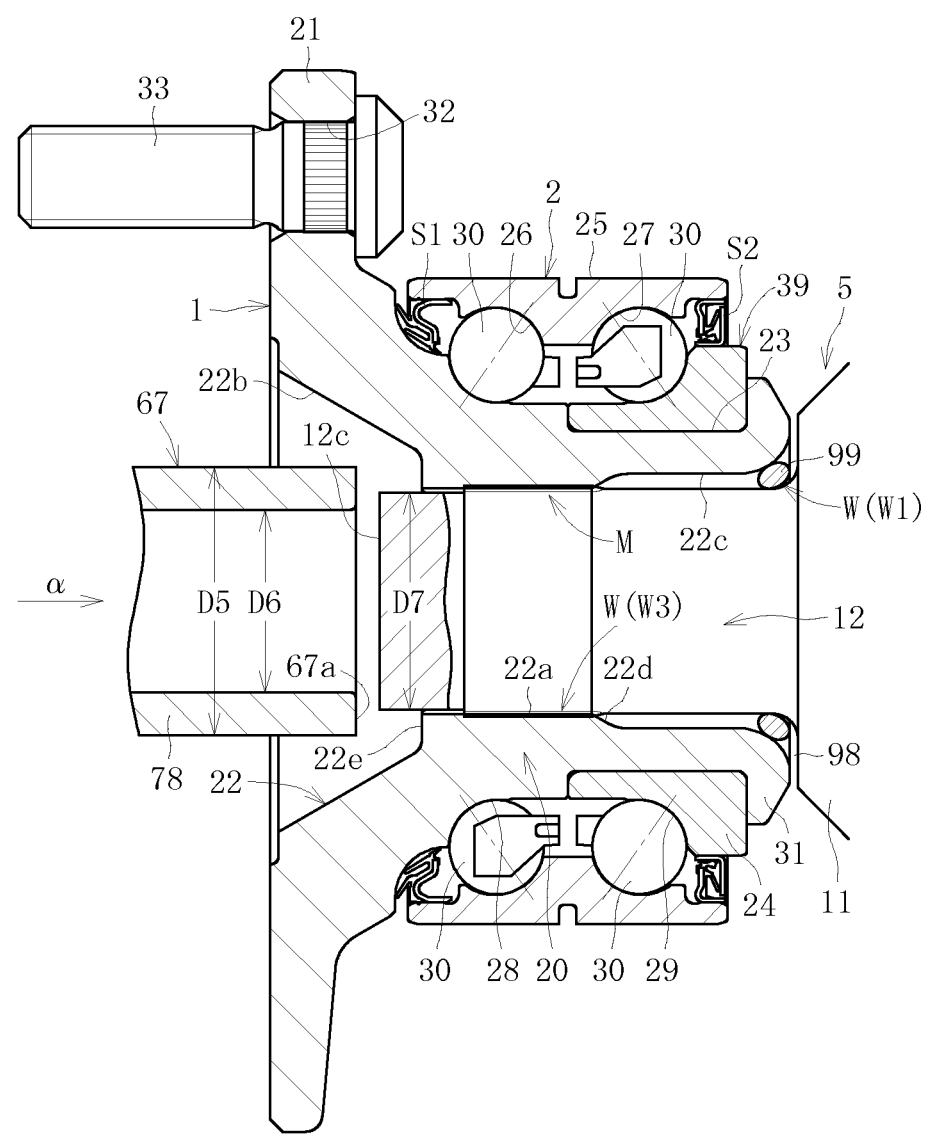
FIG. 20 is a sectional view illustrating a method of assembling the wheel bearing device illustrated in FIG. 19.

In the shaft section slip-off preventing structure M1, a jig 67 illustrated in FIG. 20 is used. The jig 67 includes a cylindrical member 78. An outer diameter D5 of the cylindrical member 78 is set to be larger than an outer diameter D7 of the end of the shaft section 12 and an inner diameter D6 of the cylindrical member 78 is set to be smaller than the outer diameter D7 of the end of the shaft section 12.

Figure 21:
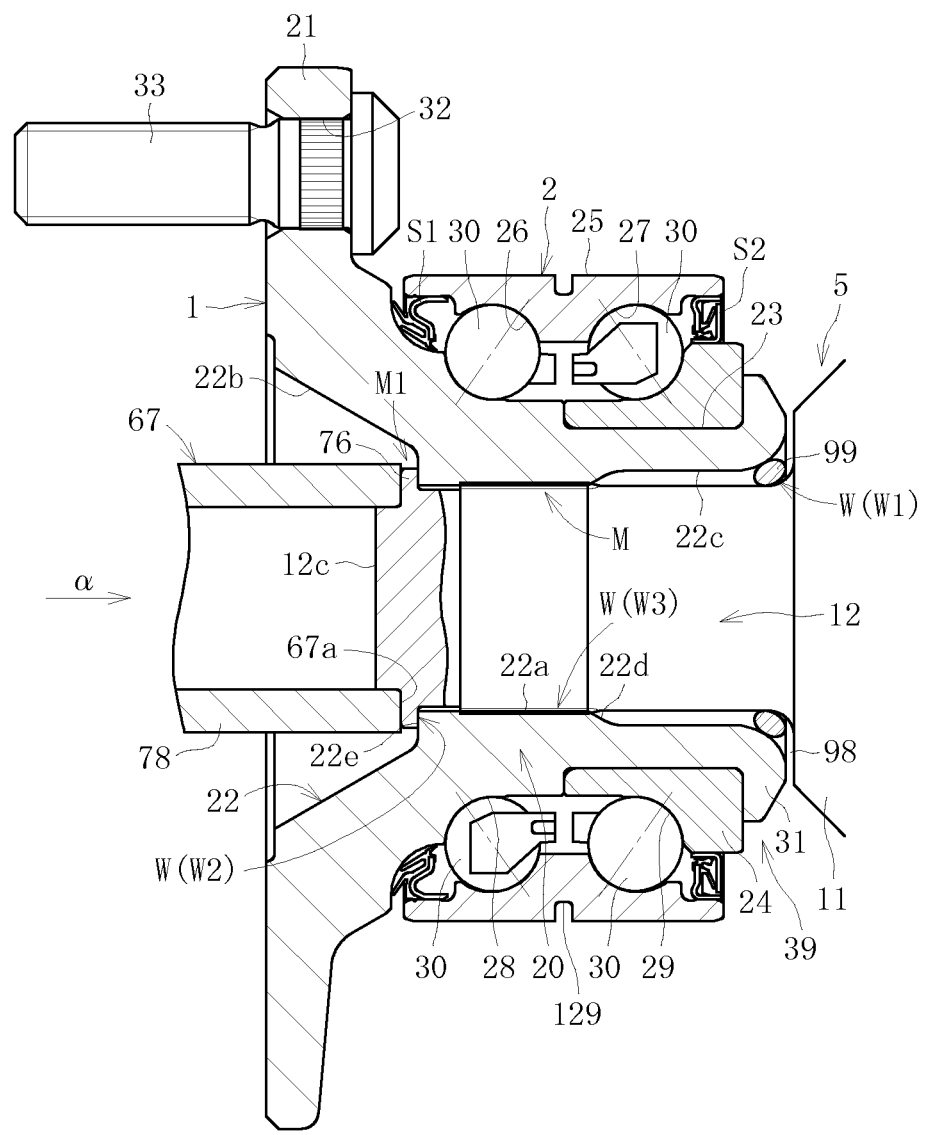
FIG. 21 is another sectional view illustrating the method of assembling the wheel bearing device illustrated in FIG. 19.

Therefore, if axes of the jig 67 and the shaft section 12 of the outer race 5 are aligned and load is applied in the arrow α direction to the end surface 12*c* of the shaft section 12 by an end surface 67*a* of the jig 67 in this state in which the axes are aligned, as illustrated in FIG. 21, an outer peripheral side of the end surface 12*c* of the shaft section 12 is crushed and the outer collar-like locking piece 76 can be formed.

Because the above-mentioned outer collar-like locking piece 76 locks with the stepped surface 22*e*, like the tapered locking piece 65 illustrated in FIG. 1 and the like, the outer collar-like locking piece 76 can effectively prevent the shaft section 12 of the outer race 5 from slipping off in the axial direction from the hole 22 of the hub wheel 1. Consequently, it is possible to maintain a stable connected state and realize improvement of a quality of the wheel bearing device.

Figure 22A:
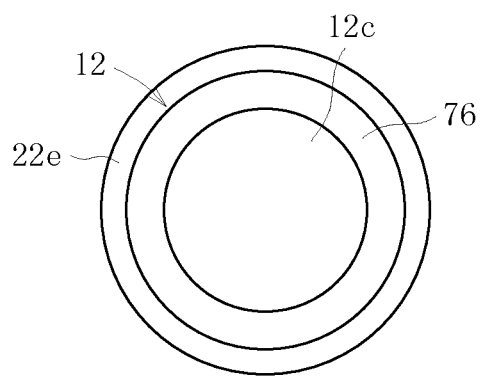
FIG. 22A is an end view of an outer collar-like locking section over the entire circumference, illustrating an end surface of a shaft section of an outer race of the wheel bearing device of FIG. 19.
Figure 22B:
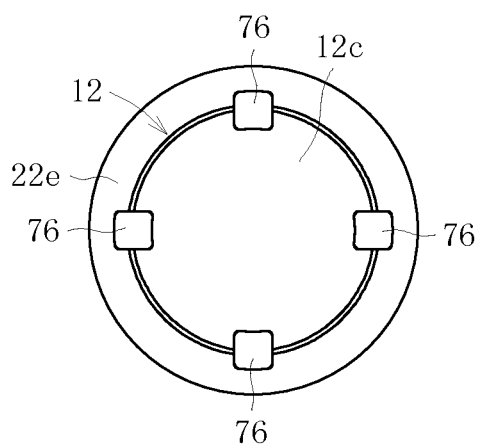
FIG. 22B is an end view of outer collar-like locking sections arranged at a predetermined pitch along a circumferential direction, illustrating the end surface of the shaft section of the outer race of the wheel bearing device of FIG. 19.

If the jig 67 illustrated in FIG. 20 is used, as illustrated in FIG. 22A, the outer collar-like locking piece 76 is formed along a circumferential direction. Therefore, if pressing sections are disposed at a predetermined pitch (e.g., 90° pitch) along the circumferential direction as a jig, as illustrated in FIG. 22B, a plurality of outer collar-like locking pieces 76 are disposed at the predetermined pitch along the circumferential direction. Even if the plurality of outer collar-like locking pieces 76 are arranged at the predetermined pitch along the circumferential direction as illustrated in FIG. 22B, because the outer collar-like locking pieces 76 lock to the stepped surface 22e, it is possible to effectively prevent the shaft section 12 of the outer race 5 from slipping off in the axial direction from the hole 22 of the hub wheel 1.

Figure 23:
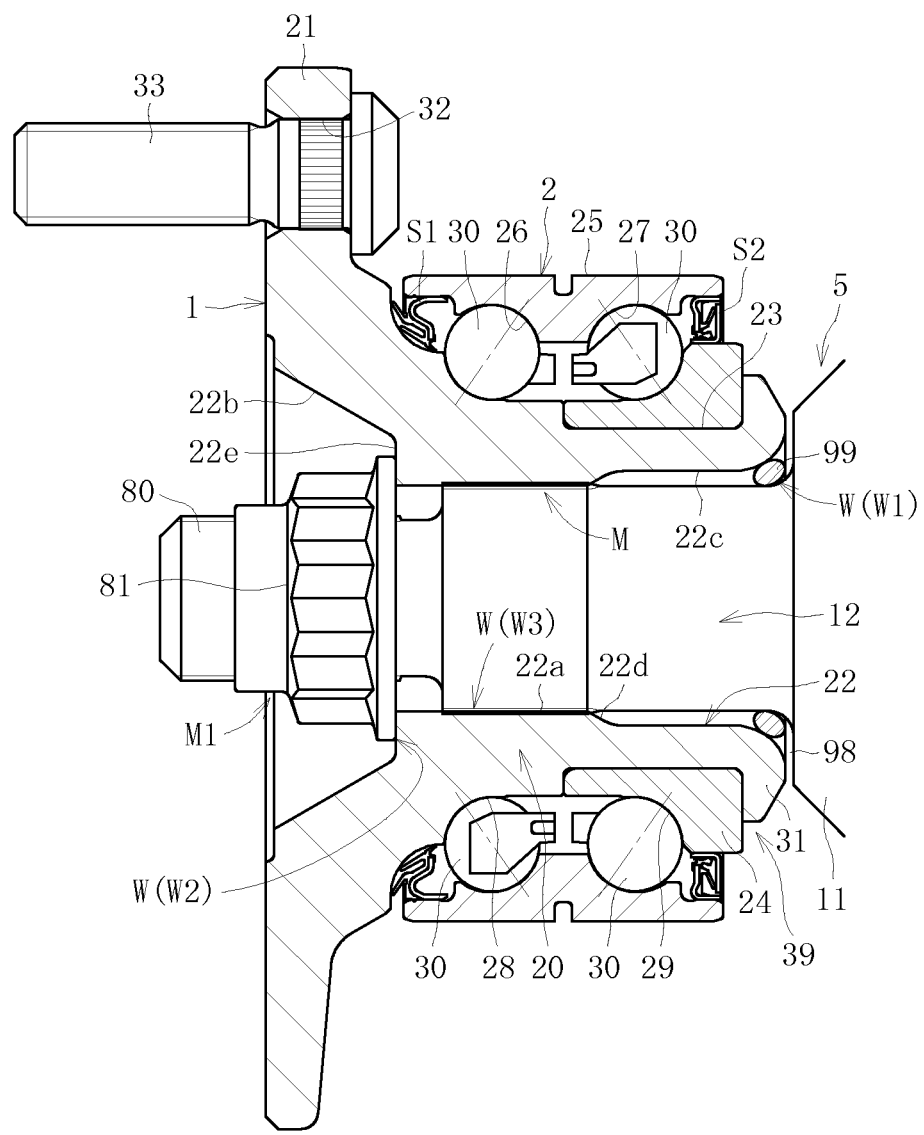
FIG. 23 is an enlarged sectional view of a wheel bearing device in an axle module according to a fourth embodiment of the present invention.
Figure 24:
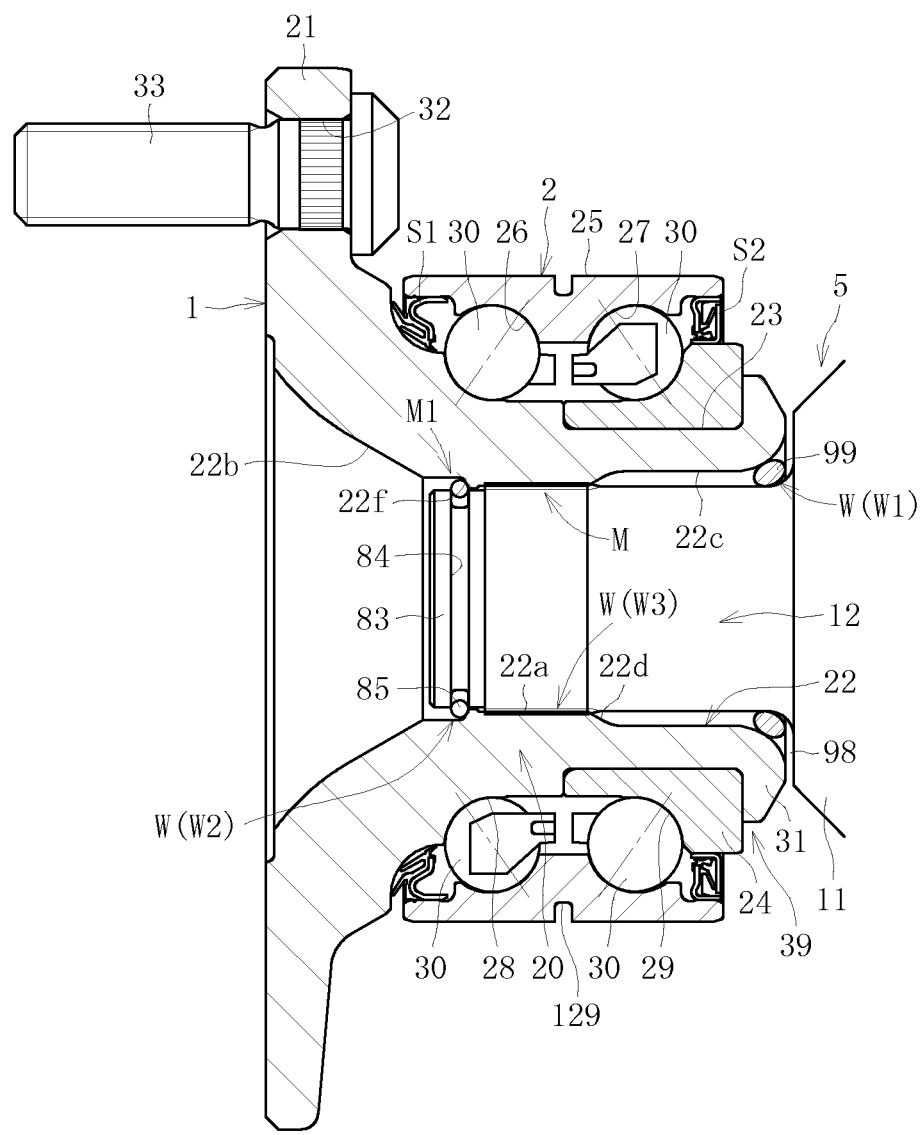
FIG. 24 is an enlarged sectional view of a wheel bearing device in an axle module according to a fifth embodiment of the present invention.
Figure 25:
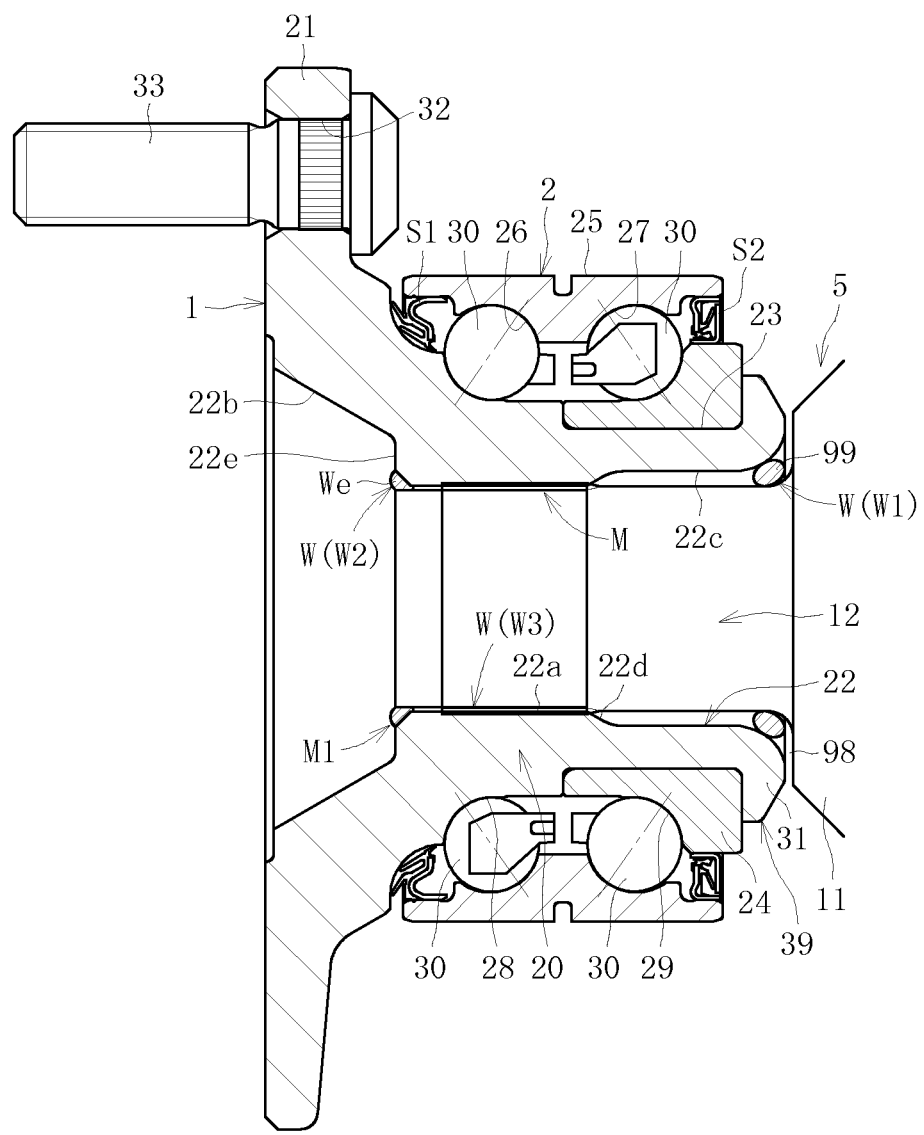
FIG. 25 is an enlarged sectional view of a wheel bearing device in an axle module according to a sixth embodiment of the present invention.

As the shaft section slip-off preventing structure M1, bolt and nut coupling may be used as illustrated in FIG. 23 of a fourth embodiment, a snap ring may be used as illustrated in FIG. 24 of a fifth embodiment, or coupling means such as welding may be used as illustrated in FIG. 25 of a sixth embodiment.

In FIG. 23, a screw shaft section 80 is connected to the shaft section 12 and a nut member 81 is screwed on the screw shaft section 80. The nut member 81 is brought into contact with the stepped surface 22e of the hole 22. Consequently, the shaft section 12 is regulated from slipping off from the hole 22 of the hub wheel 1 to the shaft side.

In FIG. 24, a shaft extending section 83 is provided further on the outboard side than the spline 41. A circumferential groove 84 is provided in the shaft extending section 83 and a snap ring 85 is fitted in the circumferential groove 84. In the hole 22 of the hub wheel 1 of the shaft section 12, a step section 22f to which the snap ring 85 locks is provided between the fitting hole 22a and the tapered hole 22b. Consequently, the snap ring 85 locks to the step section 22f to regulate the shaft section 12 from slipping off from the hole 22 of the hub wheel 1 to the shaft side.

In FIG. 25, an end outer peripheral surface of the shaft section 12 and an opening edge on the stepped surface 22e side of the fitting hole 22a are joined by welding. Consequently, the shaft section 12 is regulated from slipping off from the hole 22 of the hub wheel 1 to the shaft side. In this case, a welding region We may be disposed over the entire circumference or may be disposed at a predetermined pitch along the circumferential direction.

Figure 26:
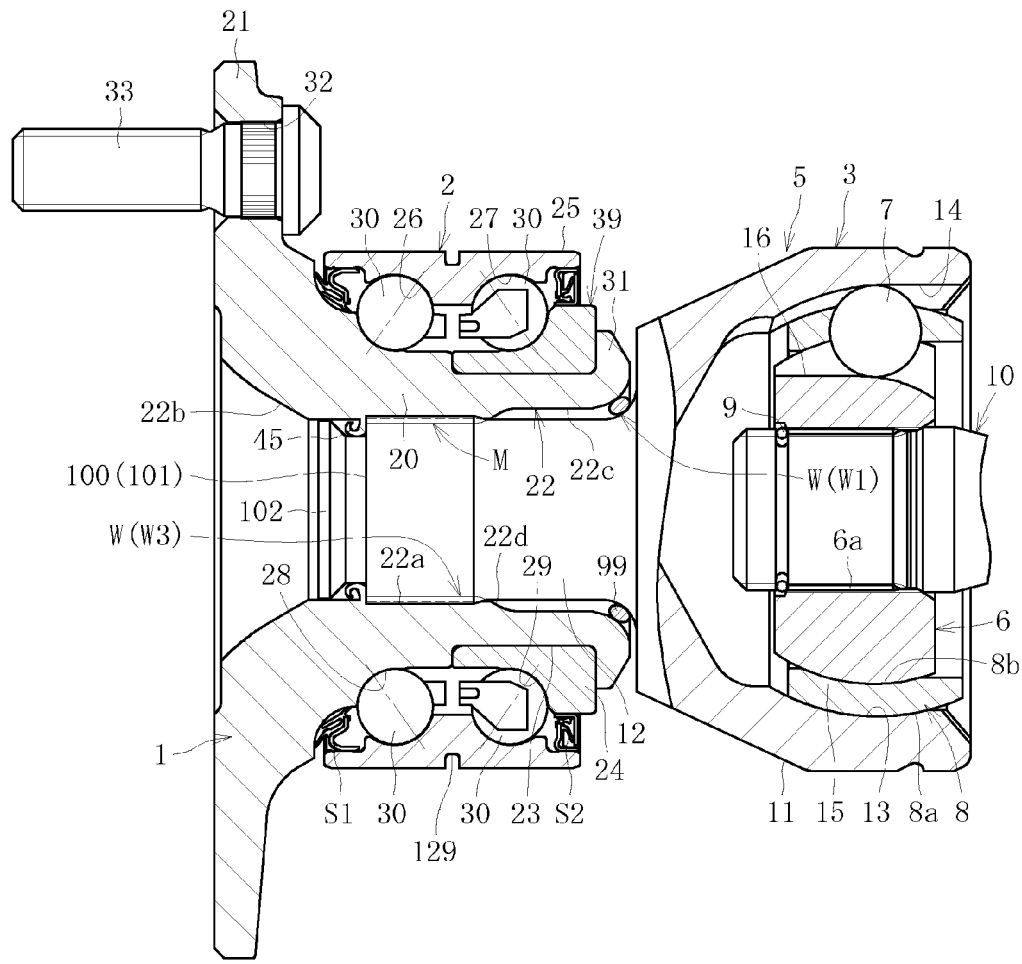
FIG. 26 is an enlarged sectional view of a wheel bearing device in an axle module according to a seventh embodiment of the present invention.
Figure 27:
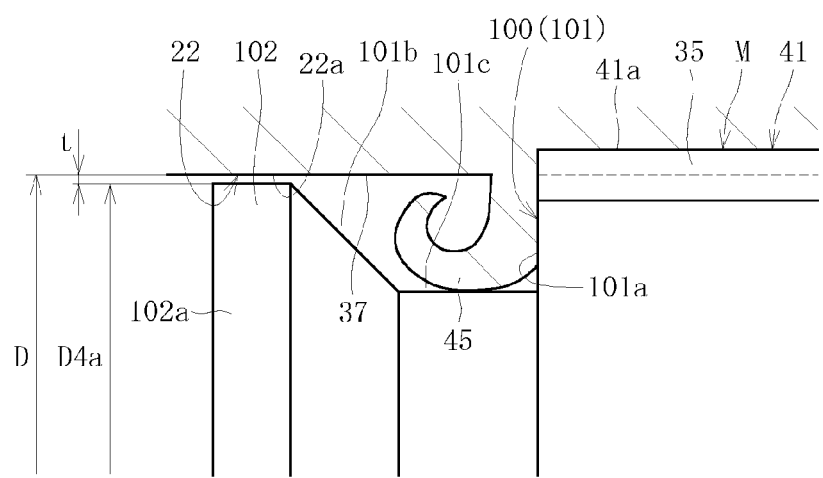
FIG. 27 is an enlarged sectional view of a main part of the wheel bearing device of FIG. 26.

In the wheel bearing device according to the present invention, as illustrated in FIG. 26 illustrating a seventh embodiment, the shaft section slip-off preventing structure M1 does not have to be provided. In this case, as illustrated in FIG. 27, in the circumferential groove 101, a side surface 101a on the spline 41 side is a plane orthogonal to the axial direction and a side surface 101b on an opposite spline side is a tapered surface that is expanded in diameter from a groove bottom 101c to the opposite spline side. A disc-like collar section 102 for centering is provided further on the opposite spline side than the side surface 101b of the circumferential groove 101. An outer diameter dimension D4a of the collar section 102 is set to be the same as or slightly smaller than the hole diameter of the fitting hole 22a of the hole 22. In this case, a very small gap t is provided between an outer diameter surface 102a of the collar section 102 and the inner diameter surface of the fitting hole 22a of the hole 22.

By providing, in the axial direction of the pocket section 100, the collar section 102 for centering with the hole 22 of the hub wheel 1 on the opposite projection side, ejection of the extruded portion 45 in the pocket section 100 to the collar section 102 side is eliminated. Therefore, the extruded portion 45 is more stably stored. Moreover, because the collar section 102 is used for centering, it is possible to press-fit the shaft section 12 into the hub wheel 1 while preventing decentering. Therefore, it is possible to highly accurately connect the outer race 5 and the hub wheel 1 and to perform stable torque transmission.

Because the collar section 102 is used for centering during press fitting, it is preferred to set an outer diameter dimension thereof to a degree slightly smaller than a hole diameter of the fitting hole 22a of the hole 22 of the hub wheel 1. That is, if the outer diameter dimension of the collar section 102 is the same as or larger than the hole diameter of the fitting hole 22a, the collar section 102 itself is press-fitted into the fitting hole 22a. When the collar section 102 is press-fitted into the fitting hole 22a, if the collar section 102 and the fitting hole 22a are decentered, the projections 35 of the recess-projection fitting structure M are press-fitted in this state and the shaft section 12 and the hub wheel 1 are connected under a state in which the axis of the shaft section 12 and the axis of the hub wheel 1 are not aligned. Further, if the outer diameter dimension of the collar section 102 is much smaller than the hole diameter of the fitting hole 22a, the collar section 102 does not function as a section for centering. Therefore, it is preferred to set the very small gap t between the outer diameter surface 102a of the collar section 102 and the inner diameter surface of the fitting hole 22a of the hole 22 to about 0.01 mm to 0.2 mm.

Note that, as illustrated in FIGS. 26 and 27, when the shaft section slip-off preventing structure M1 is not provided, the collar section 102 as the section for centering of the shaft section 12 may be omitted.

Figure 28:
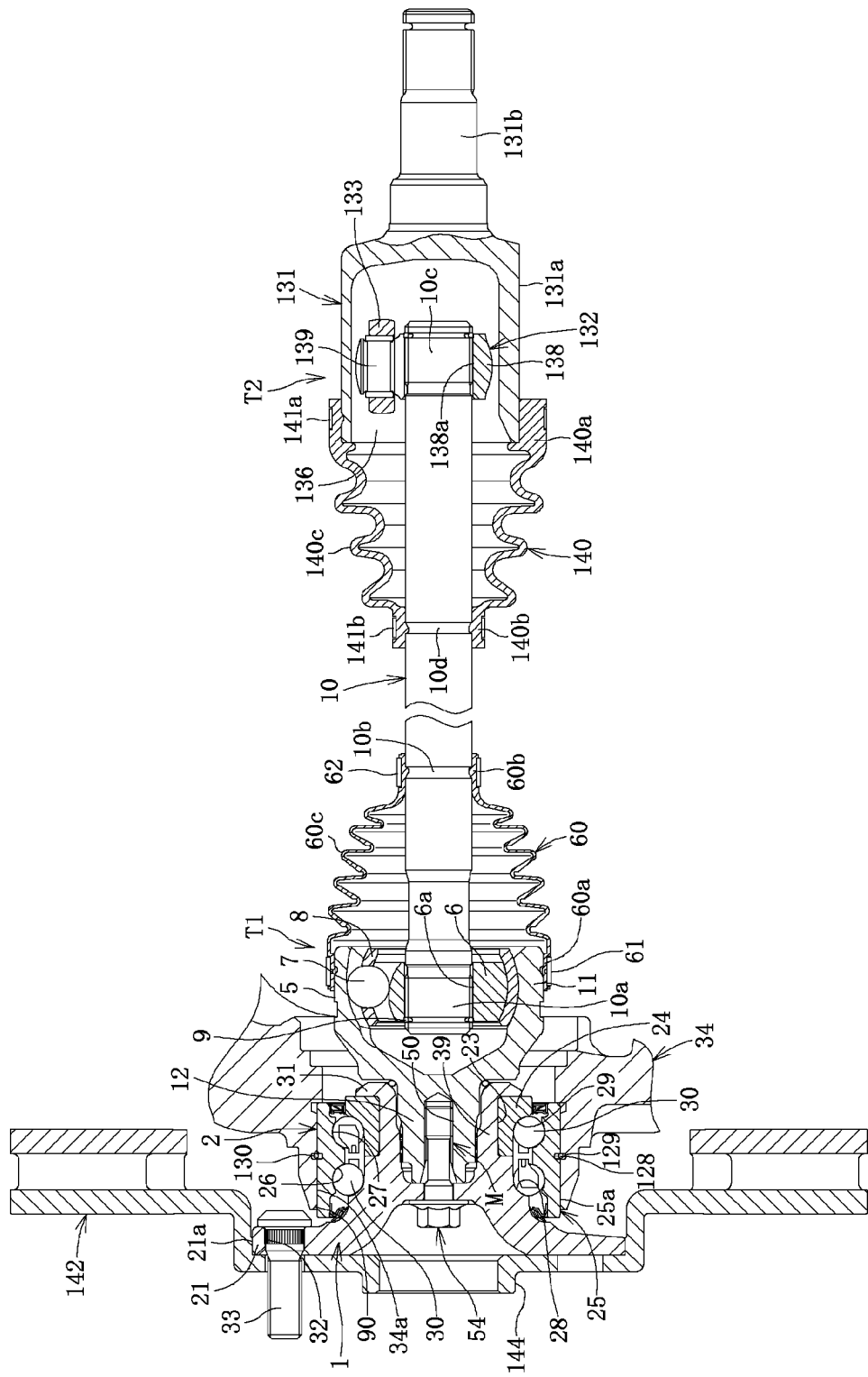
FIG. 28 is a vertical sectional view of an axle module according to an eighth embodiment of the present invention.

Next, FIG. 28 illustrates a case where the recess-projection fitting structure M allows separation by application of a drawing force in the axial direction. Thus, the hub wheel 1 and the shaft section 12 of the outer race 5 of the constant-velocity universal joint 3 are connected to each other through intermediation of a bolt member 54.

The hole 22 of the hub wheel 1 in this case has the shaft section fitting hole 22a and the tapered hole 22b on the outboard side. A positioning inner wall 22g projecting in an inner diameter direction is provided between the shaft section fitting hole 22a and the tapered hole 22b. Further, the hole 22 has the large diameter section 22c on an opening side further on an opposite positioning inner wall side than the shaft section fitting hole 22a and a small diameter section 48 further on a positioning inner wall side than the shaft section fitting hole 22a. The tapered section (tapered hole) 22d is provided between the large diameter section 22c and the shaft section fitting hole 22a. This tapered section 22d is reduced in diameter along a press-fitting direction in coupling the hub wheel 1 and the shaft section 12 of the outer race 5. Note that, a recessed dent section 51 is provided on an end surface on an opposite shaft section fitting hole side of this positioning inner wall 22c.

Further, a screw hole 50 opening to the end surface on the outboard side is provided in an axis section of the shaft section 12. An opening of the screw hole 50 is formed as a tapered section 50a expanded toward an opening side. Further, a small diameter section 12b is provided at the end on the outboard side of the shaft section 12. In other words, the shaft section 12 includes a main body section 12a having a large diameter and the small diameter section 12b.

Figure 29:
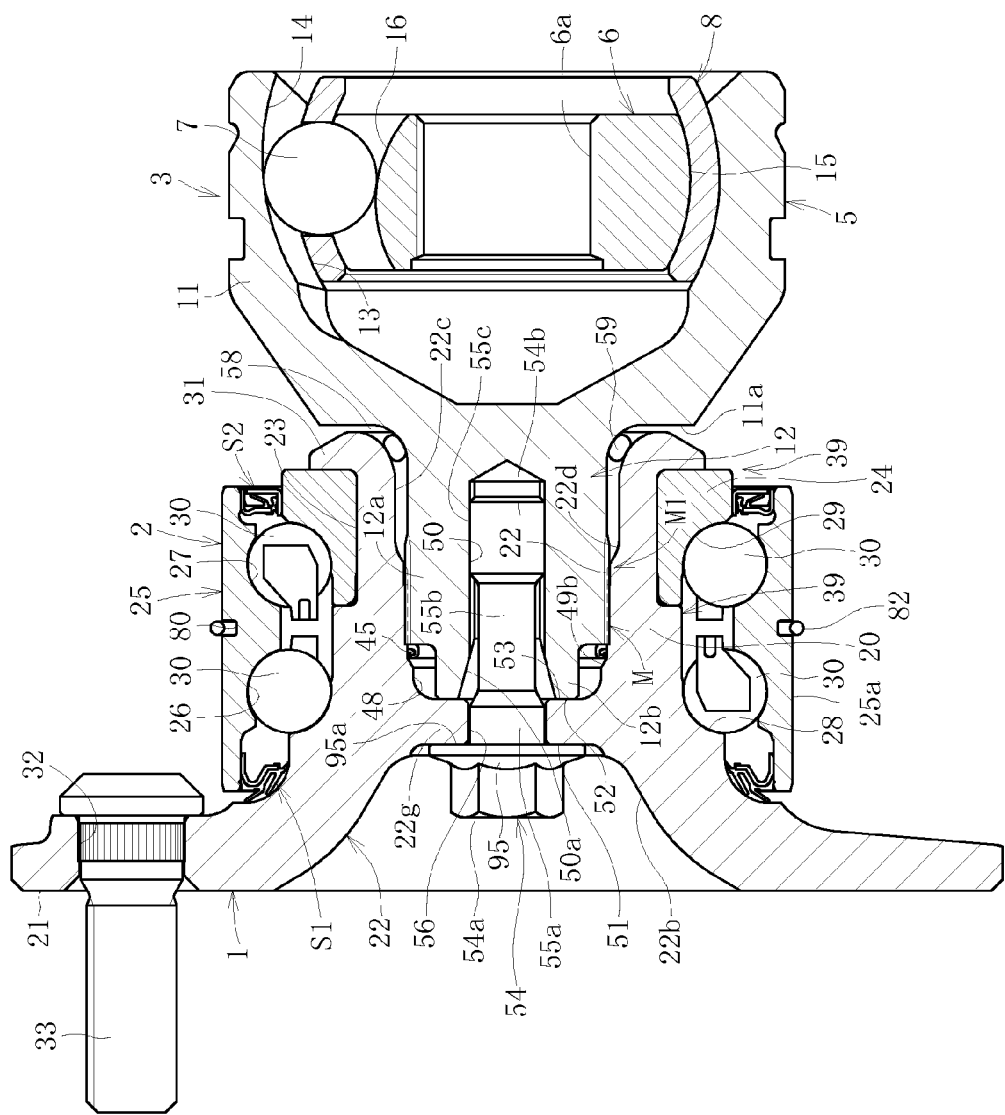
FIG. 29 is an enlarged sectional view of the wheel bearing device of FIG. 28.

A bolt member 54 is screwed in the screw hole 50 of the shaft section 12 from the outboard side. The bolt member 54 includes, as illustrated in FIG. 29, a flanged head 54a and a screw shaft 54b. The screw shaft 54b has a large diameter base section 55a, a small diameter main body section 55b, and a screw section 55c on a distal end side. In this case, a through hole 56 is provided in the positioning inner wall 22g, the shaft 54b of the bolt member 54 is inserted through this through hole 56, and the screw section 55c is screwed in the screw hole 50 of the shaft section 12. A hole diameter d1 of the through hole 56 is set to be slightly larger than the outer diameter d2 of the large diameter base section 55a of the shaft 54b. Specifically, the hole diameter d1 is set such that a difference between the hole diameter d1 and the outer diameter d2 is about 0.05 mm<d1−d2<0.5 mm. Note that, a maximum outer diameter of the screw section 55c is set to be the same as or slightly smaller than the outer diameter of the large diameter base section 55a.

Figure 30:
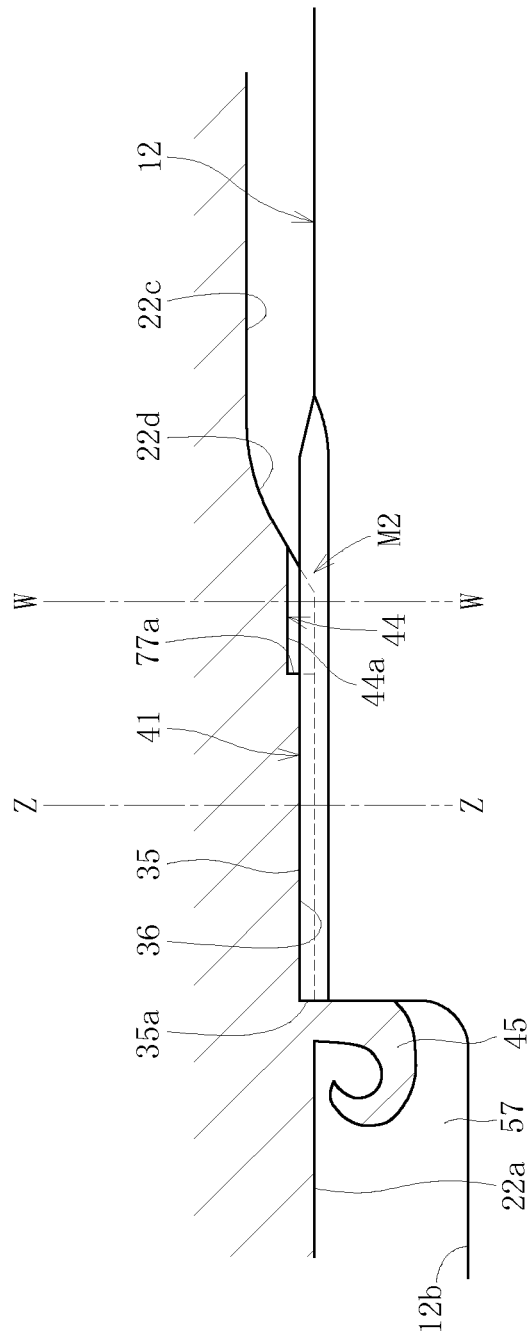
FIG. 30 is an enlarged vertical sectional view of a recess-projection fitting structure of the wheel bearing device of FIG. 28.
Figure 31A:
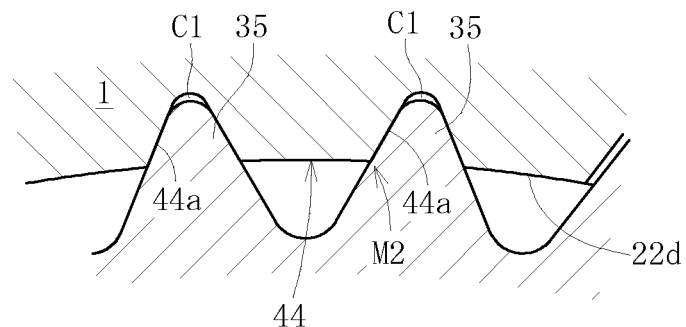
FIG. 31A is a sectional view taken along the line W-W of FIG. 31.

In the wheel bearing device, as illustrated in FIG. 30, a shaft section press-fitting guide structure M2 for performing guide for press fitting of the shaft section 12 during press fitting is provided on a projection press-fitting start side. In this case, the shaft section press-fitting guide structure M2 includes a female spline 44 provided in the tapered section 22d of the hole 22. That is, as illustrated in FIG. 31A, guiding recesses 44a are provided at a predetermined pitch (in this case, a pitch same as the arrangement pitch for the projections 35) along the circumferential direction on the shaft section fitting hole 22a side of the tapered section 22d.

Figure 33:
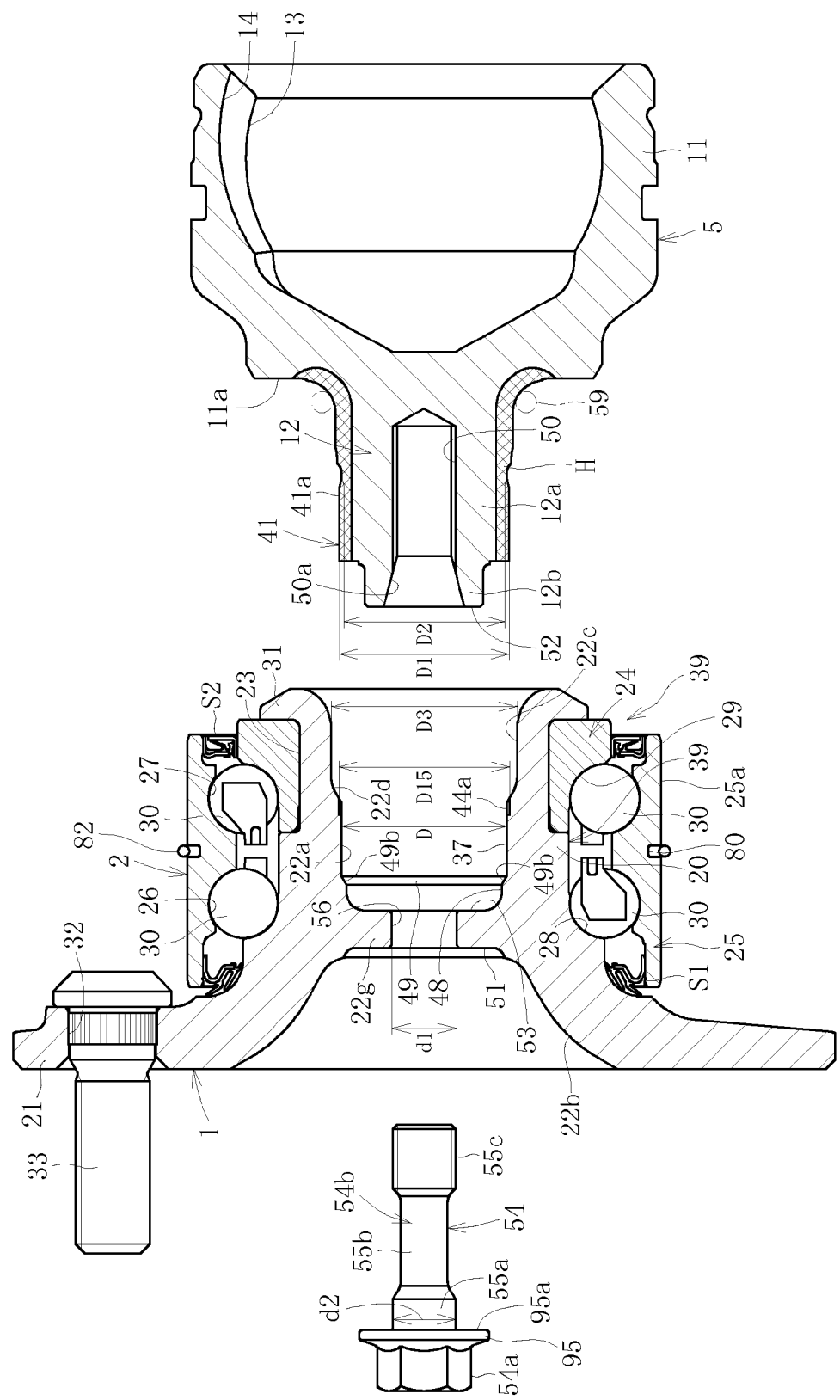
FIG. 33 is an enlarged sectional view of the wheel bearing device of FIG. 28 prior to assembly.

In this case, as illustrated in FIG. 33, a bottom diameter dimension D15 of the guiding recesses 44a is set to be larger than the maximum outer diameter of the projections 35, i.e., the outer diameter dimension (circumscribed circle diameter) D1 of the circle connecting the vertexes of the projections 35 as the projections 41a of the spline 41. As illustrated in FIG. 31A, radial gaps C1 are formed between the vertexes of the projections 35 and the bottoms of the guiding recesses 44a.

Figure 32:
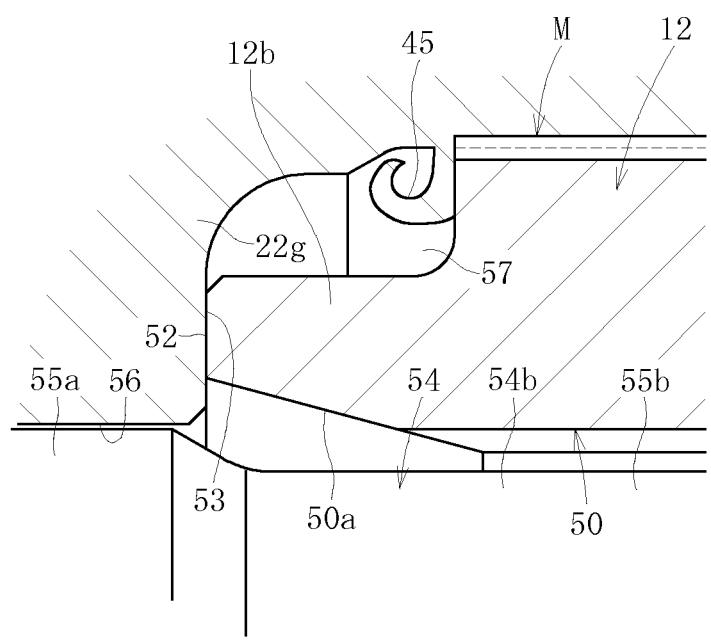
FIG. 32 is an enlarged sectional view of a main part of the wheel bearing device of FIG. 28.

Also in this wheel bearing device, the shaft section 12 of the outer race 5 of the constant-velocity universal joint 3 is press-fitted into the hub wheel 1 when the hub wheel 1 and the constant-velocity universal joint 3 are connected to each other. This press fitting is effected, as illustrated in FIG. 32, until the end surface 52 of the small diameter section 12b of the shaft section 12 comes into contact with an end surface 53 of the positioning inner wall 22g.

After press fitting, the bolt member 54 is screwed in the screw hole 50 of the shaft section 12 from the outboard side. By screwing the bolt member 54 in the screw hole 50 of the shaft section 12 in this way, a flange section 95 of the head 54a of the bolt member 54 is brought into contact with the recessed dent section 51 of the positioning inner wall 22g. Consequently, the positioning inner wall 22g is nipped by the end surface 52 on the outboard side of the shaft section 12 and the head 54a of the bolt member 54.

In this case, a seal material (not shown) may be interposed also between a bearing surface 95a of the bolt member 54 and the positioning inner wall 22g. For example, a seal material (seal agent) made of various kinds of resins that are hardened after application and capable of exerting sealing performance between the bearing surface 95a and the bottom surface of the recessed dent section 51 of the positioning inner wall 22g only has to be applied to the bearing surface 95a of the bolt member 54. Note that, as this seal material, a material that is not deteriorated in an atmosphere in which this wheel bearing device is used is selected.

By bolt fixation, slip-off of the shaft section 12 from the hub wheel 1 in the axial direction is regulated, and torque can be stably transmitted over a long period of time. In particular, with provision of the positioning inner wall 22g nipped by the end surface 52 on the outboard side of the shaft section 12 of the outer race 5 and the head 54a of the bolt member 54, the bolt fixation is stabilized and dimension accuracy of the wheel bearing device is stabilized due to the positioning. In addition, it is possible to secure a stable length as an axial length of the recess-projection fitting structure M disposed along the axial direction and to realize improvement of torque transmission performance.

Further, because the seal material is interposed between the bearing surface 95a of the bolt member 54 for performing the bolt fixation of the hub wheel 1 and the shaft section 12 of the outer race 5, and the positioning inner wall 22g, it is possible to prevent intrusion of rainwater, foreign matters, and the like into the recess-projection fitting structure M from the bolt member 54, and to realize improvement of quality. Because the shaft section press-fitting guide structure M2 is provided, the shaft section 12 can be press-fitted along the shaft section press-fitting guide structure M2 when being press-fit to the hole 22 of the hub wheel 1.

When the shaft section 12 is press-fitted in the hole 22 of the hub wheel 1, the extruded portion 45 formed in accordance therewith is stored, while being curled, into a pocket section (storing section) 57 provided on an outer diameter side of the small diameter section 12b of the shaft section 12.

Figure 34:
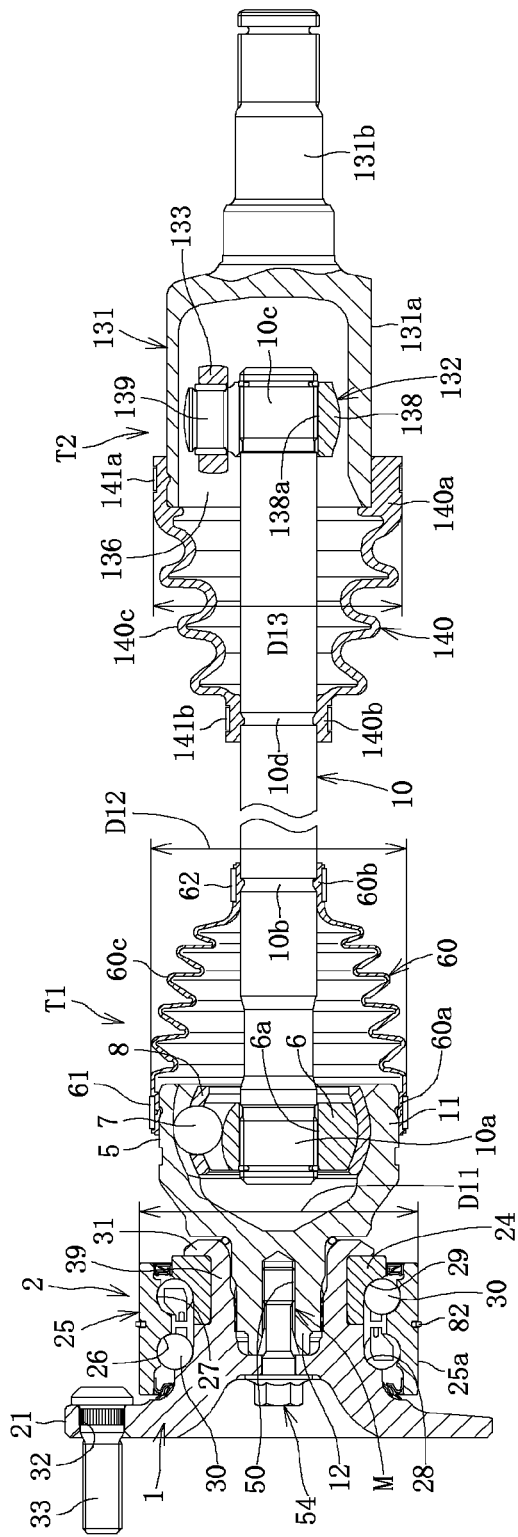
FIG. 34 is a sectional view of an axle module in an assembled state.
Figure 35:
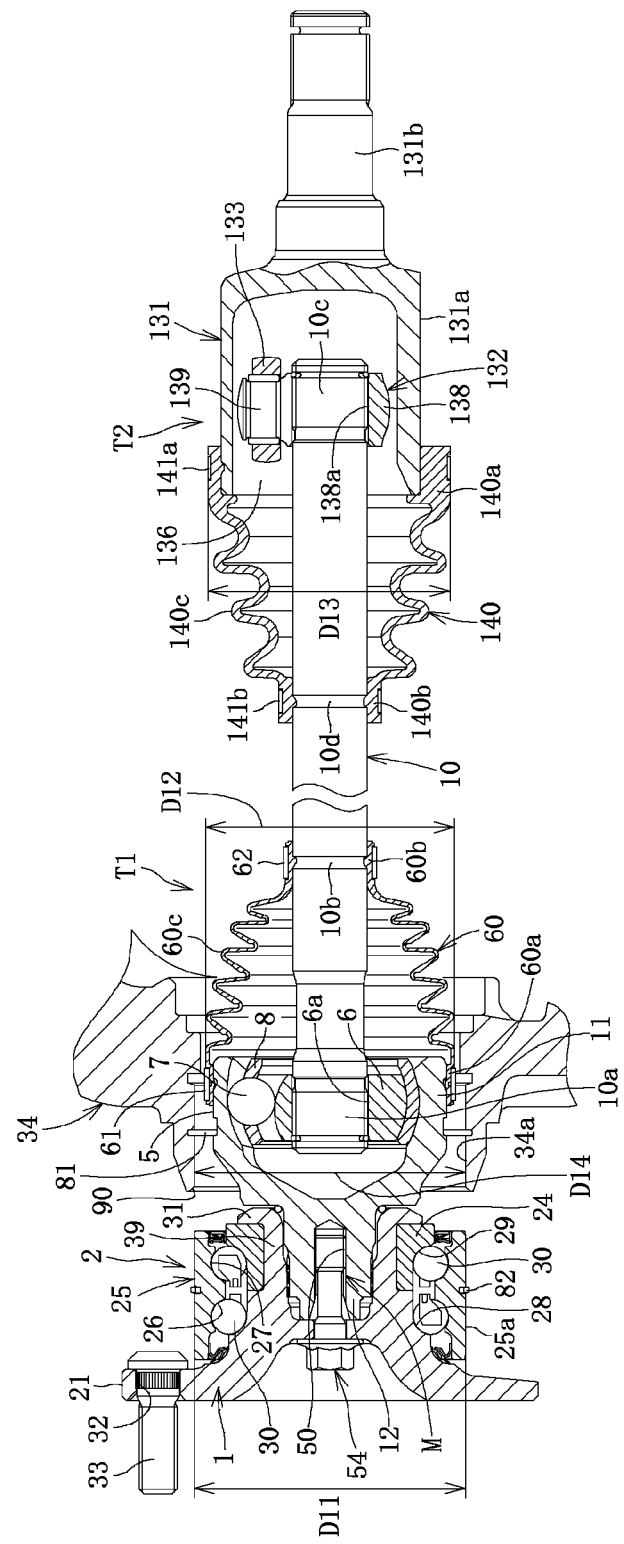
FIG. 35 is a sectional view of a method of mounting an axle module to a knuckle.

Other configuration details of this axle module illustrated in FIG. 28 are the same as those of the axle module illustrated in FIG. 1. Therefore, the components same as those illustrated in FIG. 1 are denoted by the same reference symbols and description of the components is omitted. Thus, after the axle module is assembled as illustrated in FIG. 34, the following steps are performed: this axle module is let into the knuckle 34 from the inboard-side constant-velocity universal joint T2 side; the axle module is then caused to pass the outboard-side constant-velocity universal joint T1; and lastly, the outer member 25 of the wheel bearing device is press-fitted into the inner peripheral surface 34a of the hole of the knuckle 34 as illustrated in FIG. 35. Therefore, the axle module illustrated in FIG. 28 also realizes operations and effects same as those of the axle module illustrated in FIG. 1.

In the wheel bearing device, if the bolt member 54 is removed by screwing back the bolt member 54 from the state illustrated in FIG. 29, the hub wheel 1 can be drawn out from the outer race 5. In other words, a fitting force of the recess-projection fitting structure M is large enough that the outer race 5 can be drawn out by applying a drawing force equal to or larger than a predetermined force to the outer race 5.

Figure 36:
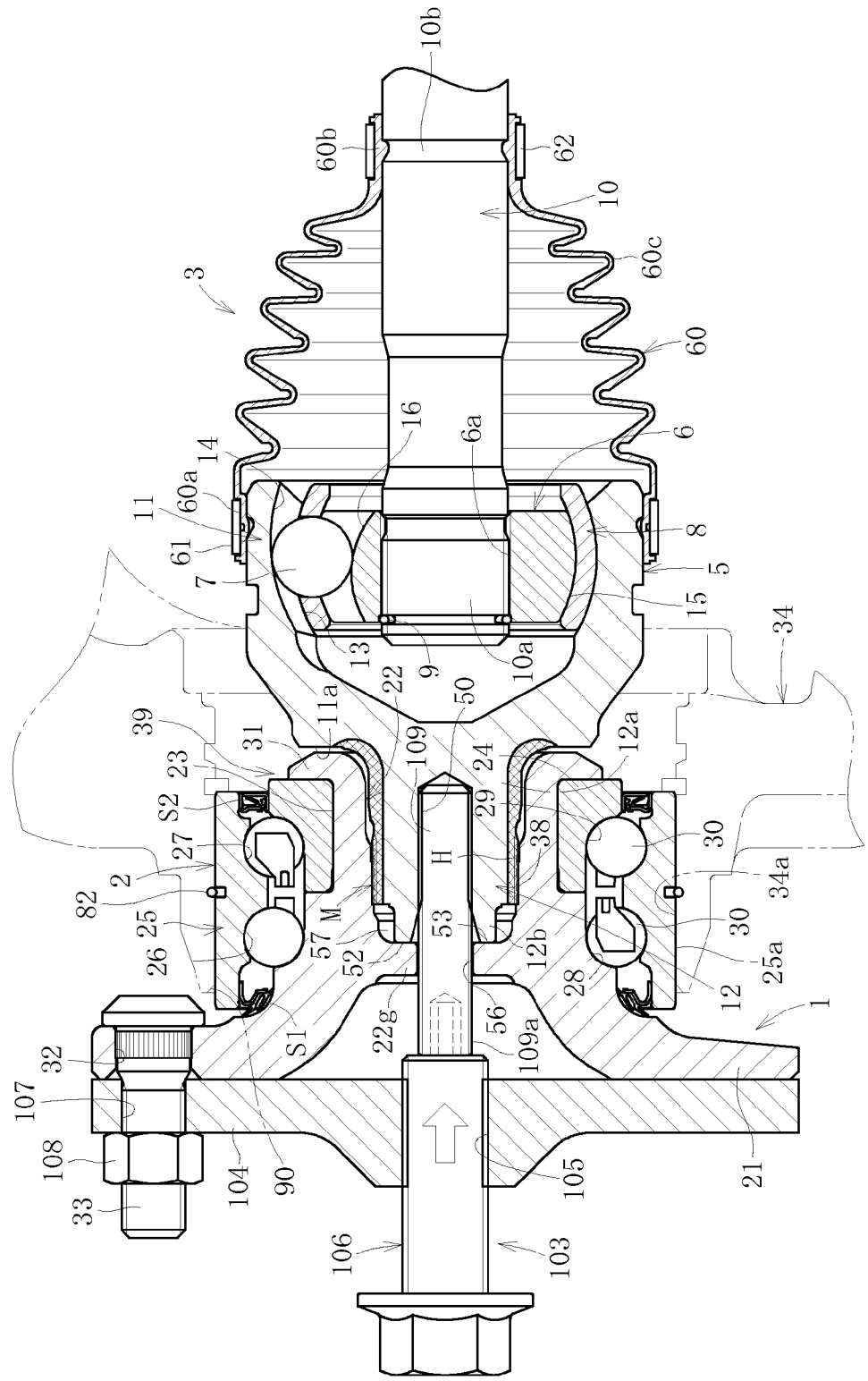
FIG. 36 is a sectional view illustrating a method of separating the wheel bearing device.

For example, the hub wheel 1 and the constant-velocity universal joint 3 can be separated by a jig 103 illustrated in FIG. 36. The jig 103 includes a base 104, a pressing bolt member 106 screwed in a screw hole 105 of the base 104 to be capable of being screwed in and back, and a screw shaft 109 screwed in the screw hole 50 of the shaft section 12. A through hole 107 is provided in the base 104. The bolt 33 of the hub wheel 1 is inserted through the through hole 107 and a nut member 108 is screwed on the bolt 33. When the nut member 108 is screwed on the bolt 33, the base 104 and the flange 21 of the hub wheel 1 are superimposed and the base 104 is attached to the hub wheel 1.

In this way, after the base 104 has been mounted to the hub wheel 1, or before mounting the base 104, the screw shaft 109 is screwed in the screw hole 50 of the shaft section 12 so that a base section 109*a* may protrude to the outboard side from the positioning inner wall 22*g*. The protruding amount of the base section 109*a* is set to be larger than the axial length of the recess-projection fitting structure M. The screw shaft 109 and the pressing bolt member 106 are arranged in the same axis (on the axis of the wheel bearing device).

After that, as illustrated in FIG. 36, the pressing bolt member 106 is screwed in the screw hole 105 of the base 104 from the outboard side, and in this state, the bolt member 106 is caused to threadedly advance to the screw shaft 109 side in the direction of the arrow. In this process, the screw shaft 109 and the pressing bolt member 106 are arranged in the same axis (on the axis of the wheel bearing device). Therefore, with the threading advancement, the pressing bolt member 106 presses the screw shaft 109 in an arrow direction. This causes the outer race 5 to move in the arrow direction with respect to the hub wheel 1, and the hub wheel 1 is removed from the outer race 5.

Figure 38A:
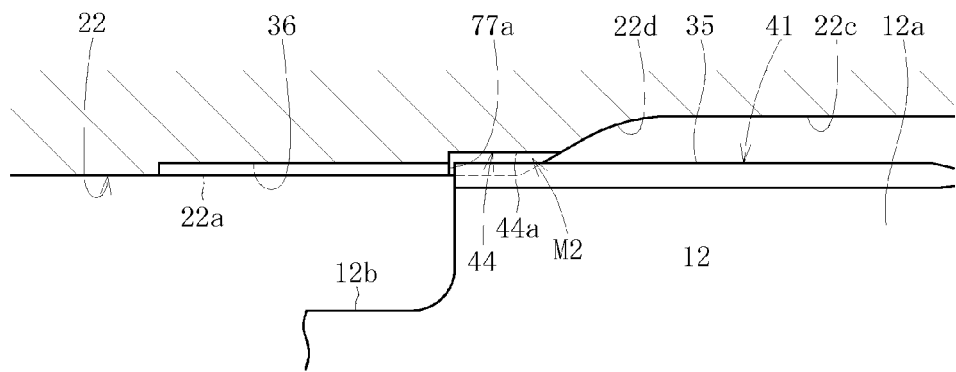
FIG. 38A is a sectional view illustrating a method of re-press-fitting, specifically, a state immediately prior to press-fitting.

Further, under the state in which the outer race 5 is removed from the hub wheel 1, it is possible to connect the hub wheel 1 and the outer race 5 together again using, for example, the bolt member 54. That is, as a state in which the base 104 is removed from the hub wheel 1 and the screw shaft 109 is removed from the shaft section 12, the projections 35 of the shaft section 12 are inserted into the guiding recesses 44*a* as illustrated in FIG. 38A. Consequently, phases of the male spline 41 on the shaft section 12 side and the female spline 42 of the hub wheel 1 formed by the previous press-fitting are aligned. When the phases are aligned, as illustrated in FIG. 31A, the radial gaps C1 are formed between the vertexes of the projections 35 and the bottoms of the guiding recesses 44*a*.

Figure 37:
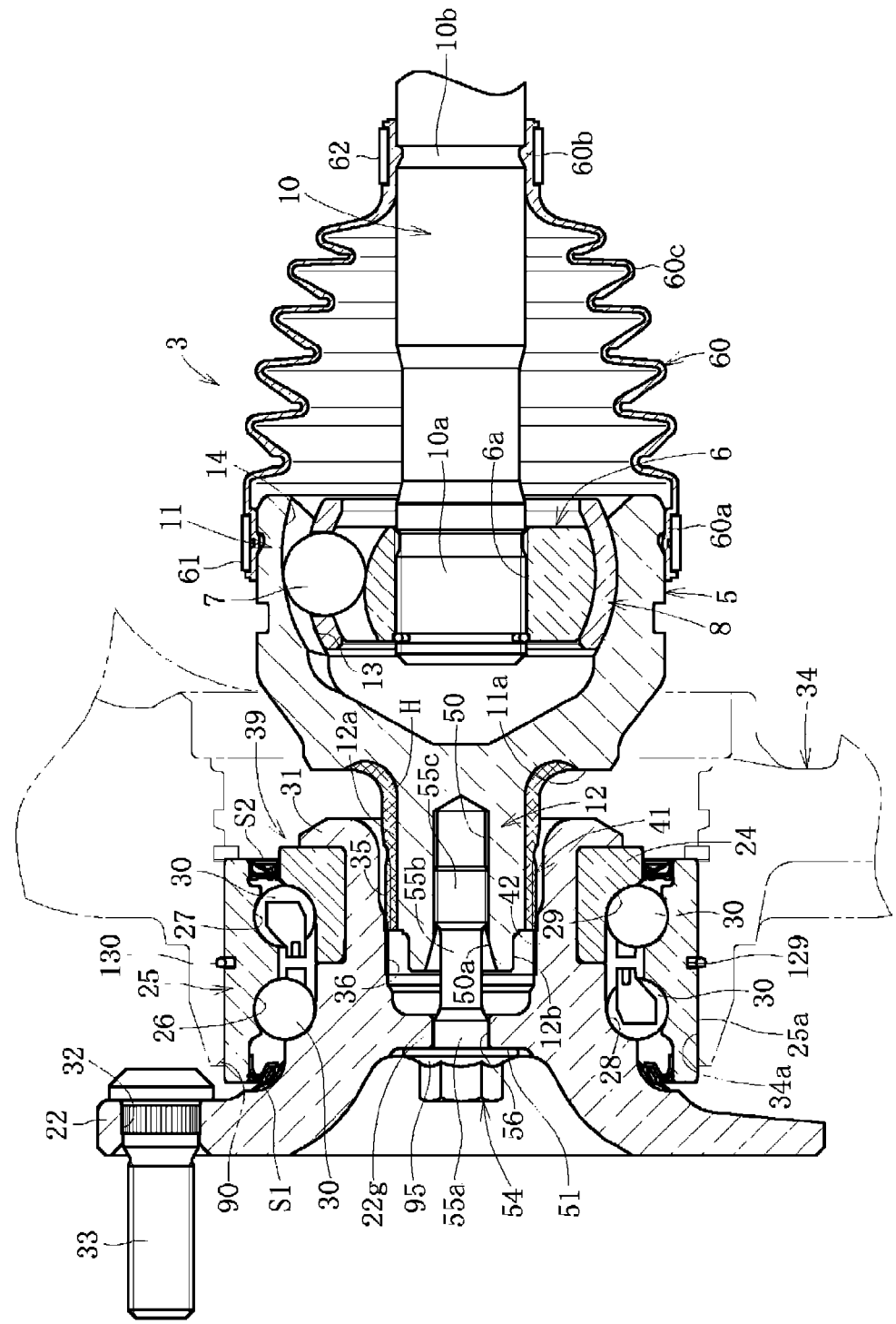
FIG. 37 is a sectional view illustrating a method of re-press-fitting
Figure 38B:
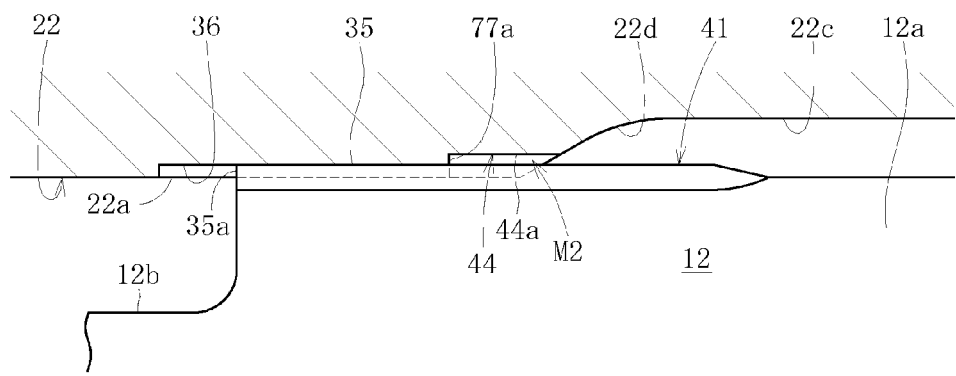
FIG. 38B is a sectional view illustrating a middle of the press-fitting.
Figure 38C:
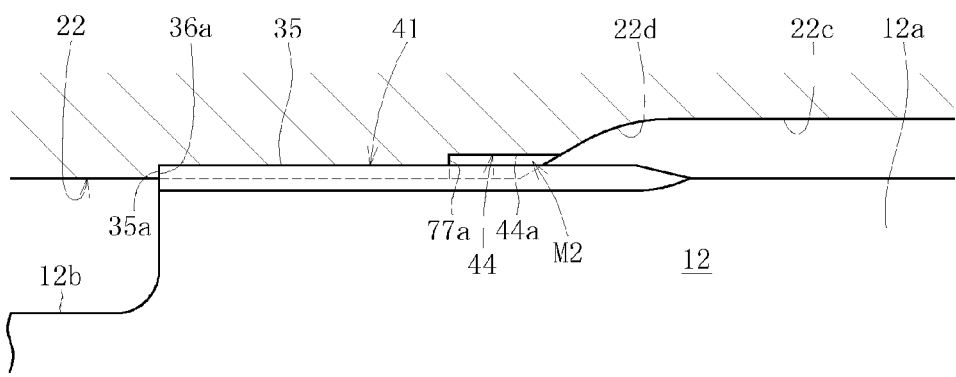
FIG. 38C is a sectional view illustrating a press-fitting completion state.

In this state, as illustrated in FIG. 37, the bolt member 54 is screwed in the screw hole 50 of the shaft section 12 through intermediation of the through hole 56, and the bolt member 54 is caused to threadedly advance with respect to the screw hole 50. As a result, as illustrated in FIG. 38B, the shaft section 12 is gradually fitted into the hub wheel 1. At this time, the hole 22 is slightly expanded in diameter and allows entry in the axial direction of the shaft section 12. The shaft section 12 enters until the end surface 52 of the small diameter section 12*b* of the shaft section 12 comes into contact with the end surface 53 of the positioning inner wall 22*g*. In this case, the positioning inner wall 22*g* and the small diameter section 12*b* come into contact with each other, and at the same time, as illustrated in FIG. 38C, the end surfaces 35*a* of the projections 35 come into contact with end surfaces 36*a* of the recesses 36. When the movement in the axial direction is stopped, the hole 22 is reduced in diameter to return to the original diameter. Consequently, as in the previous press fitting, it is possible to surely configure the recess-projection fitting structure M in which the entire recess fitting regions of the projections 35 are held in close contact with the recesses 36 corresponding thereto.

Note that, the opening of the screw hole 50 of the shaft section 12 is formed as the tapered section 50*a* opening toward the opening side. Therefore, there is an advantage that the screw shaft 109 and the bolt member 54 are easily screwed in the screw hole 50.

In the first time (press fitting for molding the recesses 36 in the inner diameter surface 37 of the hole 22), because press-fitting load is relatively large, for press fitting, it is necessary to use a press machine or the like. Meanwhile, in press fitting in the second time, because press-fitting load is smaller than the press-fitting load in the first time. Therefore, it is possible to stably and accurately press-fit the shaft section 12 into the hole 22 of the hub wheel 1 without using the press machine or the like. Therefore, it is possible to separate and connect the outer race 5 and the hub wheel 1 on the site.

By applying the drawing force in the axial direction to the shaft section 12 of the outer race 5 in this way, the outer race 5 can be removed from the hole 22 of the hub wheel 1. Therefore, it is possible to realize improvement of workability for repairing and inspection (maintainability) of each component. Moreover, by press-fitting the shaft section 12 of the outer race 5 into the hole 22 of the hub wheel 1 again after the repairing and inspection of each of the components, the recess-projection fitting structure M in which the entire fitting contact regions 38 of the projections 35 and the recesses 36 are held in close contact with each other can be configured. Therefore, it is possible to configure again a wheel bearing device capable of performing stable torque transmission.

The shaft section press-fitting guide structure M2 has the guiding recesses 44*a* for aligning a phase of the one-side projections 35 and a phase of the other-side recesses 36. Therefore, when the shaft section 12 of the outer joint member is press-fitted into the hole 22 of the hub wheel 1 again, the shaft section 12 fits in the recesses 36 formed by the previous press fitting and does not damage the recesses 36. Therefore, it is possible to highly accurately configure again the recess-projection fitting structure M in which a gap that causes a backlash is not formed in the radial direction and the circumferential direction.

By forming gaps between the vertexes of the projections 35 and the bottoms of the guiding recesses 44*a*, the projections 35 can be easily fitted in the guiding recesses 44*a* in a pre-press fitting process. Moreover, the guiding recesses 44*a* do not hinder press-fitting of the projections 35. Therefore, it is possible to realize improvement of assemblability.

When the bolt member 54 is caused to threadedly advance with respect to the screw hole 50, as illustrated in FIG. 33, the base section 55*a* of the bolt member 54 corresponds to the through hole 56. In addition, the hole diameter d1 of the through hole 56 is set to be slightly larger than the outer diameter d2 of the large diameter base section 55*a* of the shaft 54*b* (specifically, set to about 0.05 mm<d1−d2<0.5 mm). Thus, a guide when the bolt member 54 threadedly advances in the screw hole 50 can be configured by the outer diameter of the base section 55*a* of the bolt member 54 and the inner diameter of the through hole 56. Without decentering, the shaft section 12 can be press-fitted in the hole 22. Note that, when the axial length of the through hole 56 is extremely short, the through hole 56 cannot function as a stable guide. Conversely, when the axial length of the through hole 56 is extremely long, the thickness dimension of the positioning inner wall 22*g* becomes large, and thus the axial length of the recess-projection fitting structure M cannot be secured, and the weight of the hub wheel 1 becomes large. Therefore, it is possible to make various changes taking into account those disadvantages.

Figure 31B:
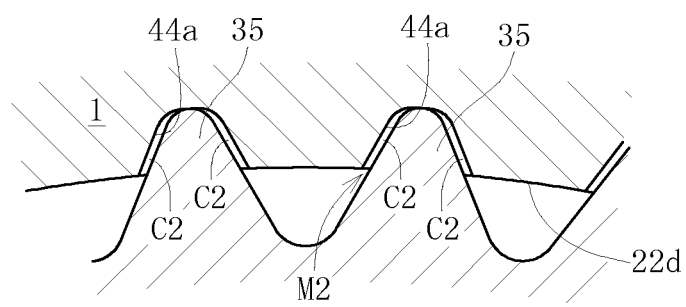
FIG. 31B is an enlarged sectional view of a first modification of a shaft section press-fitting guide structure.
Figure 31C:
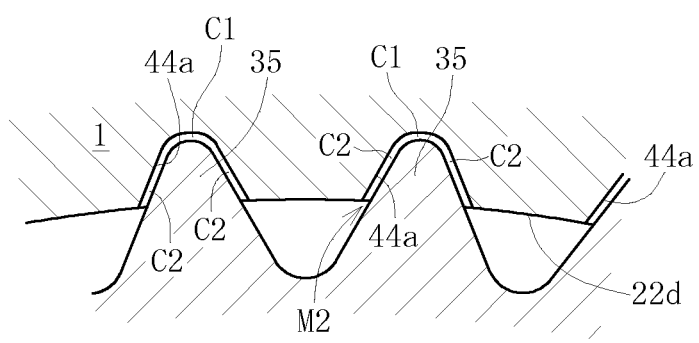
FIG. 31C is an enlarged sectional view of a second modification of a shaft section press-fitting guide structure.

In the embodiment, as illustrated in FIG. 31A, the radial gaps C1 are formed between the vertexes of the projections 35 and the bottoms of the guiding recesses 44*a*. However, as illustrated in FIG. 31B, circumferential gaps C2 and C2 may be formed between the sides of the projections 35 and the sides of the guiding recesses 44*a*. Further, as illustrated in FIG. 31C, the radial gaps C1 may be formed between the vertexes of the projections 35 and the bottoms of the guiding recesses 44a and the circumferential gaps C2 may be formed between the sides of the projections 35 and the sides of the guiding recesses 44a. By forming such gaps, it is possible to easily fit the projections 35 in the guiding recesses 44a in the pre-press fitting process. Moreover, the guiding recesses 44a do not hinder press fitting of the projections 35.

Figure 39A:
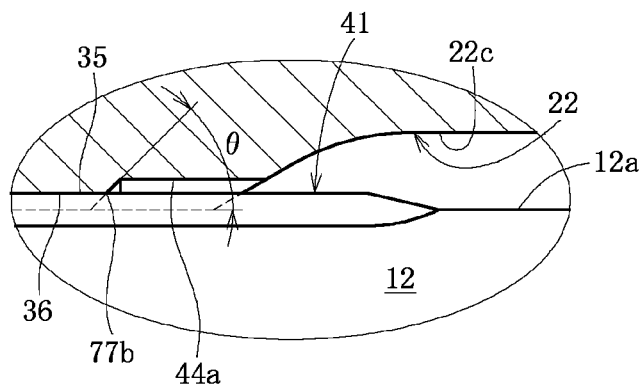
FIG. 39A is a sectional view of a third modification of a shaft section press-fitting guide structure.

The shaft section press-fitting guide structure M2 may be that illustrated in FIG. 39. In FIG. 39A, the end on the recess-projection fitting structure M side of each of the guiding recesses 44a is a tilting surface 77b that is reduced in diameter along a press-fitting direction (press-fitting progress direction). In other words, a tilt angle θ of the tilting surface 77b is, for example, about 30° to 60°.

Figure 39B:
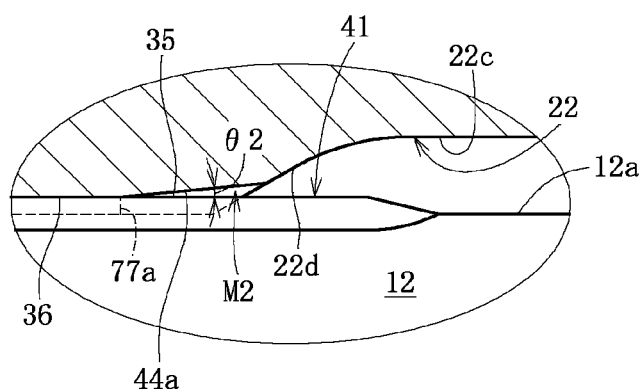
FIG. 39B is a sectional view of a fourth modification of a shaft section press-fitting guide structure.
Figure 39C:
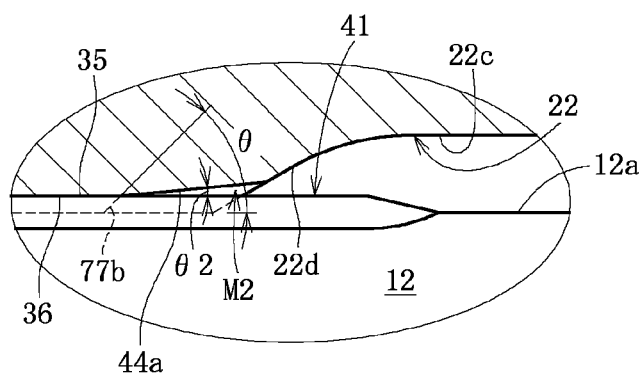
FIG. 39C is a sectional view of a fifth modification of a shaft section press-fitting guide structure.

In FIGS. 39B and 39C, a radial depth dimension of each of the guiding recesses 44a is reduced in diameter along the press-fitting direction. Further, in FIG. 39B, the end on the recess-projection fitting structure M side is a flat surface 77a orthogonal to the press-fitting direction. In FIG. 39C, the end on the recess-projection fitting structure M side is the tilting surface 77b that is reduced in diameter along the press-fitting direction (press-fitting progress direction).

If the end on the recess-projection fitting structure M side of each of the guiding recesses 44a is the flat surface 77a orthogonal to the press-fitting direction, when the shaft section 12 is press-fitted into the hole 22, the flat surface 77a can receive the shaft section 12. Further, if the end is the tilting surface 77b, the projections 35 can be stably fitted in the recesses 36 on the opposite side from the guiding recesses 44a. Even if the radial depth of each of the guiding recesses 44a is reduced in diameter along the press-fitting direction, the projections 35 can be stably fitted in the recesses 36 on the opposite side from the guiding recesses 44a.

Figure 40:
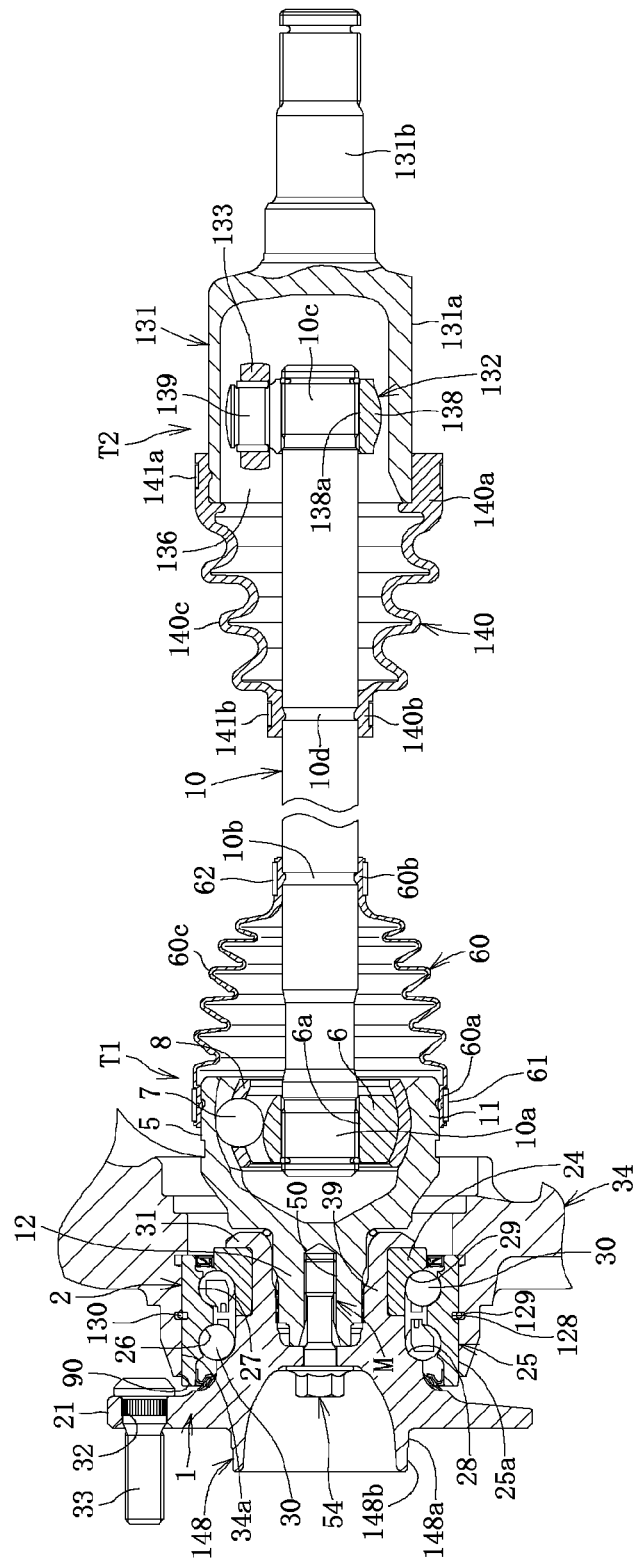
FIG. 40 is a vertical sectional view illustrating a state in which an axle module according to a ninth embodiment of the present invention is mounted to the knuckle.

Next, FIG. 40 illustrates another embodiment. In this case, a pilot section 148 formed of the brake pilot section 148a and the wheel pilot section 148b is provided to the outboard-side end surface of the hub wheel 1. Other configuration details of this axle module illustrated in FIG. 40 are the same as those of the axle module illustrated in FIG. 1. Therefore, the components same as those illustrated in FIG. 1 are denoted by the same reference symbols and description of the components is omitted.

Figure 41:
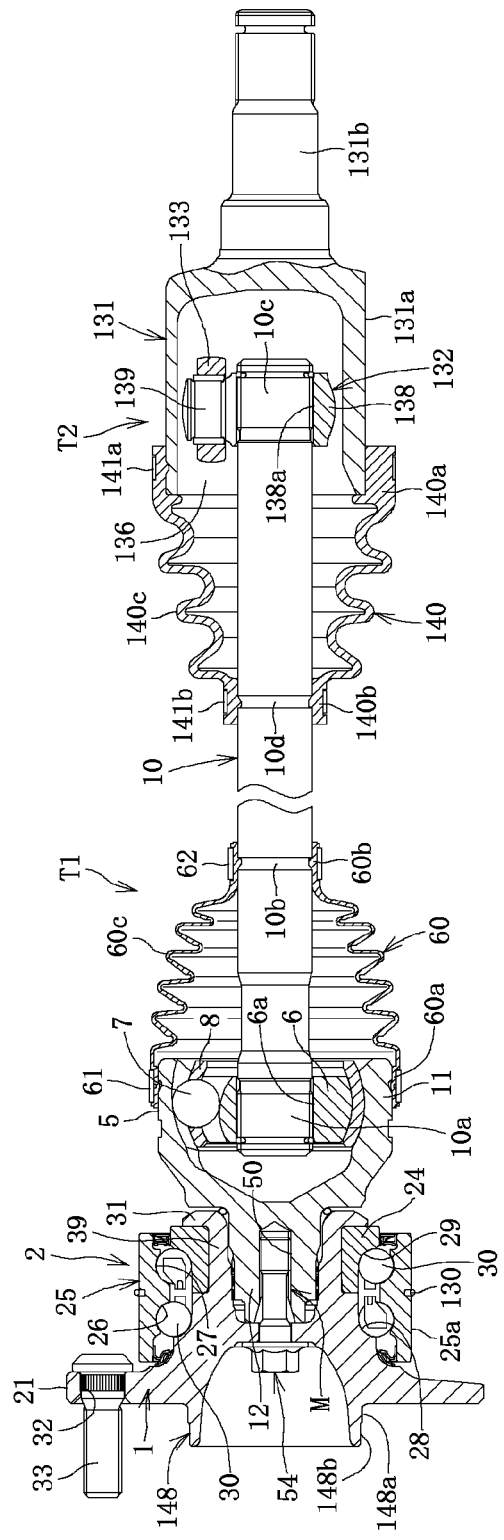
FIG. 41 is a vertical sectional view of the axle module of FIG. 40.
Figure 42:
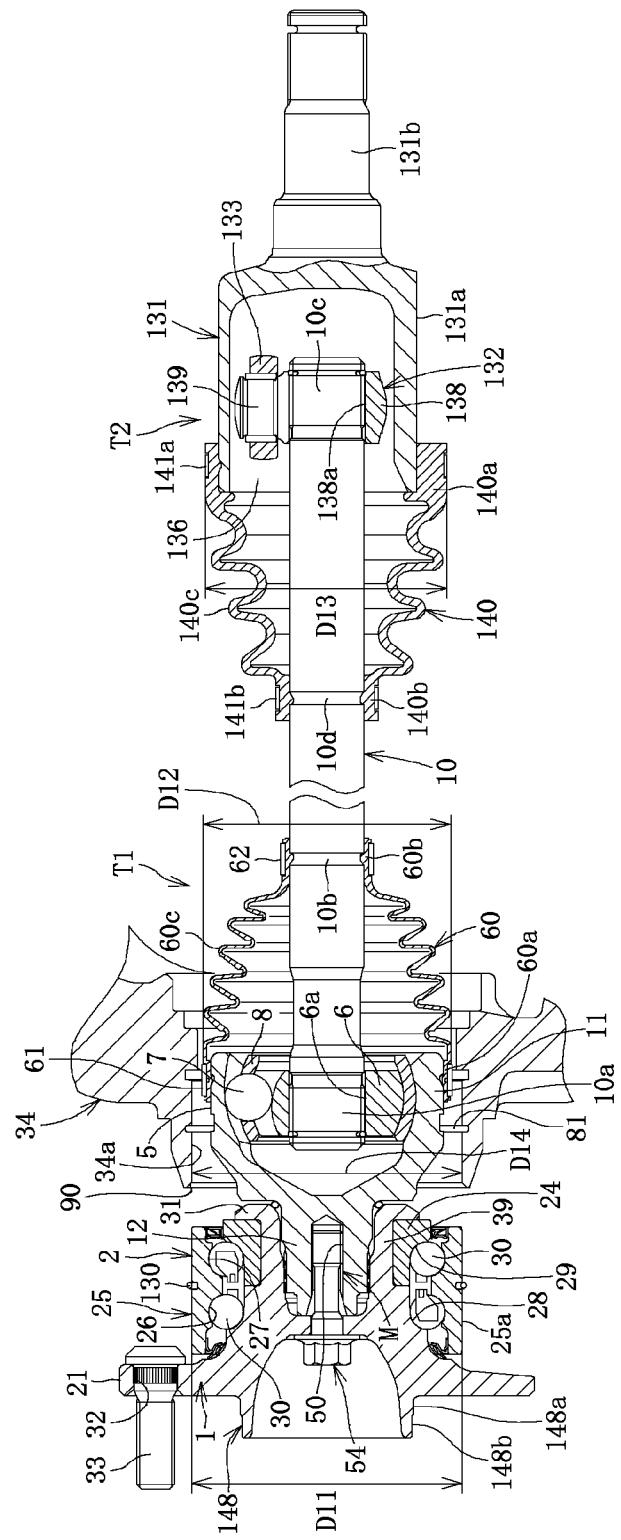
FIG. 42 is a vertical sectional view illustrating a method of mounting the axle module of FIG. 40 to the knuckle.

Thus, after the axle module is assembled as illustrated in FIG. 41, the following steps are performed: this axle module is let into the knuckle 34 from the inboard-side constant-velocity universal joint T2 side; then caused to pass the outboard-side constant-velocity universal joint T1; and lastly, the outer member 25 of the wheel bearing device is press-fitted into the inner peripheral surface 34a of the hole of the knuckle 34 as illustrated in FIG. 42. Therefore, the axle module illustrated in FIG. 40 also realizes operations and effects same as those of the axle module illustrated in FIG. 1.

Figure 3B:
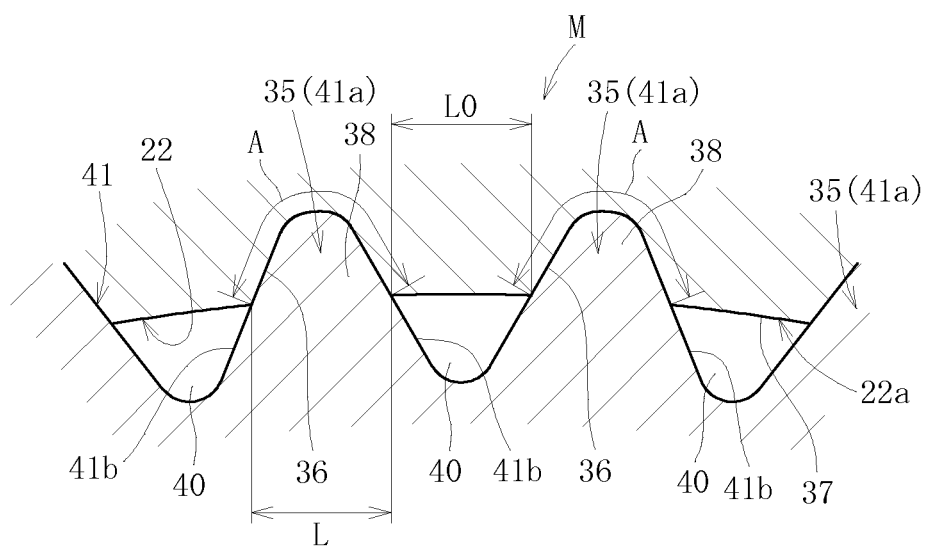
FIG. 3B is an enlarged view of the X section of FIG. 3A.

In the spline 41 illustrated in FIG. 3, the pitch of the projections 41a and the pitch of the recesses 41b are set to the same value. Thus, in the above-mentioned embodiment, as illustrated in FIG. 3B, a circumferential thickness L of projecting direction intermediate regions of the projections 35, and a circumferential dimension L0 in a position corresponding to the intermediate region between the projections 35 adjacent to each other in the circumferential direction are substantially the same.

Figure 43A:
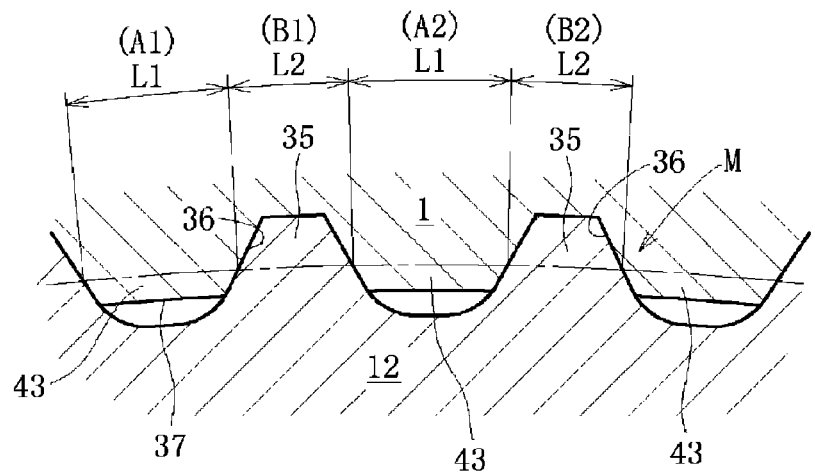
FIG. 43A is a sectional view of a first modification of the recess-projection fitting structure.

Meanwhile, as illustrated in a first modified example of the recess-projection fitting structure M of FIG. 43A, a circumferential thickness L2 of the projecting direction intermediate regions of the projections 35 may be smaller than a circumferential dimension L1 in a position corresponding to the intermediate region between the projections 35 adjacent to each other in the circumferential direction. In other words, in the spline 41 formed in the shaft section 12, the circumferential thickness (tooth thickness) L2 of the projecting direction intermediate regions of the projections 35 is set to be smaller than the circumferential thickness (tooth thickness) L1 of projecting direction intermediate regions of projections 43 on the hub wheel 1 side that fit in among the projections 35.

Therefore, a sum $\Sigma(B1+B2+B3+\ldots)$ of tooth thicknesses of the projections 35 in the entire circumference on the shaft section 12 side is set to be smaller than a sum $\Sigma(A1+A2+A3+\ldots)$ of tooth thicknesses of the projections 43 (projecting teeth) on the hub wheel 1 side. Consequently, it is possible to increase a shearing area of the projections 43 on the hub wheel 1 side and secure torsion strength. Moreover, because the tooth thickness of each of the projections 35 is small, it is possible to reduce press-fitting load and realize improvement of press-fitting performance. When a sum of circumferential thicknesses of the projections 35 is set to be smaller than a sum of circumferential thicknesses of the projections 43 on the opposite side, it is unnecessary to set the circumferential thickness L2 of all the projections 35 smaller than the dimension L1 in the circumferential direction between the projections 35 adjacent to each other in the circumferential direction. In other words, even if the circumferential thickness of arbitrary projections 35 among the plurality of projections 35 is the same as or larger than a dimension in the circumferential direction between the projections adjacent to each other in the circumferential direction, a sum of circumferential thicknesses only has to be smaller than a sum of dimensions in the circumferential direction.

Figure 43B:
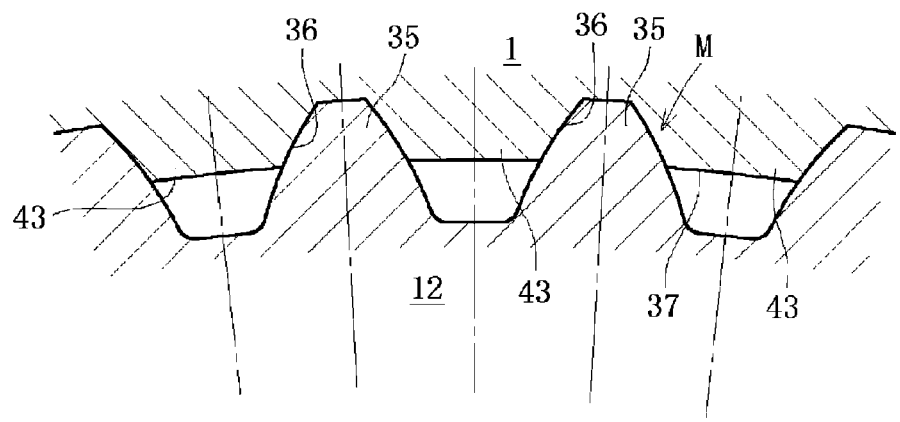
FIG. 43B is a sectional view of a second modification of the recess-projection fitting structure.

Note that, the projections 35 in FIG. 43A are trapezoidal in cross-section. However, a shape of the projections 35 may be an involute tooth shape as illustrated in a second modified example of FIG. 43B.

In each embodiment described above, the spline 41 forming the projections 35 is formed on the shaft section 12 side. Hardening treatment is applied to the spline 41 of the shaft section 12 and the inner diameter surface of the hub wheel 1 is not hardened (row material). Meanwhile, as illustrated in a third modified example of the recess-projection fitting structure M of FIG. 44A and FIG. 44B, a spline 111 (including projected streaks 111a and recessed streaks 111b) subjected to hardening treatment may be formed on the inner diameter surface of the hole 22 of the hub wheel 1. Hardening treatment may not be applied to the shaft section 12. Note that, the spline 111 can also be formed by various machining methods such as broaching, cutting, pressing, and drawing, which are publicly known and used means. Further, as heat hardening treatment, various kinds of heat treatment such as induction hardening, and carburizing and quenching can be adopted.

Also in this case, it is preferred that compressive residual stress be applied with respect to the projections 35 of the hub wheel 1 by compressive-residual-stress application means such as shot peening.

In this case, the projecting direction intermediate regions of the projections 35 correspond to positions of the recess forming surface before recess formation (outer diameter surface of the shaft section 12). In other words, a diameter dimension (minimum diameter dimension of the projections 35) D8 of a circle connecting the vertexes of the projections 35 as the projections 111a of the spline 111 is set to be smaller than an outer diameter dimension D10 of the shaft section 12. A diameter dimension (inner diameter dimension of fitting hole inner diameter surfaces among the projections) D9 of a circle connecting bottoms of the recesses 111b of the spline 111 is set to be larger than the outer diameter dimension D10 of the shaft section 12. In other words, a relation among the diameter dimensions and the outer diameter dimension is D8<D10<D9. Also in this case, when a diameter difference between the outer diameter dimension D10 of the shaft section 12 and the inner diameter dimension D9 of the hole 22 of the hub wheel 1 is represented as Δd, the height of the projections 35 is represented as h, and a ratio of the diameter difference and the height is represented as Δd/2h, a relation among the diameter difference, the height, and the ratio is 0.3<Δd/2h<0.86.

If the shaft section 12 is press-fitted into the hole 22 of the hub wheel 1, the recesses 36 in which the projections 35 on the hub wheel 1 side are fitted can be formed on the outer peripheral surface of the shaft section 12 by the projections 35. Consequently, the entire fitting contact regions 38 of the projections 35 and the recesses that fit in the projections 35 are brought into close contact with each other.

Figure 44A:
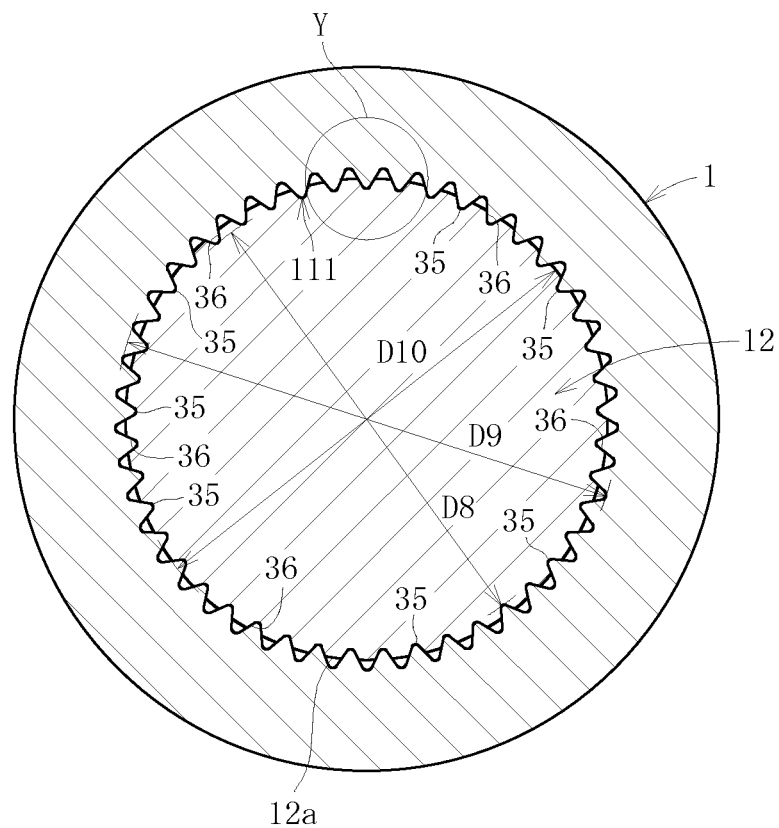
FIG. 44A is a horizontal sectional view of a third modification of the recess-projection fitting structure.
Figure 44B:
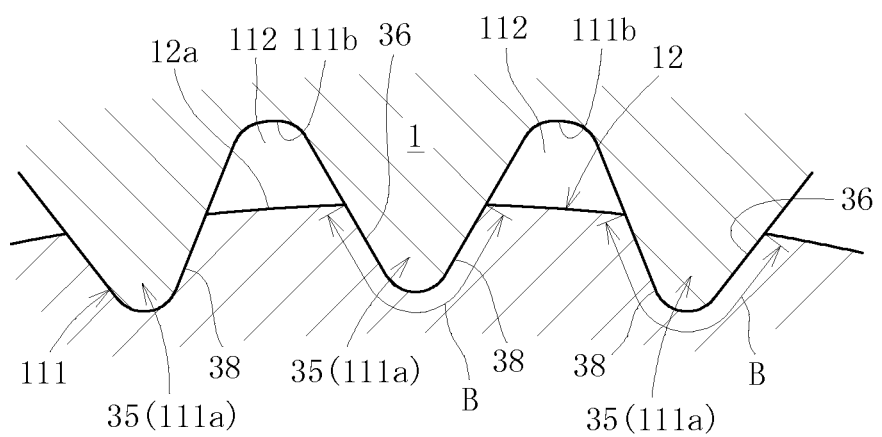
FIG. 44B is an enlarged horizontal sectional view of a third modification of the recess-projection fitting structure.

The fitting contact regions 38 are ranges B illustrated in FIG. 44B and ranges from halfway sections to the tops of the ridges in cross-section of the projections 35. Further, a gap 112 is formed further on an outer diameter side than the outer peripheral surface of the shaft section 12 between the projections 35 adjacent to each other in the circumferential direction.

In this way, even when the projections 35 of the recess-projection fitting structure M are provided on the inner diameter surface of the hole 22 of the hub wheel 1 and press-fitting is performed, compressive residual stress is applied to those projections 35 by the compressive-residual-stress application means, and the operations and effects same as those in the above-mentioned embodiments are realized. In particular, because it is unnecessary to perform hardening treatment (heat treatment) on the shaft section side, there is an advantage in that the outer race 5 of the constant-velocity universal joint is excellent in productivity.

In the wheel bearing device illustrated in FIG. 44A and FIG. 44B, as in the bearing device described above, it is preferred to provide the shaft section press-fitting guide structure M2. In this case, the guiding recesses 44a only have to be provided on the shaft section 12 side. Further, the radial gaps C1 can be formed between the vertexes of the projections 35 and the bottoms of the guiding recesses 44a, the circumferential gaps C2 and C2 can be formed between the sides of the projections 35 and the sides of the guiding recesses 44a, or the radial gaps C1 and the circumferential gaps C2 and C2 can be formed.

In the case illustrated in FIG. 44A and FIG. 44B, as in the case described above, the extruded portion 45 is formed by press fitting. Therefore, it is preferred to provide the pocket section 100 that stores the extruded portion 45. Because the extruded portion 45 is formed on the mouth side of the shaft section 12, the pocket section 100 is provided on the hub wheel 1 side.

In this way, in the wheel bearing device in which the projections 35 of the recess-projection fitting structure M are provided on the inner diameter surface 37 of the hole 22 of the hub wheel 1, the hardness of the axial end portions of the projections 35 is set to be higher than that of the outer diameter section of the shaft section 12 of the outer race 5, and the shaft section 12 is press-fitted as described above, it is unnecessary to perform hardness treatment (heat treatment) on the shaft section side. Therefore, the wheel bearing device is excellent in productivity of the outer joint member (outer race 5) of the constant-velocity universal joint.

The embodiments of the present invention have been described. However, the present invention is not limited to the embodiments and various modifications of the embodiments are possible. For example, the shape of the projections 35 of the recess-projection fitting structure M is triangular in cross-section according to the embodiment illustrated in FIG. 3 and is trapezoidal in cross-section according to the embodiment illustrated in FIG. 43A. Besides, projections of various shapes such as a semicircular shape, a semi-elliptical shape, and a rectangular shape can be adopted. An area, the number, and a circumferential direction disposing pitch, and the like of the projections 35 can also be arbitrarily changed. In other words, it is unnecessary to form the spline 41 or 61 and form the projections (projecting teeth) 41a or 111a of the spline 41 or 111 as the projections 35 of the recess-projection fitting structure M. The projections 35 may be something like keys or may form wavy fitting surfaces of a curved line shape. In short, it is sufficient that the projections 35 disposed along the axial direction are press-fitted into the opposite side, the recesses 36 coming in close contact with and fitting in the projections 35 can be formed on the opposite side by the projections 35, the entire fitting contact regions 38 of the projections 35 and the recesses that fit in the projections 35 are brought into close contact with each other, and rotation torque can be transmitted between the hub wheel 1 and the constant-velocity universal joint 3.

The hole 22 of the hub wheel 1 may be a deformed-shape hole such as a polygonal hole other than a circular hole. A cross-sectional shape of the end of the shaft section 12 fitted and inserted into the hole 22 may be a deformed-shape cross-section such as a polygon other than a circular cross-section. Further, when the shaft section 12 is press-fitted into the hub wheel 1, only press-fitting start-ends of the projections 35 have hardness higher than that of the regions where the recesses 36 are formed. Therefore, it is unnecessary to set the hardness of the entire projections 35 high. In FIG. 3 and the like, the gap 40 is formed. However, the projections 35 may bite in the inner diameter surface 37 of the hub wheel 1 up to the recesses among the projections 35. Note that, as a hardness difference between the projections 35 side and the side of the recess formation surface formed by the projections 35, it is preferred to set the hardness difference to be equal to or larger than 20 points in HRC. As long as the projections 35 can be press-fitted, the hardness difference may be smaller than 20 points.

The end surfaces (press-fitting start-ends) of the projections 35 are the surfaces orthogonal to the axial direction in the embodiments. However, the end surfaces may be surfaces tilting at a predetermined angle with respect to the axial direction. In this case, the end surfaces may tilt to the opposite projection side from the inner diameter side to the outer diameter side or may tilt to the projection side.

Further, it is also possible to provide small recesses (i.e., initial recesses) arranged at a predetermined circumferential pitch in the inner diameter surface 37 of the hole 22 of the hub wheel 1. It is necessary for the small recesses to have a volume smaller than that of the recesses 36. By thus providing the small recesses, it is possible to improve the press-fitting property of the projections 35. That is, by thus providing the small recesses, it is possible to reduce the capacity of the extruded portion 45 formed during press fitting of the projections 35, and hence it is possible to reduce the press-fitting resistance. Further, because the extruded portion 45 can be made smaller, it is possible to reduce the volume of the pocket section 100, making it possible to improve the processability of the pocket section 100 and the strength of the shaft section 12. Note that, the small recesses may be of various shapes such as a semi-elliptical or a rectangular shape, and the number of small recess can also be set arbitrarily.

While welding is adopted as the coupling means illustrated in FIG. 25, it is also possible to adopt adhesive instead of welding. Further, it is also possible to use rollers as the rolling elements 30 of the bearing 2. Further, while in the above-mentioned embodiments the third generation wheel bearing device is described, it is also possible to adopt the first, second, and fourth generation wheel bearing device. Note that, when press fitting the projections 35, it is possible to move the member on which the projections 35 are formed, with the member in which the recesses 36 are formed being stationary. Conversely, it is also possible to move the member in which the recesses 36 are formed, with the member on which the projections 35 are formed being stationary. Further, it is also possible to move both of them. Note that, in the constant-velocity universal joint 3, the inner race 6 and the shaft 10 may be integrated with each other through intermediation of the recess-projection fitting structure M as described with reference to the above-mentioned embodiments. Note that, when being used in the shaft section slip-off preventing structure M1, the snap ring 85 as illustrated in FIG. 24 can be provided on the base section side (mouth side) of the shaft section 12.

The seal material interposed between the bearing surface 95a of the bolt member 54, which fixes by a bolt the hub wheel 1 and the shaft section 12, and the positioning inner wall 22g is formed by applying the resin to the bearing surface 95a side of the bolt member 54 in the embodiments. However, conversely, the resin may be applied to the positioning inner wall 22g side. Alternatively, the resin may be applied to the bearing surface 95a side and the positioning inner wall 22g side. Note that, when the bolt member 54 is screwed in, if the bearing surface 95a of the bolt member 54 and the bottom surface of the recessed dent section 51 of the positioning inner wall 22g are excellent in adhesiveness, such a seal material can also be omitted. In other words, it is possible to improve adhesiveness of the bolt member 54 with the bearing surface 95a by grinding the bottom surface of the recessed dent section 51. It goes without saying that, even if the bottom surface of the recessed dent section 51 is not ground and is in a so-called turning finish state, the seal material can be omitted as long as adhesiveness can be exerted.

As the guiding recesses 44a, as illustrated in FIGS. 31A, 31B, and 31C, the gaps C1 and C2 are formed among the projections 35. A dimension of those gaps only has to be a dimension that does not cause decentering and shaft misalignment during press fitting and prevents the projections 35 from coming into press-contact with the inner surfaces of the guiding recesses 44a to cause an increase in press-fitting load. Further, the axial length of the guiding recesses 44a can be arbitrarily set. If the guiding recesses 44a are long in the axial direction, it is preferred in alignment. However, an upper limit of the axial length is limited because of the axial length of the hole 22 of the hub wheel 1. Conversely, if the axial length of the hole 22 of the hub wheel 1 is small, the guiding recesses 44a do not function as a guide and decentering and shaft misalignment are likely to occur. Therefore, it is necessary to determine the axial length of the guiding recesses 44a taking into account those points.

Incidentally, a sectional shape of the guiding recesses 44a is not limited to that illustrated in FIG. 31 and the like as long as the projections 35 can be inserted in the guiding recesses 44a. The sectional shape can be variously changed according to a sectional shape and the like of the projections 35. The number of guiding recesses 44a does not have to be the same as the number of projections 35 and may be smaller or larger than the number of projections 35. In short, several projections 35 only have to be inserted in several guiding recesses 44a and a phase of the projections 35 and a phase of the recesses 36 formed in the previous press fitting only have to coincide with each other.

The tilt angle $\theta$ of the tilting surfaces 77b of the ends of the guiding recesses 44a and the tilt angle $\theta 2$ of the bottoms of the guiding recesses 44a can also be arbitrarily changed. Further, if the tilt angle $\theta$ of the tilting surfaces 77b is close to 90°, the tilting surfaces 77b are functionally the same as the flat surfaces 77a orthogonal to the press-fitting direction. If the tilt angle $\theta$ is small, the guiding recesses 44a are long and the axial length of the recess-projection fitting structure M is small. If the tilt angle $\theta 2$ of the bottoms is large, it is difficult to form the guiding recesses 44a. Conversely, if the tilt angle $\theta 2$ is small, the function of the tilted guiding recesses 44a cannot be exerted. Therefore, it is necessary to set the tilt angles $\theta$ and $\theta 2$ taking into account those points.

In the above-mentioned embodiments, although the back surface 11a of the mouth section 11 of the outer race 5 and an end surface 31a of the caulking section 31 are not held in contact with each other, those surfaces may be brought into contact with each other. When the back surface 11a of the mouth section 11 of the outer race 5 and the end surface 31a of the caulking section 31 are held in contact with each other, there is a risk that abrasion between contact surfaces causes abnormal noise. However, even in a contact state, setting for preventing abnormal noise can be made depending on a contact force, materials of the contact surfaces, and finished states of the contact surfaces. Thus, those surfaces are held in contact with each other in the present invention.

Specifically, when the caulking section 31 of the hub wheel 1 and the back surface 11a of the mouth section 11 are brought into contact with each other and the contact surface pressure therebetween exceeds 100 MPa, abnormal noise is likely to be caused. When torque load is large, a difference occurs in torsion amounts of the outer race 5 of the constant-velocity universal joint 3 and the hub wheel 1. Sudden slip occurs in the contact section of the outer race 5 of the constant-velocity universal joint 3 and the hub wheel 1 because of this difference and abnormal noise occurs. Meanwhile, when the contact surface pressure is equal to or lower than 100 MPa, it is possible to prevent sudden slip from occurring and suppress occurrence of abnormal noise. Consequently, it is possible to configure a silent wheel bearing device. The surface pressure of the contact section of the end surface 31a of the caulking section 31 of the hub wheel 1 and the back surface 11a of the mouth section 11 is influenced by the magnitude of fastening torque of the bolt member 54. However, an axial force generated by the fastening torque is consumed as a frictional force in the axial direction of the recess-projection fitting section or a force for additionally molding the recess-projection fitting section (press-fitting load at the time of molding the recess-projection fitting section), and thus the contact surface pressure becomes higher only when a higher axial force is applied. Accordingly, the contact surface pressure can be easily suppressed to 100 MPa or lower, and thus stick-slip noise is not generated. Note that, even when being 100 MPa or lower, the contact surface pressure needs to be set to surface pressure or higher, with which a seal structure can be configured.

A sectional shape of the snap ring 130 is not limited to that illustrated in FIGS. 10 and 11, and it is possible to adopt snap rings having various shapes such as an elliptic or oblong shape, a triangular shape, or polygonal shapes each having more sides and corners than a pentagonal shape has. The compressive-residual-stress application means is not limited to the shot peening, and it is possible to adopt other means such as laser peening or ultrasonic impact treatment.

Note that, only in the embodiment illustrated in FIG. 5, the hardened layers H and H1 are indicated by cross hatching illustrated on the hub wheel 1 and the outer race 5 of the constant-velocity universal joint 3. However, such hardened layers are formed also in the other embodiments.

The present invention can be applied to wheel bearing device of the first generation having the structure in which double row roller bearings are independently used, the second generation in which a vehicle body attachment flange is integrally provided in an outer member, the third generation in which an inner raceway surface on one side of the double row roller bearings is integrally formed with an outer periphery of a hub wheel integrally having a wheel attachment flange, and the fourth generation in which a constant-velocity universal joint is integrated with the hub wheel and an inner raceway surface of the other side of the double row roller bearings is integrally formed with an outer periphery of an outer joint member configuring the constant-velocity universal joint.

REFERENCE SIGNS LIST

1 hub wheel
2 bearing
3 constant-velocity universal joint
10 shaft
11 mouth section
12 shaft section (stem section)
21 wheel attachment flange
22 hole
22g positioning inner wall
25 outer member
26 outer raceway surface
27 outer raceway surface
28 inner raceway surface
29 inner raceway surface
30 rolling element
34 knuckle
35 projection
36 recess
38 fitting contact region
39 inner member
65 end expanded-diameter caulking section (tapered locking piece)
128 annular groove
129 annular groove
130 snap ring
M recess-projection fitting structure
M1 shaft section slip-off preventing structure
M2 shaft section press-fitting guide structure
T1 outboard side of constant-velocity universal joint
T2 inboard side of constant-velocity universal joint

The invention claimed is:

1. A wheel bearing device comprising:
an outer member having double-row outer raceway surfaces;
an inner member having double-row inner raceway surfaces;
a plurality of rolling elements arranged between the double-row outer raceway surfaces of the outer member and the double-row inner raceway surfaces of the inner member; and
an outer joint member having a shaft section formed therein, wherein
the inner member has a hub wheel having a hole and a flange for attachment to a wheel,
the shaft section of the outer joint member is inserted in a fitting manner into the hole of the hub wheel and is coupled to the hub wheel,
an axially extending projection is provided on an outer diameter surface of the shaft section of the outer joint member, the axially extending projection being press-fitted along an axial direction into an initial recess provided on an inner diameter surface of the hole of the hub wheel, and a recess is formed in the hole of the hub wheel by the press-fitting of the projection, to thereby form a recess-projection fitting structure in which the projection and the recess are held in close contact with each other over an entire region of fitting contact regions therebetween,
the initial recess has a volume that is smaller than a volume of the recess,
a surface of the recess is a cut face formed by removing material including the initial recess by the press-fitting of the projection, and
a shaft section press-fitting guide structure for guiding the projection during press fitting of the shaft section to the hole of the hub wheel is provided on a projection press-fitting start side of the hole of the hub wheel.

2. A wheel bearing device according to claim 1, wherein the projection is configured by a male spline having a plurality of projections and the shaft section press-fitting guide structure is configured by a female spline, and
the female spline has a plurality of guiding recesses provided at a same predetermined pitch as a pitch of the projections.

3. A wheel bearing device according to claim 2, wherein radial gaps are formed between vertexes of the projections and bottoms of the guiding recesses.

4. A wheel bearing device according to claim 3, wherein circumferential gaps are further formed between sides of the projections and sides of the guiding recesses.

5. A wheel bearing device according to claim 4, wherein the recess is a plurality of recesses formed by cutting caused by the press-fitting of the projections.

6. A wheel bearing device according to claim 4, wherein a press-fitting start end surface of each of the projections is a surface extending in a direction perpendicular to the axial direction.

7. A wheel bearing device according to claim 4, wherein the recess-projection fitting structure allows separation by application of drawing force in the axial direction, and
the hub wheel and the shaft section of the outer joint member are fixed with a bolt member threadedly engaged with a screw hole formed at a shaft center portion of the shaft section of the outer joint member along the axial direction.

8. A wheel bearing device according to claim 3, wherein the recess is a plurality of recesses formed by cutting caused by the press-fitting of the projections.

9. A wheel bearing device according to claim 3, wherein a press-fitting start end surface of each of the projections is a surface extending in a direction perpendicular to the axial direction.

10. A wheel bearing device according to claim 3, wherein the recess-projection fitting structure allows separation by application of drawing force in the axial direction, and the hub wheel and the shaft section of the outer joint member are fixed with a bolt member threadedly engaged with a screw hole formed at a shaft center portion of the shaft section of the outer joint member along the axial direction.

11. A wheel bearing device according to claim 2, wherein the recess is a plurality of recesses formed by cutting caused by the press-fitting of the projections.

12. A wheel bearing device according to claim 2, wherein a press-fitting start end surface of each of the projections is a surface extending in a direction perpendicular to the axial direction.

13. A wheel bearing device according to claim 2, wherein the recess-projection fitting structure allows separation by application of drawing force in the axial direction, and the hub wheel and the shaft section of the outer joint member are fixed with a bolt member threadedly engaged with a screw hole formed at a shaft center portion of the shaft section of the outer joint member along the axial direction.

14. A wheel bearing device according to claim 1, wherein the recess is formed by cutting caused by the press-fitting of the projection.

15. A wheel bearing device according to claim 1, wherein a press-fitting start end surface of the projection is a surface extending in a direction perpendicular to the axial direction.

16. A wheel bearing device according to claim 1, wherein the recess-projection fitting structure allows separation by application of drawing force in the axial direction, and the hub wheel and the shaft section of the outer joint member are fixed with a bolt member threadedly engaged with a screw hole formed at a shaft center portion of the shaft section of the outer joint member along the axial direction.

* * * * *